United States Patent
Ichiyama

(10) Patent No.: US 8,242,653 B2
(45) Date of Patent: Aug. 14, 2012

(54) MAGNETIC FLUX CONTROLLABLE ROTATING ELECTRIC MACHINE SYSTEM

(75) Inventor: Yoshikazu Ichiyama, Kyoto (JP)

(73) Assignee: Kura Laboratory Corporation, Kyoto-Shi (JP)

( * ) Notice: Subject to any disclaimer, the term of this patent is extended or adjusted under 35 U.S.C. 154(b) by 446 days.

(21) Appl. No.: 12/646,975

(22) Filed: Dec. 24, 2009

(65) Prior Publication Data

US 2010/0176679 A1    Jul. 15, 2010

(30) Foreign Application Priority Data

Jan. 14, 2009 (JP) ................................. 2009-005444
Feb. 2, 2009 (JP) ................................. 2009-021101
Mar. 3, 2009 (JP) ................................. 2009-048940
Apr. 28, 2009 (JP) ................................. 2009-109130

(51) Int. Cl.
*H02K 3/00* (2006.01)
*H02K 23/46* (2006.01)
*H02K 1/00* (2006.01)
*H02K 19/26* (2006.01)
*H02K 21/00* (2006.01)

(52) U.S. Cl. ............... 310/156.44; 310/180; 310/181; 310/190; 310/191; 310/209; 310/156.55; 310/156.56

(58) Field of Classification Search ............ 310/180, 310/181, 190, 191, 209, 156.35, 156.55, 310/156.56, 156.44; *H02K 23/46, 1/00, 3/00, H02K 16/26, 21/00*
See application file for complete search history.

(56) References Cited

U.S. PATENT DOCUMENTS

| | | | |
|---|---|---|---|
| 5,682,073 A | 10/1997 | Mizuno | |
| 5,731,645 A * | 3/1998 | Clifton et al. | 310/74 |
| 6,373,162 B1 * | 4/2002 | Liang et al. | 310/156.53 |
| 6,531,799 B1 | 3/2003 | Miller | |
| 6,800,977 B1 | 10/2004 | Ostovic | |
| 7,567,006 B2 | 7/2009 | Ichiyama | |
| 7,923,879 B2 * | 4/2011 | Nitta | 310/156.44 |
| 2005/0099083 A1 * | 5/2005 | Hsu | 310/171 |
| 2006/0103253 A1 * | 5/2006 | Shiga et al. | 310/156.45 |
| 2009/0115361 A1 * | 5/2009 | Nitta | 318/400.09 |

FOREIGN PATENT DOCUMENTS

| | | |
|---|---|---|
| JP | 10-271784 | 10/1998 |
| JP | 2008-289300 | 11/2008 |

* cited by examiner

*Primary Examiner* — Quyen Leung
*Assistant Examiner* — Terrance Kenerly
(74) *Attorney, Agent, or Firm* — Ditthavong Mori & Steiner, P.C.

(57) ABSTRACT

A rotor surface has magnetic salient poles and island-shaped magnetic poles alternately in circumferential direction, and the island-shaped magnetic pole is constituted so that a magnetic flux coming from an external source does not flow through. A magnetic excitation part magnetizes the island-shaped magnetic poles and the magnetic salient poles collectively in the same direction, and then control a flux amount flowing through an armature. The armature has armature coils that face the magnetic salient pole and the island-shaped magnetic pole simultaneously so that driving torque fluctuation or power generation voltage waveform distortion is controlled. The magnetic excitation part changes magnetization state of a field magnet irreversibly, or changes an excitation current to an excitation coil to control a flux flowing through the armature.

23 Claims, 28 Drawing Sheets

MAGNETIC FLUX CONTROLLABLE ROTATING ELECTRIC MACHINE SYSTEM

CROSS-REFERENCE TO RELATED APPLICATIONS

The present application claims priority under 35 U.S.C. §119 to Japanese Patent Applications No. 2009-5444 filed Jan. 14, 2009, No. 2009-21101 filed Feb. 2, 2009, No. 2009-48940 filed Mar. 3, 2009 and No. 2009-109130 filed Apr. 28, 2009. The contents of these applications are incorporated herein by reference in their entirety.

BACKGROUND OF THE INVENTION

1. Field of the Invention

The present invention relates to axial gap rotating electric machines such as electric generators and electric motors having a permanent magnet.

2. Discussion of the Background

Rotating electric machine apparatus, such as an electric generator for electromagnetically generating electric power by relative rotation of a permanent magnet and an armature, or an electric motor for generating relative rotation between a permanent magnet and an armature by interaction of the permanent magnet and a magnetic field generated by electric current supplied to the armature, are excellent in energy efficiency and have been widely used routinely with development of permanent magnets. However, in both electric motors and electric generators, optimum power is not always obtained in a wide rotational speed range because the amount of magnetic flux supplied from field magnet is constant.

In the case of the electric motor, it will become difficult to control the electric motor in a high-speed rotational region because the back electromotive force (power generation voltage) becomes too high, and therefore, various methods for weakening the field strength as field-weakening control have been proposed. On the other hand, in the case of the electric generator, a constant-voltage electric generator by means of field current control only or a constant-voltage circuit in which the power generation voltage is made to be constant by a semiconductor has been exclusively used so that the power generation voltage is made to be at a predetermined level in a wide rotational-speed range.

In the case of electric motor, field-weakening control by means of phase leading electric current control has been widely adopted, but the energy efficiency and the control range are limited. Attempts have been made to perform the field control in the rotating electric machines by means of a mechanical deviation (For example, U.S. Pat. No. 7,567,006) without sacrificing the high energy efficiency upon the rotating electric machines with a permanent magnet. As the field magnet condition can be maintained in the form of mechanical deviation, a rotating electrical machine can be actualized with high energy efficiency with the energy loss due to field excitation being kept minimum.

The other method for controlling strength of magnetic field to keep the energy loss at minimum is to change a magnetization state of a field magnet irreversibly, and a technical proposition is made in Japanese Patent Laid-Open No. 2008-289300. This proposed technology has a configuration in which a configuration for a current excitation as shown in U.S. Pat. No. 5,682,073 is substituted by a magnet excitation configuration in which magnetization can be changed. However, this has drawbacks such as that the field magnet is susceptible to the magnetic field of an armature coil, configuration thereof is complicated because an excitation coil and the armature coil interfere with each other, and application is limited to short shaft electric rotational machines because magnetic flux from the field magnet concentrate in the central area.

U.S. Pat. No. 5,767,601, U.S. Pat. No. 6,373,162, and Japanese Patent Laid-Open No. Hei 10-271784 have proposed magnetic field controls for electromagnetic rotational devices of the axial gap structure but those show examples of electric current excitation type. In those proposals, the amount of fluxes from adjacent salient poles of a rotor are imbalance, and induced voltage wave form to the armature coils are distorted and the fluctuation of torque are large, and controllable range of the amount of flux is limited. Moreover, concerns remain that the magnetic flux from a permanent magnet in the rotor may be short-circuited by a excitation flux path. In addition, in any proposal mentioned above, half of the rotor surface is a permanent magnet, so it is difficult to make use of a reluctance torque.

SUMMARY OF THE INVENTION

A rotating electric machine system according to the present invention has a configuration that a rotor and an armature are arranged in a line in the direction of an axis. The rotor has island-shaped magnetic poles and magnetic salient poles alternately arranged in circumferential direction, the island-shaped magnetic poles are composed so that a magnetic flux coming from a magnetic excitation part should not flow there-through, the magnetic salient poles are composed so that the magnetic flux can flow there-through. The island-shaped magnetic poles and the magnetic salient poles are magnetized collectively in the same direction by the magnetic excitation part, and then the amount of fluxes flowing through the armature is controlled. The specific configuration of the rotating electric machine system will be described herein below.

A rotating electric machine has a rotor and an armature which oppose each other in the axial direction to rotate relatively to each other. The armature has armature coils arranged in circumferential direction on its plane facing the rotor. The rotor has island-shaped magnetic poles and magnetic salient poles arranged alternatively in a circumferential direction on its plane facing the armature. A magnetic excitation part is provided to magnetize all the magnetic salient poles and the island-shaped magnetic poles collectively in same direction. The rotor has isolation members formed by permanent magnet and/or non-magnetic material at least within the island-shaped magnetic pole to prevent passage of magnetic flux coming from outside. Thickness of the isolation member within the island-shaped magnetic pole should be larger than thickness of the isolation member within the magnetic salient pole so that magnetic flux coming from the magnetic excitation part should not flow to the armature via the island-shaped magnetic pole. The island-shaped magnetic poles are configured such that it may be magnetized in same direction and almost parallel with a rotational shaft by at least one of a permanent magnet adjacent to the island-shaped magnetic pole and a permanent magnet within the island-shaped magnetic pole. The magnetic excitation part has at least one of an excitation coil and a field magnet, both ends of the magnetic excitation part are magnetically coupled respectively with one of the rotor and the armature arranged at one end of axial direction, and one of the rotor and the armature arranged at other end of axial direction so that a magnetic flux coming from one end of the magnetic excitation part may return to the other end thereof through the armature and the magnetic salient pole. And thereby, an amount of the magnetic flux flowing through the armature is controlled by changing the amount of magnetic flux supplied from the magnetic excitation part in accordance with the output of the rotating electric machine system so that the output is optimized.

As for the rotor arranged at an end of axial direction, the island-shaped magnetic poles and the magnetic salient poles are arranged on a circular magnetic substrate, and, one end of the magnetic excitation part is magnetically coupled with the circular magnetic substrate. As for the armature arranged at an end of axial direction, the armature coils are arranged on a magnetic yoke, and, one end of the magnetic excitation part is magnetically coupled with the magnetic yoke. The armature and the magnetic salient poles are configured to form a flux path for a magnetic flux coming from the magnetic excitation part flowing there-through. That is, in the configuration that the rotor, the armature, and the rotor are arranged to make a line in the order as recited here, when the armature is composed of armature coils arranged in circumferential direction, the magnetic salient poles of two rotors are axially opposed each other with the armature interposing therebetween. When the armature coil is wound around magnetic tooth which extend axially, the magnetic salient poles and the magnetic teeth are configured so that magnetic fluxes coming from the magnetic excitation part flow through the magnetic salient poles of two rotors and the magnetic teeth intermittently in accordance with rotational position of the rotor. Further, in the configuration that an armature, a rotor, and an armature arranged in a line in the recited order, when the armature coil is wound around magnetic teeth which extend axially, the magnetic salient poles and the magnetic teeth are configured so that a magnetic flux coming from the magnetic excitation part flows through the magnetic salient poles and the magnetic teeth of two armatures intermittently in accordance with rotational position of the rotor.

The above-mentioned rotating electric machine system has the armature and the rotor opposing each other through an axial gap, and one of typical configurations is that the rotor, the armature and the rotor queue up axially in the order recited herein. That is, the armature has the armature coils arranged in circumferential direction facing the rotor, the rotor has the island-shaped magnetic poles and the magnetic salient poles disposed alternately in circumferential direction on the circular magnetic substrate facing the armature, and both ends of the magnetic excitation part are magnetically coupled respectively with the circular magnetic substrate of two rotors respectively.

Further, another one of typical configurations is that the armature, the rotor and the armature queue up axially in the order as recited here. That is, the rotor has the island-shaped magnetic poles and the magnetic salient poles disposed alternately in circumferential direction facing the armature, each armature has the armature coils arranged on a magnetic yoke in circumferential direction facing the rotor, and both ends of the magnetic excitation part are magnetically coupled respectively with the magnetic yoke of two armatures respectively.

In the above-mentioned rotating electric machine system, one of actual configurations of the island-shaped magnetic poles and the magnetic salient poles as magnetic pole portion of the rotor is as follows; a uniform magnetic material is separated by permanent magnets and/or magnetic gaps, to form the island-shaped magnetic poles and the magnetic salient poles, and the island-shaped magnetic poles are configured such that it is difficult for the magnetic flux coming from the magnetic excitation part to flow as compared with the magnetic salient poles. Furthermore, other specific configuration is as follows; The entire island-shaped magnetic pole is composed of a permanent magnet, and the magnetic salient pole is made as a part of magnetic material. Permeability of permanent magnets is close to that of an air gap, the amount of the magnetic flux coming from the permanent magnet is substantially constant, so the permanent magnet with enough thickness can be applied as the isolation member for bi-directional magnetic flux. In addition to the magnetic torque, reluctance torque can be used when the island-shaped magnetic poles are composed of magnetically isolated magnetic material.

In the above-mentioned rotating electric machine system, as the amount of flux flowing from the island-shaped magnetic pole to the armature is made fixed, and the amount of flux flowing from the magnetic salient pole to the armature is made variable, then the amount of the magnetic flux flowing into the armature from the island-shaped magnetic poles and the amount of flux from the magnetic salient poles are imbalance in most cases causing fluctuation of torque or distortion of waveform of electric power generation. According to the present invention, the armature is configured such that fluctuation of the driving torque and the waveform of generated electric power are restrained even in a condition that imbalance exists in the amount of flux flowing to the armature via adjoining magnetic poles.

Therefore, in the above-mentioned rotating electric machine system, the armatures are grouped to a first armature magnetic pole group and a second armature magnetic pole group. In an armature coil pair of the same phase in the first armature magnetic pole group and the second armature magnetic pole group which armature coils are supplied with driving current simultaneously, the armature coils of the armature coil pair are arranged such that the armature coil of one of the armature coil pair opposes the island-shaped magnetic pole when the armature coil of other one of the armature coil pair opposes the magnetic salient pole, and the armature coils of the armature coil pair are connected to generate magnetic fluxes of mutually opposite directions when current flows. The armature coils can bear a configuration that the coils are wound around magnetic teeth or empty cores.

One of the specific configurations of the armature is as follows; an armature having the first armature magnetic pole group and an armature having the second armature magnetic pole group face the rotor respectively. In an armature coil pair of the same phase in the first armature and the second armature, the armature coils of the armature coil pair are arranged such that the armature coil of one of the armature coil pair opposes the island-shaped magnetic pole when the armature coil of other one of the armature coil pair opposes the magnetic salient pole, and they are connected in series to generate magnetic flux of opposite directions when current flows.

Further, still another of the specific configurations of the armature is such that an armature has the first armature magnetic pole group and the second armature magnetic pole group at different circumferential positions facing the rotor. In an armature coil pair of the same phase in the first armature magnetic pole group and the second armature magnetic pole group, the armature coils of the armature coil pair are arranged such that the armature coil of one of the armature coil pair opposes the island-shaped magnetic pole when the armature coil of other one of the armature coil pair opposes the magnetic salient pole, and they are connected in series to generate magnetic flux of mutually opposite direction when current flows.

Yet another one of specific configurations of the magnetic excitation part includes a field magnet of which magnetization is changeable. The magnetic excitation part has the field magnet and an excitation coil to change magnetization state of the field magnet, the magnetic excitation part is configured so that a magnetic flux flowing from one of N pole and S pole of the field magnet returns to the other pole thereof through one of the rotor and the armature arranged at one end of axial direction, one of the rotor and the armature arranged in midway, and one of the rotor and the armature arranged at the other end of axial direction. And, excitation current is supplied to the excitation coil, magnetization of the field magnet is changed irreversibly, and a magnetic flux amount flowing through the armature is controlled according to an output of the rotating electric machine system so that the output thereof is optimized.

The field magnet is composed of parallel connection of magnet elements which are different in easiness of magnetization, or includes a permanent magnet whose easiness of magnetization (that is the product of length and coercivity) changes continuously within section thereof. Since magnetomotive force (difference in magnetic potential) is added by the excitation coil to the magnet elements substantially uniformly, the difference in magnetic potential divided by the length becomes strength of magnetic field to be applied to each magnet element, the magnet element with small product of the length and the coercivity is magnetized easily. Therefore, magnetization state of the magnet element which are different in easiness of magnetization is controlled selectively in accordance with the electric current fed to the excitation coil.

The magnet element has magnetization of one of the first magnetization and the second magnetization which are opposite in direction to each other. The magnet element that magnetizes the magnetic salient poles in the direction opposite to the magnetization direction of the island-shaped magnetic poles is assumed to be the first magnetization, and the amount of magnetic flux crossing the armature coil increases. Therefor, when magnetic pole area of the first magnetization is increased, magnetic flux crossing the armature coil will be increased.

Magnetic member to connect magnet elements in parallel is desirable to have magnetic saturation flux density almost equal to that of the magnet elements. Otherwise, magnetic flux coming from bigger thickness magnet element may concentrate on smaller thickness magnet element, and smaller thickness magnet element may be demagnetized. When magnetic flux is concentrated beyond saturation flux density, magnetic resistance becomes big, and magnetic flux concentration will be avoided.

As the magnetic flux induced by the armature coils returns through the armature and neighborhood of the rotor surface, but will not flow through the field magnet, the field magnet is arranged away from the armature coils. Therefor the field magnet is hard to be affected by the armature coils, a low coercivity magnet, or a magnet having small thickness can be applied for the field magnet, and magnetization state of the field magnet is easily controlled. In case that the armature coils are wound around magnetic teeth, distribution of the magnetic flux induced by the armature coils is further localized, and impact on the field magnet is made small.

Further, in said rotating electric machine as mentioned before, one of the specific configurations of the magnetic excitation part employs electric current excitation. The magnetic excitation part has the excitation coil and an excitation flux path member, and both ends of the excitation flux path member are coupled with one of the rotor and the armature arranged at one end of axial direction, and one of the rotor and the armature arranged at the other end of axial direction, and the excitation coil is arranged so as to induce magnetic flux in a flux path including the excitation flux path member, the magnetic salient poles, and the armature. And, excitation current is supplied to the excitation coil, and the amount of magnetic flux flowing through the armature is controlled in accordance with an output of the rotating electric machine system so that the output thereof is optimized.

Further, one of the specific configurations of the magnetic excitation part is a configuration that a magnetic flux due to the field magnet and a magnetic flux due to the electric current excitation are superimposed. The magnetic excitation part has the excitation coil and the field magnet of which magnetization is changeable, a flux adjusting current of a degree that does not make the field magnet cause irreversible magnetization change is supplied to the excitation coil in each magnetization state of the field magnet, and the induced flux is superimposed on a flux coming from the field magnet. Therefor, the amount of the magnetic flux flowing through the armature is adjusted.

Even if it is possible to change magnetization of the field magnet continuously, in most cases, magnetization change of the field magnet is carried out intermittently. The amount of flux flowing through the armature is controlled discretely in many cases as a result. In the present invention, a flux induced by the excitation coil is superimposed on a flux coming from the field magnet in each magnetization state of the field magnet, and the amount of a magnetic flux flowing through the armature is precisely controlled.

In the rotating electric machines in which a rotor and an armature are arranged in line in axial direction, there are various kind of configurations such as, a composition that a single rotor and a single armature are located axially in a line, a configuration that a plurality of rotors and a plurality of armatures are located alternately axially in a line, a configuration that a rotor with a conical surface and an armature with a conical surface are located axially in a line etc., and the rotating electric machine system of the present invention can be applied to any of the above-mentioned configurations. In the rotating electric machine apparatus, the rotating electric machine may be an electric motor when an electric current to the armature coils is input and a rotational force is output, and the rotating electric machine is an electric generator when the rotational force is input and current is output from the armature coils. Optimal magnetic structures exist in the electric motor or the electric generator, but are reversible, and the rotating electric machine system of this invention can be applied to both of the electric motor and the electric generator.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which:

FIG. 4A shows same magnetization state of the field magnet shown in FIG. 1. FIG. 4B shows the state that area of the first magnetization is decreased from the state in FIG. 4A. FIG. 4C shows the state that area of the first magnetization is increased from the state in FIG. 4A;

FIG. 12A shows the state that both of the first magnet element $9p$ and the second magnet element $9n$ are the first magnetization. FIG. 12B shows the state that the first magnet element $9p$ is the first magnetization and the second magnet element $9n$ is the second magnetization. FIG. 12C shows the state that both of the first magnet element $9p$ and the second magnet element $9n$ are the second magnetization;

FIG. 16A shows the state that magnet elements $13m$ and $13n$ are the first magnetization. FIG. 16B shows the state that the magnet element $13m$ is the first magnetization and the magnet element $13n$ is the second magnetization. FIG. 16C shows the state that magnet elements $13m$ and $13n$ are the second magnetization;

DESCRIPTION OF THE EMBODIMENTS

Figure 1:
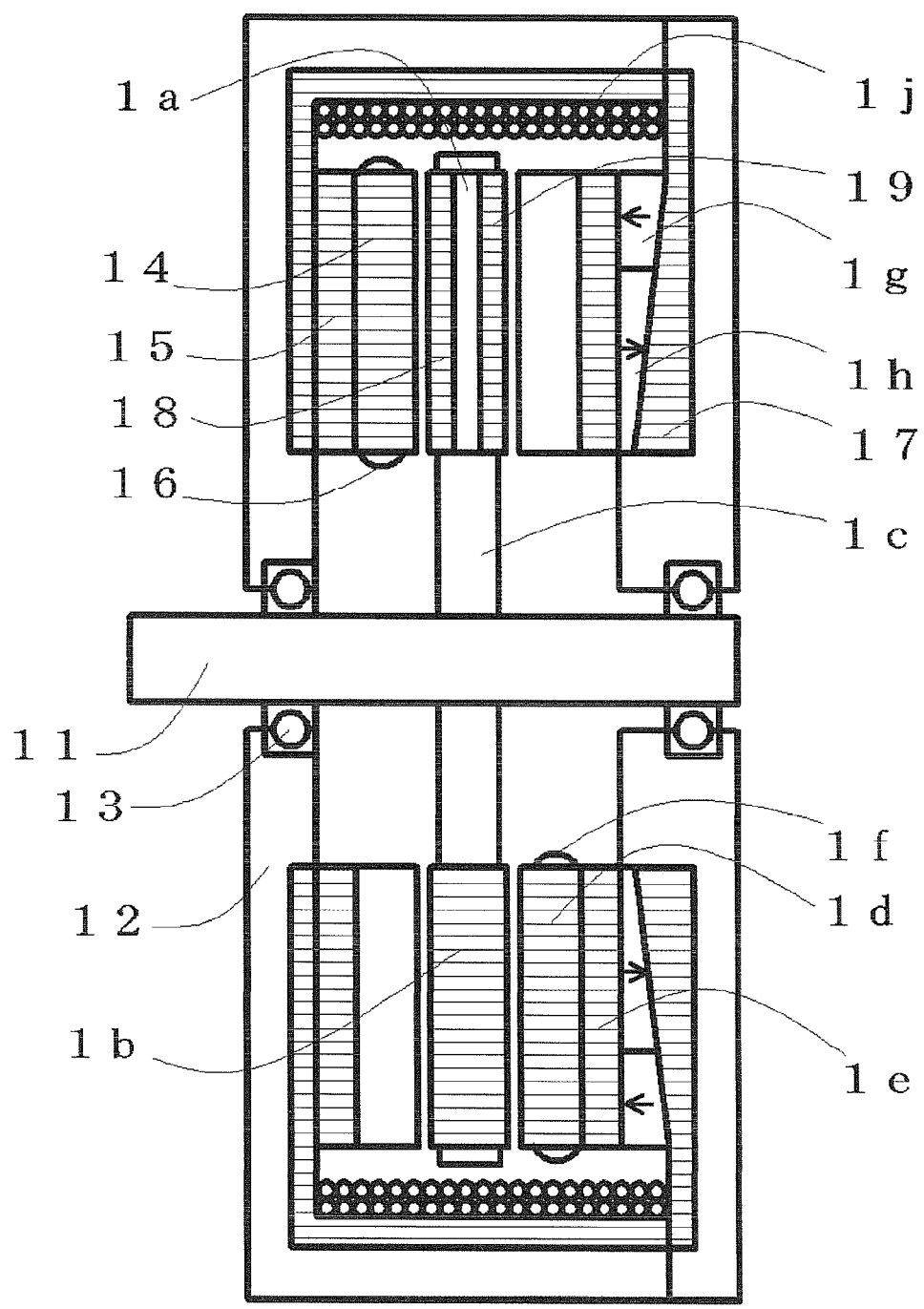
FIG. 1 is a longitudinal sectional view of a rotating electric machine apparatus according to the first embodiment of the present invention.

Embodiments of the present invention will be described hereinafter with reference to the accompanying drawings. In the following description, the constituent elements having substantially the same function and arrangement are denoted by the same reference numerals, and repetitive descriptions will be made only when necessary.

The rotating electric machine system according to a first embodiment of the present invention will be explained with reference to FIGS. 1 to 5. The first embodiment is a rotating electric machine system having an axial gap structure, two stators and a magnetic excitation part in a static side.

FIG. 1 shows a longitudinal sectional view of the embodiment in which the present invention is applied to a rotating electric machine apparatus having an axial gap structure and two stators. A rotational shaft 11 is supported rotatably by a housing 12 through bearings 13, a rotor rotates with the rotational shaft 11 and has an island-shaped magnetic poles 18 (19) magnetized in same direction parallel with the rotational shaft 11 and a magnetic salient poles $1b$ alternately in circumferential direction. Number $1a$ indicates a non-magnetic member that is an isolation member arranged between island-shaped magnetic poles 18 and 19, and number 1c indicates a rotor support. The isolation member is not arranged in the magnetic salient pole 1b.

The first armature which opposes to axial left (as viewed in FIG. 1) of the rotor and the second armature which opposes to axial right of the rotor are fixed on the housing 12. The first armature has a magnetic teeth 14 extending parallel with the rotational shaft 11 to right from an annular magnetic yoke 15 and armature coils 16 wound around the magnetic teeth 14, the second armature has a magnetic teeth 1d extending parallel with the rotational shaft 11 to left from an annular magnetic yoke 1e and armature coils 1f wound around the magnetic teeth 1d.

A main part of a magnetic excitation part is composed with a field magnet (1g, 1h), an excitation path pole 17, and a excitation coil 1j. The field magnet has shape around the rotational shaft 11 and is arranged between the housing 12 and the armature, the excitation coil 1j is arranged in inner circumference side of the housing 12 and the excitation path pole 17. The field magnet (1g, 1h) is disposed between one end of the excitation path pole 17 and the annular magnetic yoke 1e, the other end of the excitation path pole 17 is further prolonged along inner circumference side of the housing 12 and is connected with the annular magnetic yoke 15. In FIG. 1, the field magnet is classified into regions shown by numbers 1g and 1h, and the field magnet regions 1g and 1h are magnetized leftward, rightward in parallel with the rotational shaft 11, respectively.

Figure 2A:
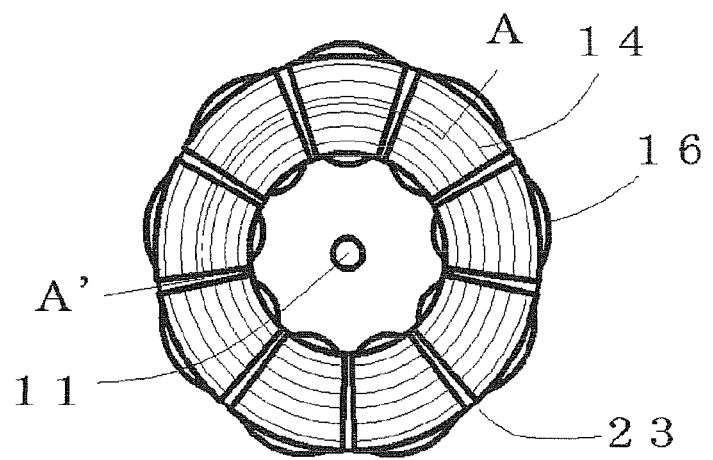
FIG. 2A is a plan view of the surface of the first armature of the rotating electric machine shown in FIG. 1, as seen from the left removing the arts thereabove.

This embodiment has the first armature at left (as viewed in FIG. 1) of the rotor, and the second armature at right. The first armature has the first armature magnetic pole group, and the second armature has the second armature magnetic pole group. FIG. 2A is a plan view of the surface of the first armature of the rotating electric machine shown in FIG. 1, as seen from the left removing the arts thereabove. The armature coils 16 are wound around the magnetic teeth 14, 9 armature coils 16 are arranged in this embodiment. They are arranged repeatedly in circumferential direction as armature coils of U-phase, V-phase, and W-phase. Adjacent magnetic teeth 14 oppose each other through a magnetic gap 23.

Figure 2B:
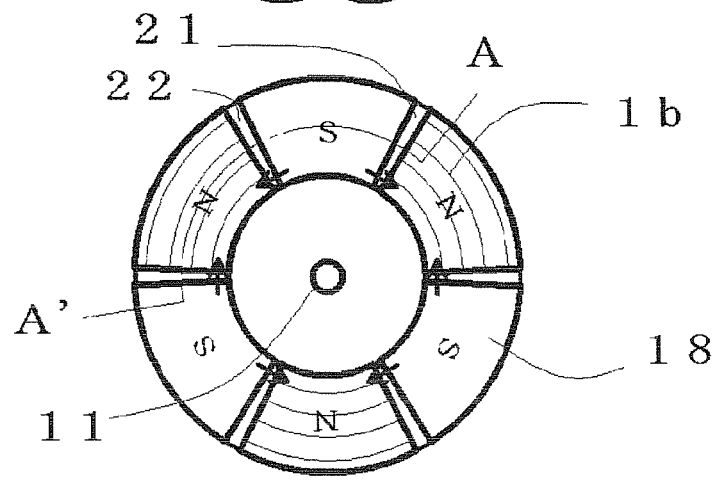
FIG. 2B is a view showing the rotor of the rotating electric machine shown in FIG. 1, as seen from the first armature.
Figure 2C:
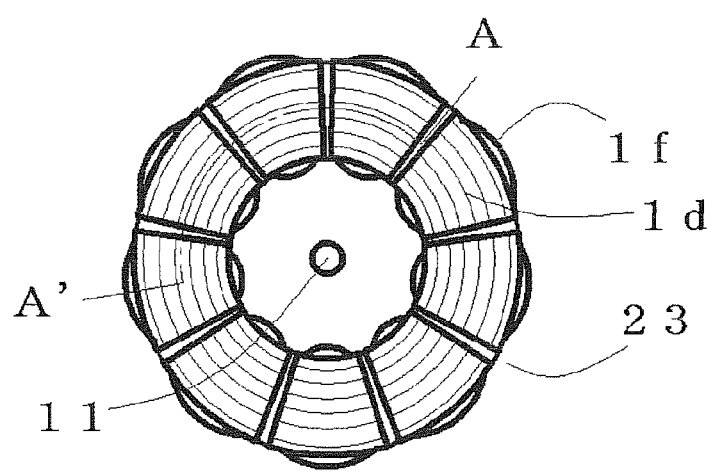
FIG. 2C is a plan view showing the second armature of the rotating electric machine shown in FIG. 1, as seen from the rotor.

FIG. 2C is a plan view showing the second armature of the rotating electric machine shown in FIG. 1, as seen from the rotor. The second armature is same composition as the first armature, and has 9 armature coils 1f. They are arranged repeatedly in circumferential direction as armature coils of U'-phase, V'-phase, and W'-phase. The U-phase armature coil and the U'-phase armature coil belong to the same phase, the V-phase armature coil and the V'-phase armature coil belong to the same phase, the W-phase armature coil and the W'-phase armature coil belong to the same phase. The magnetic teeth 14 and 1d, and the annular magnetic yokes 15 and 1e are composed of powder magnetic core with large specific resistance.

FIG. 2B is a view showing the rotor of the rotating electric machine shown in FIG. 1, as seen from the first armature. The rotor counters with the first armature and the second armature at both axial ends thereof, the first surface magnetic pole part is an opposite side with the first armature, and the second surface magnetic pole part is an opposite side with the second armature, and FIG. 2B shows the first surface magnetic pole part. The first surface magnetic pole part is formed by dividing a circular magnetic substrate at equal intervals mostly by permanent magnets 21, 22 with circumferential direction magnetization, and has the island-shaped magnetic poles 18 and the magnetic salient poles 1b magnetized in different polarity each other alternately in circumferential direction. Permanent magnets 21, 22 that are adjacent to circumferential direction reverse their magnetization direction each other, arrows in permanent magnets 21, 22 indicate magnetization direction. S and N shown in the island-shaped magnetic poles 18 and the magnetic salient poles 1b indicate magnetized polarity, respectively.

Although the second surface magnetic pole part is not illustrated, it has same composition as the first surface magnetic pole part. In the first surface magnetic pole part and the second surface magnetic pole part, the island-shaped magnetic poles 18, 19 are located axially in a line, and the non-magnetic member 1a is disposed between the island-shaped magnetic poles 18, 19. The magnetization direction of permanent magnets on circumferential direction both sides of the island-shaped magnetic poles 18, 19 is set so that the island-shaped magnetic poles 18, 19 are magnetized in same axial direction.

The island-shaped magnetic poles and the magnetic salient poles are connected and are unified with a thin magnetic member in surface of the rotor, so permanent magnets 21, 22 between the island-shaped magnetic pole 18 and the magnetic salient pole 1b are not visible from the surface. In the figure, they are indicated for easier understanding. The island-shaped magnetic poles 18 and the magnetic salient poles 1b consist of powder magnetic core with large specific resistance so that alternating flux can pass through easily. When they have composition with magnetic anisotropy so that magnetic flux cannot flow through in circumferential direction, for example, the composition having silicon steel plate lamination in circumferential direction is applied for them, output torque is further improvable.

Figure 3:
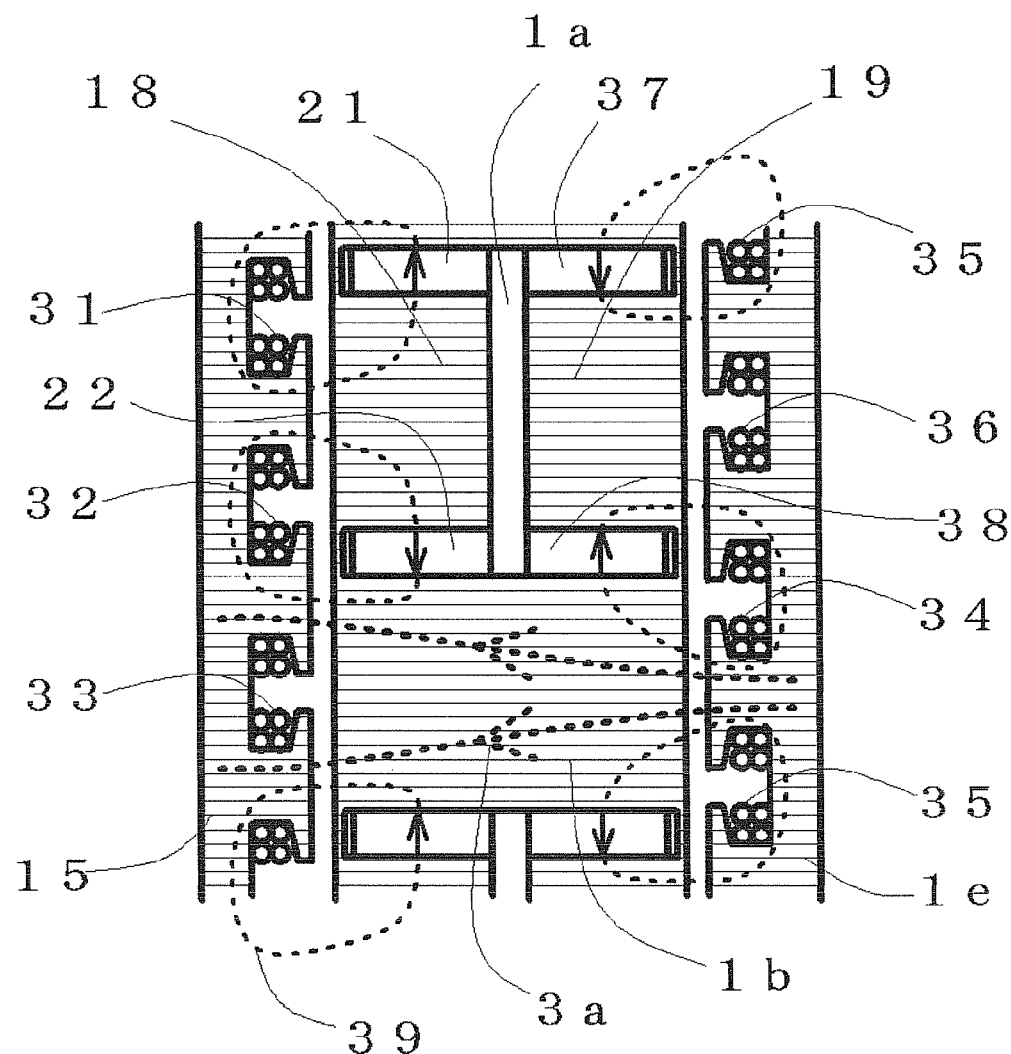
FIG. 3 shows flow of magnetic flux and a sectional view taken along Circumferential direction of the first armature, the rotor and the second armature shown in FIGS. 2A, 2B and 2C.

FIG. 3 shows flow of magnetic flux and a sectional view taken along Circumferential direction A-A' of the first armature, the rotor and the second armature shown in FIGS. 2A, 2B and 2C. Magnetic flux flow coming from the magnetic excitation part, composition of the rotor will be explained referring the figure.

The first surface magnetic pole part and the second surface magnetic pole part of the rotor are formed by dividing a circular magnetic substrate by permanent magnet with circumferential direction magnetization, and have the island-shaped magnetic poles and the magnetic salient poles alternately in circumferential direction. The non-magnetic member 1a is disposed between the island-shaped magnetic poles located axially in a line. Numbers 21, 22, 37, 38 are given to permanent magnets disposed at both sides of the island-shaped magnetic poles. Since magnetization direction of those adjacent permanent magnets is opposite direction mutually and magnetic flux cannot pass through the non-magnetic member 1a easily, the magnetic flux from these permanent magnets tends to flow to the armature side. And the island-shaped magnetic poles 18, 19 are magnetized rightward and the magnetic salient poles 1b are magnetized leftward. Arrows in permanent magnets 21, 22, 37, 38 indicate magnetization direction thereof.

Armature coils of the first armature are shown as armature coils 31, 32, and 33 in the armature coil of U-phase, V-phase, and W-phase, respectively. Armature coils of the second armature are shown as armature coils 34, 35, and 36 in the armature coil of U'-phase, V'-phase, and W'-phase, respectively. U-phase and U'-phase indicate same phase, V-phase and V'-phase indicate same phase, W-phase and W'-phase indicate same phase, respectively. Armature coils of two armatures are configured so that U'-phase armature coil 34 may face the magnetic salient pole 1b when U-phase armature coil 31 faces the island magnetic pole 18. U-phase armature coil 31 and U'-phase armature coil 34 are connected in series to generate magnetic flux in opposite direction when current is flowed. V-phase armature coil 32 and V'-phase armature coil 35, W-phase armature coil 33 and W'-phase armature coil 36 are similarly connected respectively, and all of armature coils are wired to 3 phase as a whole.

Dotted lines 39 represent magnetic flux coming from permanent magnets 21, 22, 37, 38. Direction of the magnetic flux 39 crossing U-phase armature coil 31 is opposite to the magnetic flux 39 crossing U'-phase armature coil 34 each other, direction of the magnetic flux 39 crossing V-phase armature coil 32 is opposite to the magnetic flux 39 crossing V'-phase armature coil 35 each other, direction of the magnetic flux 39 crossing W-phase armature coil 33 is opposite to the magnetic flux 39 crossing w'-phase armature coil 36 each other. Therefore, the generation voltage by the magnetic flux 39 is correctly synthesized as three-phase induced voltage, voltage output waveform of three phase is not influenced even if there is unbalance between flux amounts flowing through the island-shaped magnetic pole and the magnetic salient pole which are adjacent salient poles.

In FIG. 3, flux coming from the magnetic excitation part is indicated by number 3a, is obstructed by the non-magnetic member 1a, does not flow through the island-shaped magnetic poles 18 and 19, and flows through the magnetic salient poles 1b solely. The magnetic flux 3a coming from the magnetic excitation part flows axially through the magnetic salient poles 1b and the magnetic teeth 14, 1d intermittently according to rotation position of the rotor. When the magnetic flux 3a is made flow from the annular magnetic yoke 1e to the annular magnetic yoke 15, directions of the magnetic flux 3a and 39 crossing W-phase armature coil 33, U'-phase armature coil 34, and V'-phase armature coil 35 are the same. Therefore, the magnetic excitation part increases flux amount crossing the armature coil more than case of flux only coming from permanent magnets 21 and 22 and 37 and 38.

As shown in FIG. 1, thickness of the field magnet regions 1g and 1h disposed between the excitation path pole 17 and the annular magnetic yoke 1e changes gradually in radial direction. That is, the field magnet is assumed as parallel connection of permanent magnet elements with different thickness. When the excitation current is supplied to the excitation coil 1j, magnetic potential difference (magnetomotive force) between the excitation path pole 17 and the annular magnetic yoke 1e is almost same in radial direction, and magnetic field intensity equivalent to the value in which the magnetic potential difference is divided by the thickness is added in each magnet element.

Therefore, a permanent magnet element with small thickness is easy to be magnetized, and a permanent magnet element with large thickness is hard to be magnetized. When the field magnet regions 1g and 1h are excited collectively by the excitation current supplied to the excitation coil 1j, magnetic flux concentrates on thinner magnet element by which the magnetic field strength becomes big, and magnet elements where magnetic field strength becomes larger than coercivity are magnetized. When the excitation current supplied to the excitation coil 1j is increased, the field magnet area that magnetization is changed spreads out toward a magnet element with large thickness. Thus, magnetization state of the field magnet can be controlled.

The permanent magnets 21, 22, 37, 38 arranged near the island-shaped salient poles and the magnetic salient poles and the field magnet consist of permanent magnet material. Since the permanent magnets 21, 22, 37, and 38 are exposed to magnetic flux generated by the armature coils, they are composed of neodymium magnet with great product of thickness and coercivity. The product of thickness and coercivity in the field magnet is set up so that a magnetization change may be made by the excitation coil.

The minimum thickness of the field magnet considers it as size from the sum of gap length between the magnetic teeth 14 and the magnetic salient pole 1b, and gap length between the magnetic teeth 1d and the magnetic salient pole 1b, and it is desirable that magnetic flux coming from bigger thickness magnet element is hard to concentrate on smaller thickness magnet element. Further the excitation path pole 17 is desirable to have magnetic saturation flux density almost equal to that of the magnet elements. Magnetic resistance becomes big to magnetic flux concentration beyond saturation flux density for the excitation path pole 17, so magnetic flux from bigger thickness magnet element is hard to concentrate on smaller thickness magnet element.

The field magnet (1g, 1h) is composition that magnet elements with different magnetization easiness are connected in parallel between the excitation path pole 17 and the annular magnetic yoke 1e, as explained above. The width of the area magnetized is changed with amplitude of the excitation current added to the excitation coil 1j, and magnetization direction depends on polarity of the excitation current. Areas with different magnetization direction coexists in the field magnet as shown in FIG. 1. And flux amount flowing into the armature side can be changed by changing the magnetic pole area of each magnetization area.

As explained using FIG. 3, when flux flows from the annular magnetic yoke 1e to the annular magnetic yoke 15, flux amount crossing the armature coil is increased effectually, so the magnet region 1g having leftward magnetization direction parallel to the rotational shaft 11 corresponds to the first magnetization, and the magnet region 1h having inverse magnetization direction thereof corresponds to the second magnetization.

Figure 4A:
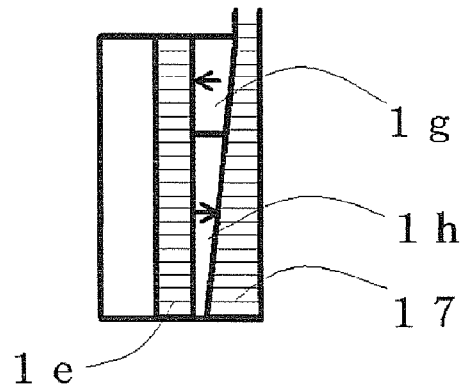
FIGS. 4A, 4B, and 4C are longitudinal sectional views of upper half of the magnetic excitation part of the rotating electric machine shown in FIG. 1.
Figure 4B:
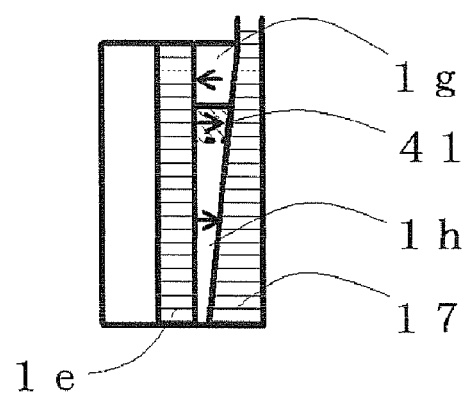
Figure 4C:
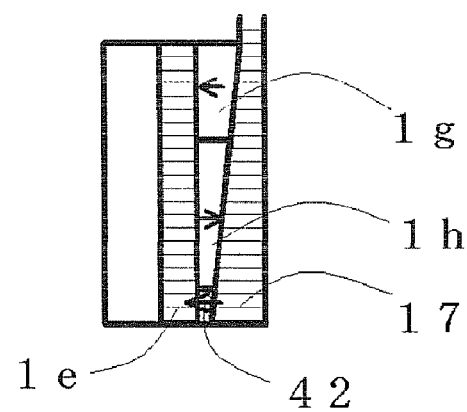

FIGS. 4A, 4B, and 4C show the drawing of longitudinal section in the upper half of the field magnet, the step to change magnetization state thereof will be explained. All the magnet elements having smaller coercivity than magnetic field intensity applied in the field magnet by the excitation coil 1j are magnetized in same direction, so magnetization change of the field magnet is executed as follows. FIG. 4A indicates same magnetization state of the field magnet in FIG. 1.

When magnetic pole area of the field magnet region 1g that is the first magnetization is to be decreased, magnetic pole area of the field magnet region 1h that is the second magnetization is to be expanded. The field magnet region 1h has smaller thickness than the field magnet region 1g, so the excitation current with amplitude and polarity so as to expand the field magnet region 1h is added to the excitation coil 1j to reduce magnetic pole area of the field magnet region 1g from a state of FIG. 4A. That is, the excitation current with amplitude and polarity to magnetize the enlarged field magnet region 1h towards the second magnetization is added to the excitation coil 1j. A shaded portion 41 in the field magnet region 1h corresponds to an increased part of the field magnet region 1h (a decreased pole area of the field magnet region 1g) in FIG. 4B.

In case to increase magnetic pole area of the field magnet region 1g from state of FIG. 4A, the excitation current having following amplitude and polarity is supplied to the excitation coil 1j. The amplitude and polarity thereof is set up so that region equivalent to be expanded area of the first magnetization in the smallest thickness part may be magnetized towards the first magnetization. A shaded portion 42 corresponds to an increased part of the first magnetization in FIG. 4C. In the state of FIG. 4C, magnetic pole area of the first magnetization becomes sum of the magnetic pole area of the field magnet region 1g and the magnetic pole area of the shaded part 42.

In this embodiment, magnetization state of the field magnet can continuously be changed. However, magnetization state of the field magnet will be changed discretely substantially when changing a magnetization state intermittently. Further in this embodiment, the flux adjustment current of a degree which does not make the field magnet cause irreversible magnetization change is supplied to the excitation coil 1j in each magnetization state of the field magnet, and induced flux is superimposed on flux coming from the field magnet and permanent magnets 21, 22, 37, 38, and flux amount flowing through the armature is controlled. In this case, magnetic flux for adjustment will flow through smaller thickness part in the field magnet mainly.

Figure 5:
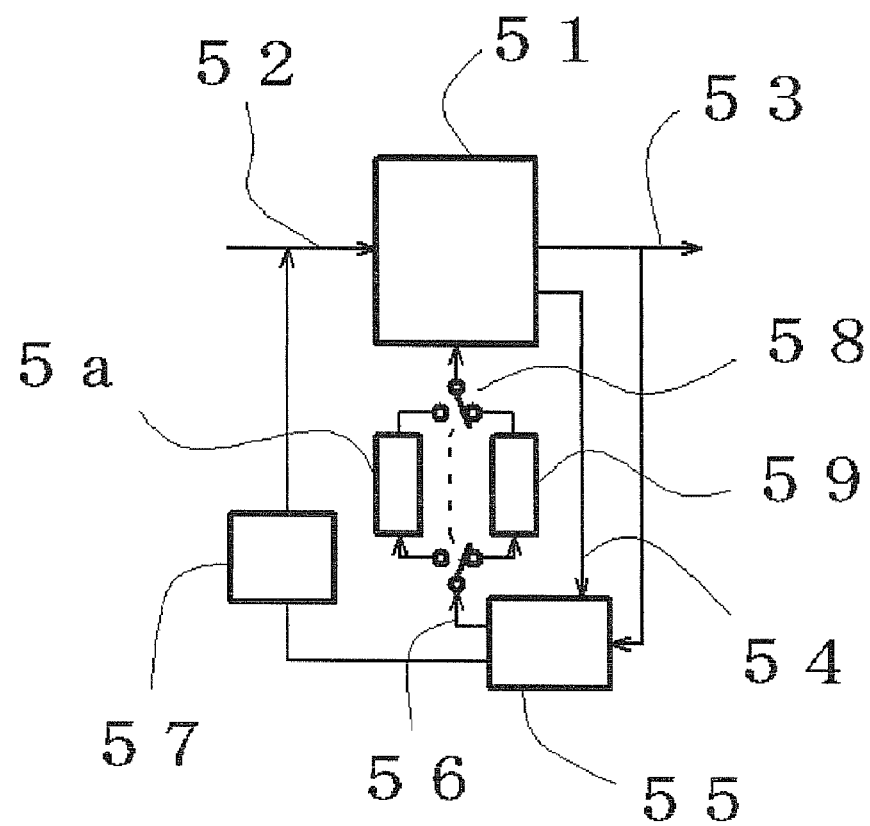
FIG. 5 is a block diagram of a rotating electric machine system for controlling amount of magnetic flux.

FIG. 5 shows a block diagram of the rotating electric machine system for controlling the flux amount. In FIG. 5, the rotating electric machine apparatus 51 has an input 52 and an output 53, and a control device 55 controls the flux amount through a control signal 56 referring to an output 53 and a state signal 54 including positions of the rotor and temperature etc. The number 57 represents a driving circuitry supplying a driving current to the armature coils 16, if. If the rotating electric machine apparatus 51 is used as an electric generator, the input 52 is a rotational force and the output 53 is the electric power. If the rotating electric machine apparatus 51 is used as an electric motor, the input 52 is a driving current supplied to the armature coils 16, if from the driving circuitry 57 and the output is a rotational torque or a rotational speed. The control signal 56 controls a switch 58, a magnetization control circuitry 5a and a flux adjustment circuitry 59. When changing the magnetization state of the field magnet, the magnetization control circuitry 5a is connected by the switch 58 and the excitation current will be supplied to the excitation coil 1j. When adjusting the flux amount crossing the armature coils 16, if, the flux adjustment circuitry 59 is connected by the switch 58 and the flux adjustment current will be supplied to the excitation coil 1j.

Thus, changing the excitation current supplied to the excitation coil 1j, and changing magnetic pole area corresponding to the first magnetization and the second magnetization, flux amount flowing through the armature is controlled. Relationship between flux amount flowing through the armature and the excitation current is set as map data in design phase. However, in mass-production stage of rotating electric machines, precise control of flux amount flowing through the armature may become difficult in presence of variation in component dimension and magnetic property. In such case, the above-mentioned relationship is inspected after assembly of the rotating electric machine, and the above-mentioned map data is corrected.

Furthermore, magnetic substance tends to receive influence by temperature, and when there is also anxious about aging changes, information to correct the above-mentioned map data can be studied by supervising relationship between the excitation current and magnetization state during operation of the rotating electric machine. It is difficult to grasp flux amount flowing through the armature directly, but the flux amount is estimated by referring to generated voltage of the armature coils 16, if.

For example, induced voltage amplitude appearing in armature coils 16 and if is proportional to flux amount through armature coils 16 and if, and rotating speed. Parameters related to the excitation current are corrected so that amplitude of the excitation current on same conditions is increased in case that amplitude change of induced voltage is smaller than expected value as result of having added the excitation current to the excitation coil 1j so as to increase magnetic pole area of the field magnet region 1g, and is decreased in case that amplitude change of induced voltage is larger than expected value.

As described above, in the rotating electric machine apparatus shown in FIGS. 1 to 5, it has been explained that by changing pole area of the field magnet regions 1g and 1h, magnetic flux flowing in the armature can be controlled. This embodiment is system for optimizing output by controlling the flux amount, and control method as the rotating electric machine system will be explained by using FIG. 5.

A rotating electric machine system in which the rotating electric machine apparatus serves as an electric motor and by which the flux amount control is performed to optimize the rotational force control will be explained. The flux adjustment current to increase the flux amount flowing through the armature is assumed as positive in the explanation. When the rotational speed that is the output 53 becomes larger than a predetermined value and the flux amount flowing through the armature is made to be smaller, the flux adjustment current being supplied to the excitation coil 1j from the flux adjustment circuitry 59 is decreased. When the flux adjustment current is smaller than a predetermined value in the case, an excitation current to increase magnetic pole area of the second magnetization is supplied to the excitation coil 1j from the magnetization control circuitry 5a, and magnetic pole area of the first magnetization is decreased as well as magnetic pole area of the second magnetization is increased, and the flux amount flowing through the armature is made smaller. For example, to expand the second magnetization from a state of FIG. 4A, the excitation current with amplitude and polarity to magnetize the enlarged field magnet region 1h towards the second magnetization is supplied to the excitation coil 1j. A shaded portion 41 in the field magnet region 1h corresponds to an increased part of the field magnet region 1h (a decreased pole area of the field magnet region 1g) in FIG. 4B.

When the rotational speed that is the output 53 becomes smaller than a predetermined value and the flux amount flowing through the armature is made to be larger, the flux adjustment current being supplied to the excitation coil 1j from the flux adjustment circuitry 59 is increased. When the flux adjustment current is larger than a predetermined value in the case, an excitation current to increase magnetic pole area of the first magnetization is supplied to the excitation coil 1j from the magnetization control circuitry 5a, and the magnetic pole area of the first magnetization is increased as well as the magnetic pole area of the second magnetization is decreased, and the flux amount flowing through the armature is made larger. For example, to expand the first magnetization from a state of FIG. 4A, the excitation current with amplitude and polarity to magnetize a region equivalent to an expanded part (a shaded portion 42 in FIG. 4C) of the first magnetization in the second magnet region 1h towards the first magnetization is added to the excitation coil 1j.

A constant-voltage power generation system in which the rotating electric machine apparatus serves as an electric generator and by which the flux amount control is performed to control the power generation voltage to be a predetermined voltage will be explained.

When the power generation voltage that is the output 53 becomes larger than a predetermined value and the flux amount flowing through the armature is made to be smaller, the flux adjustment current being supplied to the excitation coil 1j from the flux adjustment circuitry 59 is decreased. When the flux adjustment current is smaller than a predetermined value in the case, an excitation current to increase the magnetic pole area of the second magnetization is supplied to the excitation coil 1*j* from the magnetization control circuitry 5*a*, and the magnetic pole area of the first magnetization is decreased as well as the magnetic pole area of the second magnetization is increased, and the flux amount flowing through the armature is made smaller.

When the power generation voltage that is the output 53 becomes smaller than a predetermined value and the flux amount flowing through the armature is made to be larger, the flux adjustment current being supplied to the excitation coil 1*j* from the flux adjustment circuitry 59 is increased. When the flux adjustment current is larger than a predetermined value in the case, an excitation current to increase the magnetic pole area of the first magnetization is supplied to the excitation coil 1*j* from the magnetization control circuitry 5*a*, and the magnetic pole area of the first magnetization is increased as well as the magnetic pole area of the second magnetization is decreased, and the flux amount flowing through the armature is made larger.

Although the non-magnetic member 1*a* has been arranged between the island-shaped magnetic poles 18, 19 in this embodiment, composition having a permanent magnet instead of the non-magnetic member 1*a* is possible. In that case, magnetic flux amount flowing through the armature is increased. Furthermore, it is also possible to replace the island-shaped magnetic poles 18, 19 and the non-magnetic member 1*a* and permanent magnets 21, 22, 37, 38 with a permanent magnet that has rightward magnetization.

In this embodiment, an excitation flux for making a magnetization change of the field magnet flows through the armature coil, and generates voltage in the armature coil. The voltage amplitude appearing in the armature coil can be reduced by applying the excitation current having waveform with gradual time change as much as possible. That waveform is synonymous to a waveform that frequency spectrum concentrates on the low frequency side. For example, a raised cosine pulse and a Gaussian pulse, etc. are effective as excitation current waveform supplied to the excitation coil to suppress the voltage amplitude.

Although the field magnet is configured in parallel with different thickness of the magnet elements in this embodiment, the field magnet with similar features can consist of the magnet elements with constant thickness and different coercivity in parallel. In case of the latter, the magnetic resistance which regarded each magnet element as a gap is constant, so magnetic flux concentration to the magnet element with small thickness is avoided, and the above composition can be achieved easily by parallel connection of magnet element with the different magnet material.

The rotating electric machine system according to a second embodiment of the present invention will be explained with reference to FIGS. 6 to 8. The second embodiment is a rotating electric machine system that a magnetic excitation part does not have a field magnet and controls flux amount flowing through an armature by an electric current.

Figure 6:
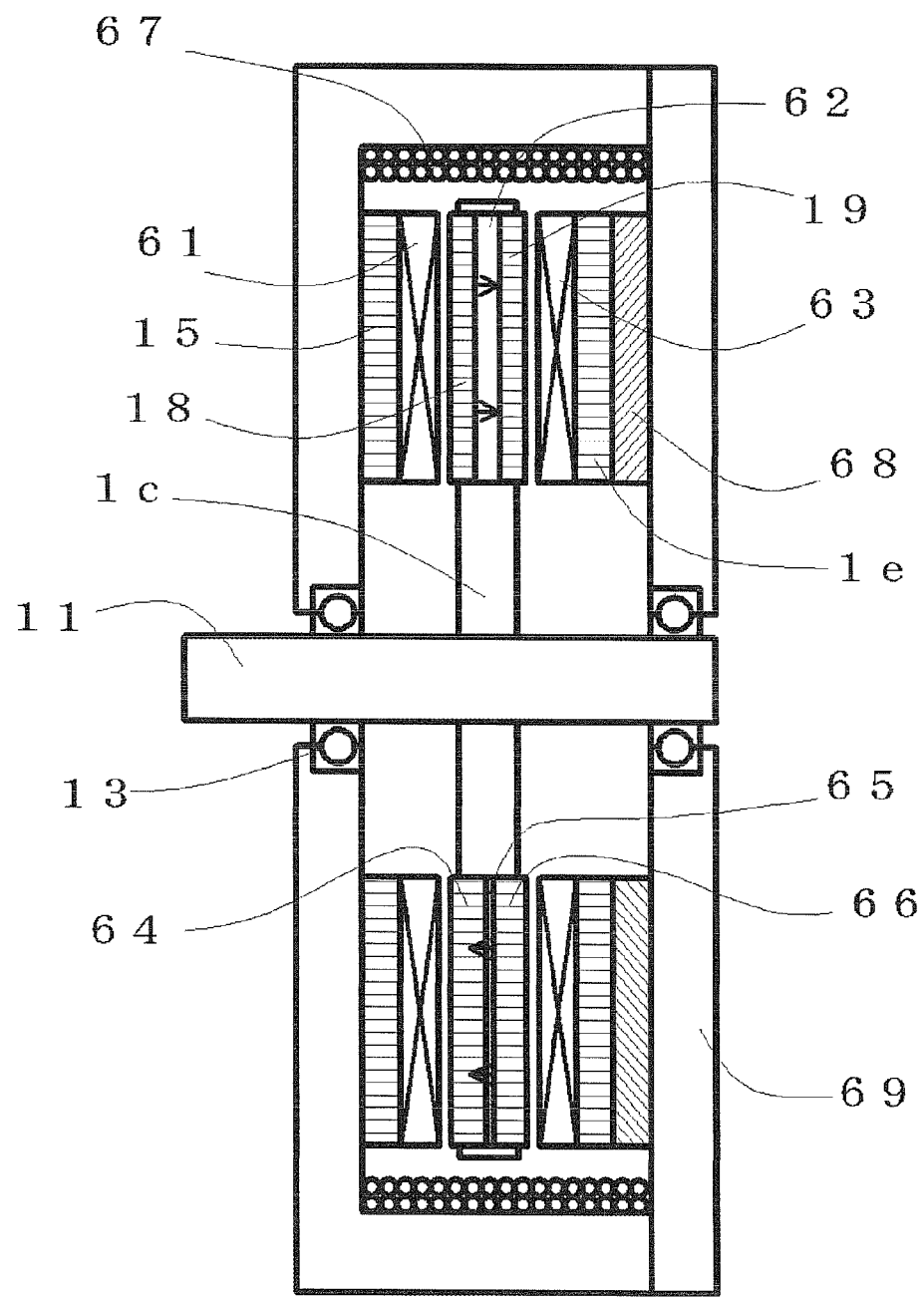
FIG. 6 is a longitudinal sectional view of a rotating electric machine apparatus according to the second embodiment of the present invention.

FIG. 6 shows a longitudinal sectional view of the embodiment in which the present invention is applied to a rotating electric machine apparatus having an axial gap structure, double stators. Although rotor composition is almost the same as the first embodiment shown in FIG. 1, a permanent magnet 62 is disposed between the island-shaped magnetic poles 18 and 19, and a permanent magnet 65 is disposed between the magnetic salient poles 64 and 66. Thickness of the permanent magnet 65 is smaller than that of the permanent magnet 62. Arrows in the permanent magnets 62 and 65 indicate magnetization direction. The permanent magnet magnetizes the island-shaped magnetic poles 18 and 19 while being an isolation member between the island-shaped magnetic poles 18 and 19, the permanent magnet 65 magnetizes the magnetic salient poles 64 and 66 while being an isolation member between the magnetic salient poles 64 and 66.

As viewed in FIG. 6, the first armature disposed at left side has armature coils 61 in circumferential direction at axial end surface of an annular magnetic yoke 15, and the second armature disposed at right side has armature coils 63 in circumferential direction at axial end surface of an annular magnetic yoke 1*e*.

A magnetic excitation part is composed of a housing 69 consisted of magnetic material, an excitation coil 67 disposed in inner side of the housing 69, and a non-magnetic member 68 arranged for magnetic resistance adjustment of excitation flux path, and supplies magnetic flux to the armature coils and the rotor through the annular magnetic yokes 15 and 1*e*. The non-magnetic member 68 is constituted from a aluminum block with good thermal conductivity.

Figure 7A:
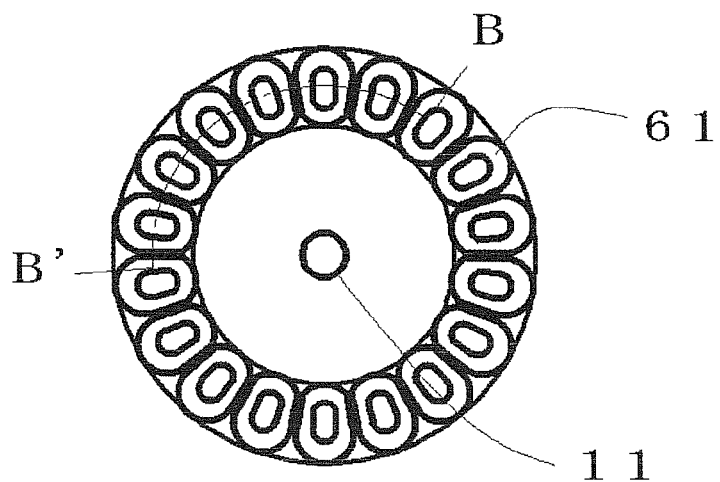
FIG. 7A is a plan view of the surface of the first surface magnetic pole part of the rotating electric machine shown in FIG. 6, as seen from the left removing the arts thereabove.

FIG. 7A is a plan view of the surface of the first surface magnetic pole part of the rotating electric machine shown in FIG. 6, as seen from the left removing the arts thereabove. Armature coils of the first armature magnetic pole group and armature coils of the second armature magnetic pole group are disposed at the annular magnetic yoke 15 in different circumferential position. Armature coils of U-phase, V-phase, W-phase, U'-phase, V'-phase, and W'-phase are disposed repeatedly in circumferential direction, 18 armature coils are arranged to six magnetic poles of the rotor. The armature coils of U phase, V-phase, and W-phase belong to the first armature magnetic pole group, and the armature coils of U'-phase, V'-phase, and W'-phase belong to the second armature magnetic pole group. The plan view of the second armature is not shown, but it is the completely same composition as the first armature.

Figure 7B:
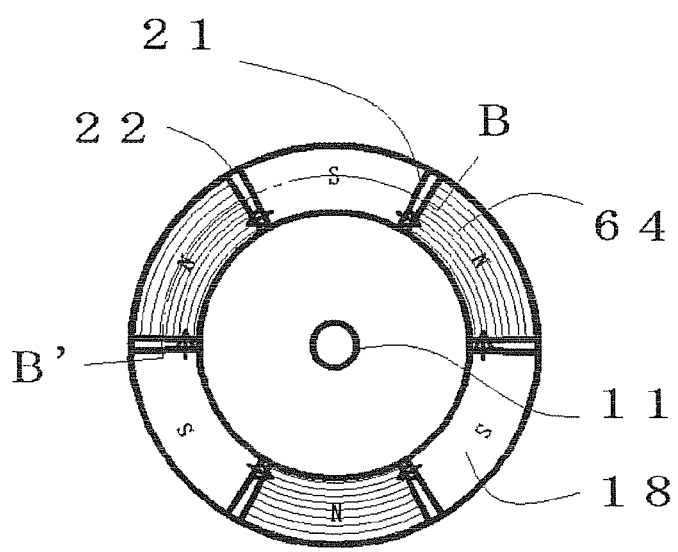
FIG. 7B is a view showing the armature portion of the rotating electric machine shown in FIG. 6, as seen from the first surface magnetic pole part.

FIG. 7B is a view showing the armature portion of the rotating electric machine shown in FIG. 6, as seen from the first surface magnetic pole part, and is completely the same as FIG. 2B. The rotor of this embodiment is the same composition as the rotor of the first embodiment except having arranged the permanent magnet 62 between the island-shaped magnetic poles 18, 19, and having arranged the permanent magnet 65 between the magnetic salient poles 64, 66, and since the plan view is the same, further explanation is omitted.

Figure 8:
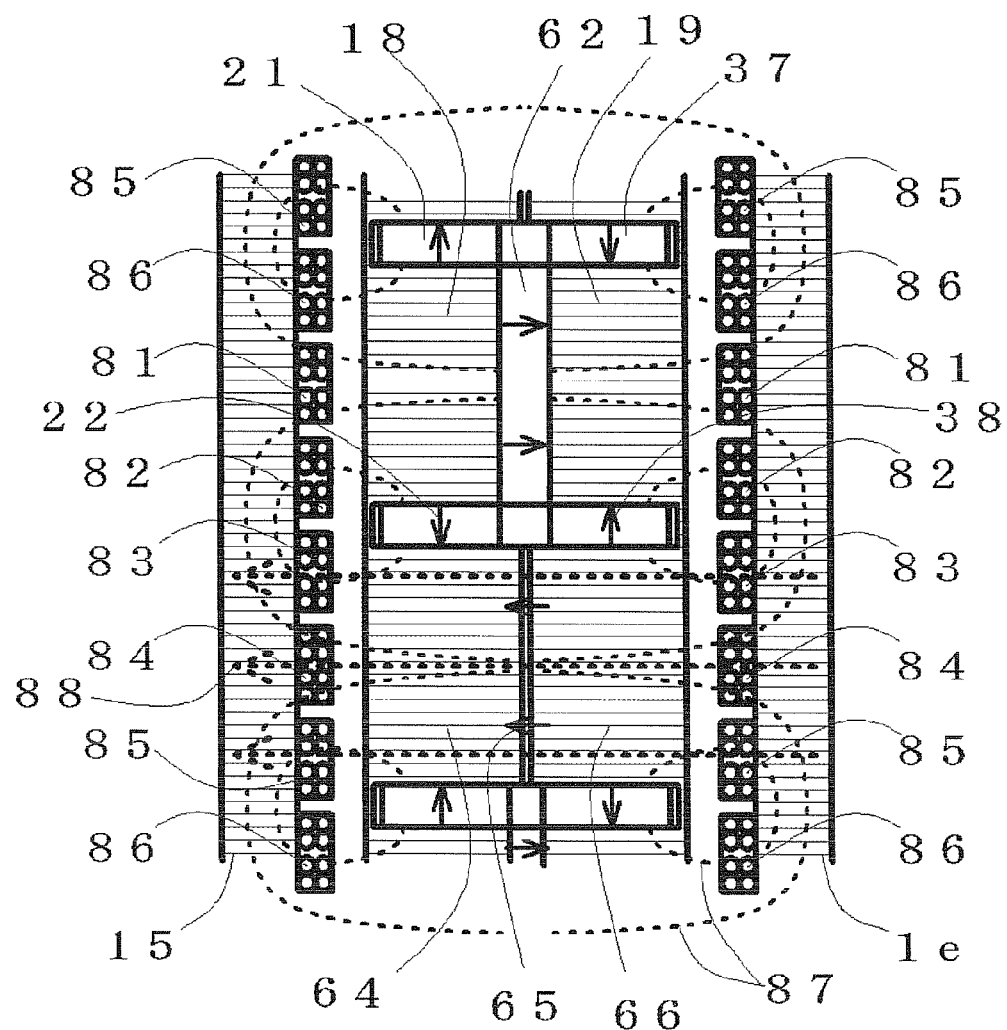
FIG. 8 is showing magnetic flux flow and a sectional view taken along Circumferential direction of the first armature, the rotor and the second armature shown in FIGS. 7A, and 7B.

FIG. 8 is showing magnetic flux flow and a sectional view taken along Circumferential direction B-B' showing the first armature, the rotor and the second armature shown in FIGS. 7A, and 7B. Magnetic flux flow by the magnetic excitation part, composition of the rotor will be explained referring to the figure. The rotor composition is almost the same as the composition of the first embodiment shown in FIG. 3 except having arranged the permanent magnets 62 and 65.

Armature coils 61 of the first armature are shown as armature coils 81, 82, 83, 84, 85, and 86 in the armature coils of U-phase, V-phase, W-phase, U'-phase, V'-phase, and W'-phase, respectively. The armature coils 63 of the second armature are also the same composition, and the respectively same number is given to the armature coil of each phase. Armature coils of two armatures are configured so that U'-phase armature coil 84 may face the magnetic salient pole 64 (66) when U phase armature coil 81 faces the island-shaped magnetic pole 18 (19). U-phase armature coil 81 and U'-phase armature coil 84 are connected in series to generate magnetic flux in opposite direction when current flows. V-phase armature coil 82 and V'-phase armature coil 85, W-phase armature coil 83 and W'-phase armature coil 86 are similarly connected respectively, and all of armature coils are wired to 3 phase as a whole.

Dotted lines 87 represent magnetic flux from permanent magnets 21, 22, 37, 38, 62, 65. Direction of the magnetic flux 87 crossing U-phase armature coil 81 is opposite to the magnetic flux 87 crossing U'-phase armature coil 84 each other, direction of the magnetic flux 87 crossing V-phase armature coil 82 is opposite to the magnetic flux 87 crossing V'-phase armature coil 85 each other, direction of the magnetic flux 87 crossing W-phase armature coil 83 is opposite to the magnetic flux 87 crossing w'-phase armature coil 86 each other. Therefore, the generation voltage by the magnetic flux 87 is correctly synthesized as three-phase induced voltage, voltage output waveform of three phase is not influenced even if there is unbalance between flux amounts flowing through the island-shaped magnetic pole and the magnetic salient pole which are adjacent salient poles.

When letting magnetic flux flow between the annular magnetic yokes 15 and 1e from the magnetic excitation part, thickness of the permanent magnet 62 is set up larger than that of the permanent magnet 65, so the flux will not flow through the island-shaped magnetic poles 18 and 19 for the sake of the permanent magnet 62, and will flow through the magnetic salient pole 64 and 66 solely. When a permanent magnet generally is disposed in the middle of flux path, magnetic flux amount from the permanent magnet is fixed mostly, permeability of the permanent magnet is close to an air gap, so the permanent magnet with big thickness can be applied as the isolation member of bi-directional magnetic flux. Permanent magnets 21, 22, 37, 38, 62, 65 near the armature are composed of neodymium magnet (NdFeB) with large coercivity in this embodiment, and magnetic flux coming from the magnetic excitation part is not strong to influence their magnetization state. Moreover, the magnetic flux coming from the magnetic excitation part passes the permanent magnet 65, and does not pass the permanent magnet 62 easily because thickness of the permanent magnet 65 is larger than that of the permanent magnet 62.

In FIG. 8, flux coming from the magnetic excitation part is indicated by number 88, is obstructed by the permanent magnet 62, does not flow through the island-shaped magnetic poles 18 and 19, and always flows through the magnetic salient poles 64, 66 solely. When the magnetic flux 88 is made flow from the annular magnetic yoke 1e to the annular magnetic yoke 15, directions of the magnetic flux 88 and 87 crossing W-phase armature coil 83, U'-phase armature coil 84, and V'-phase armature coil 85 are the same. Therefore, the magnetic excitation part increases flux amount crossing the armature coil more than case of flux only from permanent magnets 21, 22, 37, 38, 62 and 65.

The magnetic excitation part is composed of the housing 69 consisted of magnetic material, the excitation coil 67 disposed in inner side of the housing 69, and the non-magnetic member 68 arranged for magnetic resistance adjustment of excitation flux path, and supplies magnetic flux between the annular magnetic yokes 15 and 1e. Magnetic flux coming from the magnetic excitation part flows through a flux path that is composed of the housing 69, the annular magnetic yoke 1e, the magnetic salient poles 66 and 64, and the annular magnetic yoke 15.

In this embodiment, three flux paths exist in axial direction, and they are connected in parallel. The first flux path is constituted by the annular magnetic yoke 15, the island-shaped magnetic pole 18, the permanent magnet 62, the island-shaped magnetic pole 19, and the annular magnetic yoke 1e. The second flux path is constituted by the annular magnetic yoke 15, the magnetic salient pole 64, the permanent magnet 65, the magnetic salient pole 66, and the annular magnetic yoke 1e. And the third flux path is constituted by the annular magnetic yoke 15, the housing 69, the non-magnetic member 68, and the annular magnetic yoke 1e. Although, flux coming from permanent magnets 21, 22, 37, and 38 flows in small flux path including the annular magnetic yokes 15, 1e and the magnetic salient poles 64, 66, as shown in FIG. 8, flux from permanent magnets 62, 65 may flow through the third flux path. Magnetic resistance of the third flux path is arranged larger than that of the second flux path by disposing the non-magnetic member 68 between the housing 69 and the annular magnetic yoke 1e so that flux coming from the permanent magnets 62, 65 may not be short-circuited through the third flux path.

In this embodiment, the armature coils 61, 63 are described as concentration winding, distribution winding can be applied in the course. The armature coils 61, 63 are wound around empty core, so there is an advantage that occurrence of cogging torque is restrained. Composition with the armature coils 61, 63 wound around magnetic teeth is also possible, and improvement of output is expected in that case. Moreover, the island-shaped magnetic poles 18 and 19 can be composed as one permanent magnet including permanent magnets 21, 22, 37, 38, and 62. This invention can be applied to any composition mentioned above and chosen according to the specification of rotating electric machines.

In this embodiment, in order to set magnetic resistance of the third flux path as size, the non-magnetic member 68 has been arranged, but it is also possible to arrange a permanent magnet instead of the non-magnetic member 68 with almost same thickness. In the case, permeability of the permanent magnet is same as air gap mostly, so setting of magnetic resistance of the third flux path can assume the same, and magnetic flux coming from the permanent magnet can assume additional fixed portion of flux flowing through the armature.

The resistance of the third flux path is set more greatly than the resistance of the second flux path by arranging the non-magnetic member 68 in the third flux path in this embodiment, and, of course, it is possible to remove the non-magnetic member 68 and to assume the resistance of the third flux path to be a smallness. In that case, the magnetic flux coming from the permanent magnets 62, 65 flows into the third flux path, and the amount of magnetic flux crossing through the armature coils 61, 63 decreases. Although the relation between the amount of magnetic flux crossing through armature coils 61, 63 and the current supplied to the excitation coil 67 changes a little, but it is unchanged that the excitation coil 67 can control the amount of magnetic flux crossing through armature coils 61, 63 by an electric current supplied.

The rotating electric machine system according to a third embodiment of the present invention will be explained with reference to FIGS. 9 to 12. The third embodiment is a rotating electric machine system having an axial gap structure, two rotors, and a magnetic excitation part in a static side.

Figure 9:
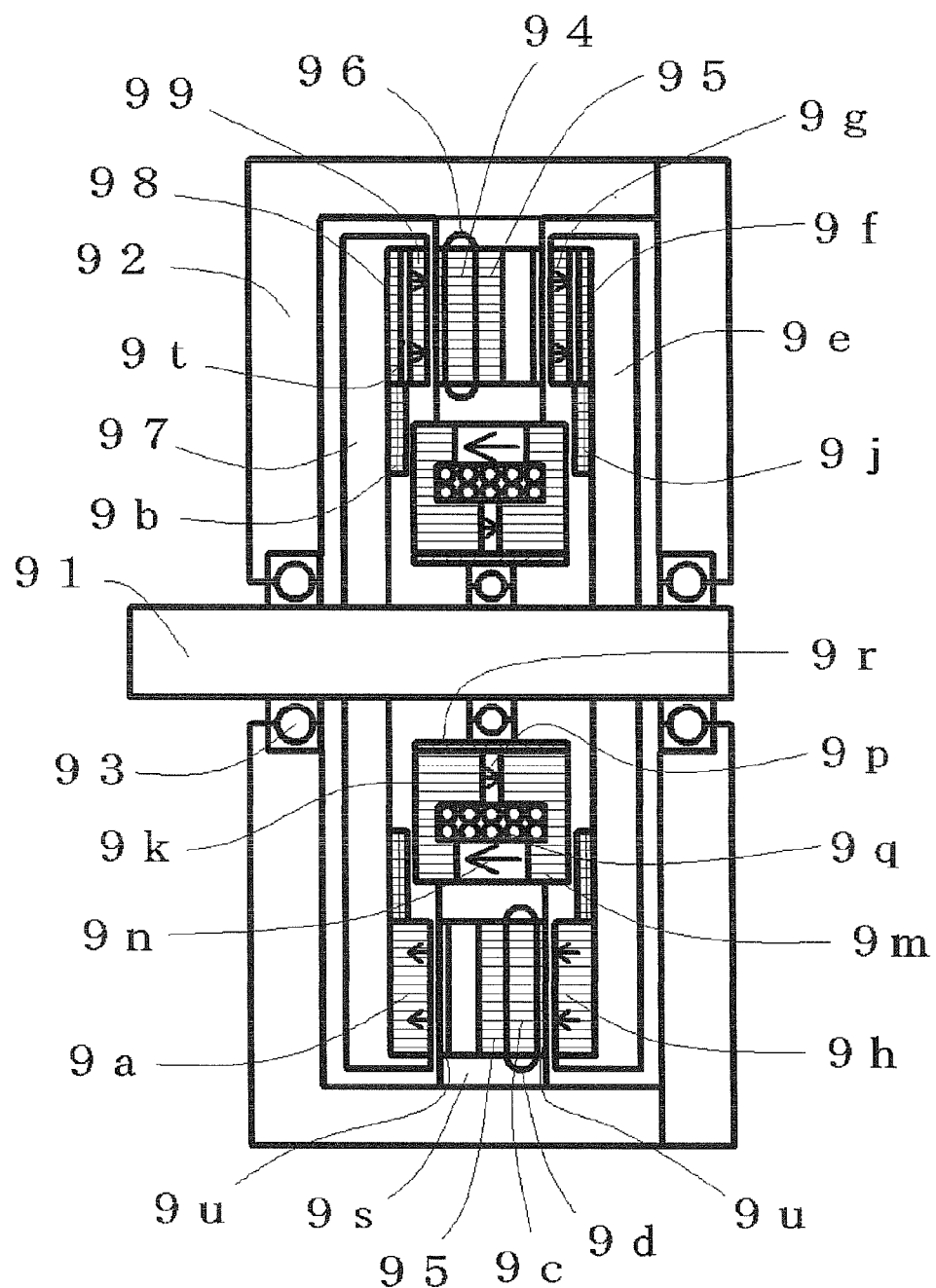
FIG. 9 is a longitudinal sectional view of a rotating electric machine apparatus according to the third embodiment of the present invention.

FIG. 9 shows a longitudinal sectional view of the embodiment in which the present invention is applied to a rotating electric machine apparatus having an axial gap structure and two rotors. The armature has a first armature magnetic pole group and a second armature magnetic pole group respectively on axial both ends of an annular magnetic yoke 95 fixed to a housing 92 by an armature support. The first armature magnetic pole group has magnetic teeth 94 extending parallel with a rotational shaft 91 to left from the annular magnetic yoke 95 and armature coils 96 wound around the magnetic teeth 94, the second armature magnetic pole group has magnetic teeth 9c extending parallel with the rotational shaft 91 to right from the annular magnetic yoke 95 and armature coils 9d wound around the magnetic teeth 9c. A number 9u represents a magnetic teeth front plate arranged at tip of the magnetic teeth 94 and the magnetic teeth 9c, respectively.

The rotational shaft 91 is supported rotatably by the housing 92 through bearings 93, a first rotor 97 and a second rotor 9e rotate with the rotational shaft 91 and face both axial ends of the armature, respectively. The first rotor 97 has a first surface magnetic pole part having island-shaped magnetic poles 99 embedded in a circular magnetic substrate 98 and magnetic salient poles 9a that are a part of the circular magnetic substrate 98 alternately in circumferential direction, and faces the magnetic teeth 94. The second rotor 9e has a second surface magnetic pole part having island-shaped magnetic poles 9g embedded in a circular magnetic substrate 9f and magnetic salient poles 9h that are a part of the circular magnetic substrate 9f alternately in circumferential direction, and faces the magnetic teeth 9c. A number 9t represents an isolation member arranged between the island-shaped magnetic poles 99 and the circular magnetic substrate 98, and the isolation member arranged between the island-shaped magnetic poles 9g and the circular magnetic substrate 9f, and the non-magnetic material is arranged there. The isolation member is not arranged between the magnetic salient poles and the circular magnetic substrate. Arrows in island-shaped magnetic poles 99, 9g and magnetic salient poles 9a, 9h indicate magnetization direction by permanent magnets not shown in the figure.

The magnetic excitation part is disposed at inner region of the armature, and faces a magnetic annular plate 9b connected to the circular magnetic substrate 98 and a magnetic annular plate 9j connected to the circular magnetic substrate 9f through minute gap so that the circular magnetic substrates 98, 9f are magnetized in opposite magnetic polarity each other. The magnetic excitation part is circular shape around the rotational shaft 91, and principal part thereof includes excitation path poles 9k, 9m, a first magnet element 9p, a second magnet element 9n, an excitation coil 9e. That is, the field magnet consists of the first magnet element 9p and the second magnet element 9n, parameters of the first magnet element 9p and the second magnet element 9n, such as each magnetic pole surface area and saturation magnetic flux density, etc. are set up so that the first magnet element 9p and the second magnet element 9n may make almost an equivalent amount of magnetic flux flow to the armature, respectively. The magnetic annular plates 9b and 9j consist of soft iron plate so that alternating flux may be hard to pass through. A number 9r indicates a conductor layer arranged so that inductance of the excitation coil 9q may be decreased and induced magnetic flux may be concentrated in a flux path.

Figure 10A:
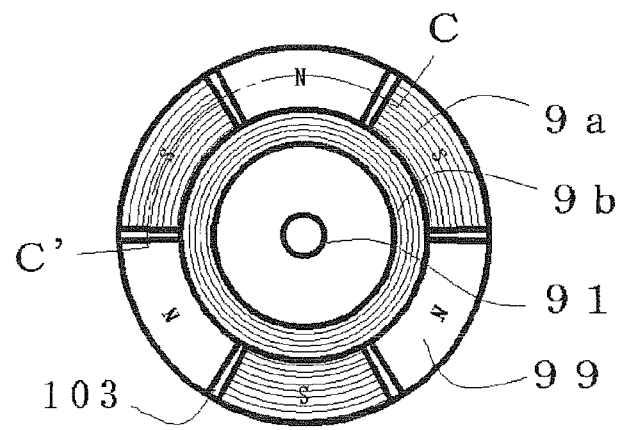
FIG. 10A is a plan view of the surface of the first surface magnetic pole part of the rotating electric machine shown in FIG. 9, as seen from the left removing the arts thereabove.

FIG. 10A is a plan view of the surface of the first surface magnetic pole part of the rotating electric machine shown in FIG. 9, as seen from the left removing the arts thereabove. The magnetic salient poles 9a that are a part of the circular magnetic substrate 98 and the island-shaped magnetic poles 99 are disposed alternately in circumferential direction, and are magnetized in different polarity with each other by permanent magnets not shown in the figure. FIG. 10C is a plan view showing the second surface magnetic pole part of the rotating electric machine shown in FIG. 9, as seen from the armature. The magnetic salient poles 9h that are a part of the circular magnetic substrate 9f and the island-shaped magnetic poles 9g are disposed alternately in circumferential direction, and are magnetized in different polarity with each other by permanent magnets not shown in the figure. N and S shown in the island-shaped magnetic poles 99, 9g and the magnetic salient poles 9a, 9h indicate magnetized polarity on opposition side with the armature, respectively.

The island-shaped magnetic poles and the magnetic salient poles are connected and are unified with thin magnetic members at surface of the rotor, so boundaries between the island-shaped magnetic poles and the magnetic salient poles are not visible from the surface. In the figure, they are indicated separately for easier understanding. A number 103 at boundary of the island-shaped magnetic pole and the magnetic salient pole indicates a magnetic gap. Island-shaped magnetic poles 99 and 9g are disposed so that they may oppose axially through the armature, magnetic salient poles 9a and 9h are disposed so that they may oppose axially through the armature. The circular magnetic substrates 98 and 9f consist of powder magnetic core with large specific resistance.

Figure 10B:
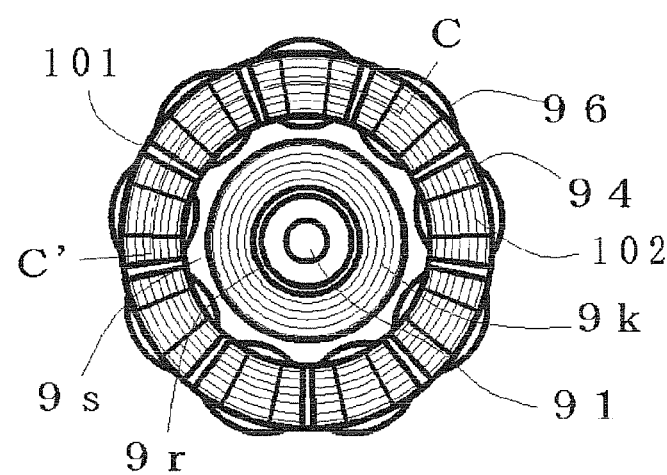
FIG. 10B is a view showing the armature portion of the rotating electric machine shown in FIG. 9, as seen from the first surface magnetic pole part.
Figure 10C:
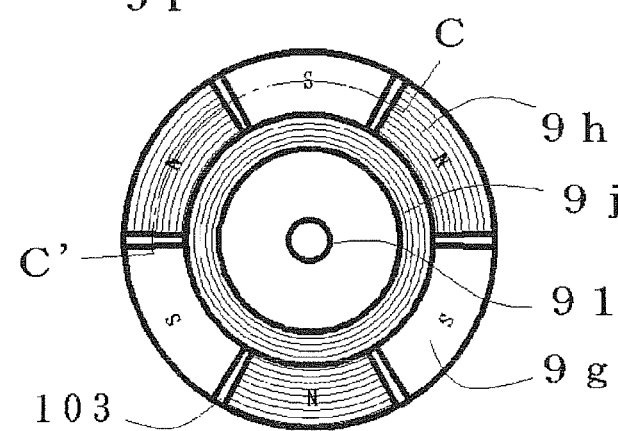
FIG. 10C is a plan view showing the second surface magnetic pole part of the rotating electric machine shown in FIG. 9, as seen from the armature.

The armature is composition that the first armature magnetic pole group and the second armature magnetic pole group are disposed axially, FIG. 10B is a view showing the armature portion of the rotating electric machine shown in FIG. 9, as seen from the first surface magnetic pole part. The magnetic teeth front plate 9u is arranged at tip of the magnetic teeth 94, faces the rotor, and is configured so that adjacent magnetic teeth 94 extensions may oppose each other through a magnetic gap 101. The armature coils 96 are wound around the magnetic teeth 94, 9 armature coils 96 are arranged in this embodiment. They are arranged repeatedly in circumferential direction as armature coils of U-phase, V-phase, and W-phase.

Although plan view of the second armature magnetic pole group is not illustrated, it is same composition as the first armature magnetic pole group, and has 9 armature coils 9d. They are arranged repeatedly in circumferential direction as armature coils of U'-phase, V'-phase, and W'-phase. U-phase and U'-phase indicate same phase, V-phase and V'-phase indicate same phase, W-phase and W'-phase indicate same phase, respectively. Armature coils of two groups are configured so that U'-phase armature coil may face the magnetic salient pole 9h when U phase armature coil faces the island-shaped magnetic pole 99, U-phase armature coil and U'-phase armature coil are connected in series to generate magnetic flux in the opposite direction each other when current is flowed. V-phase armature coil and V'-phase armature coil, W-phase armature coil and W'-phase armature coil are similarly connected respectively, and all of armature coils are wired to 3 phase as a whole.

A number 102 shows concave formed in surface of the magnetic teeth front plate 9u, and it is prepared in order to control axial magnetic force produced between the rotor and the armature. The magnetic teeth 94 and 9c, and the annular magnetic yoke 95 are composed of powder magnetic core with large specific resistance. The magnetic teeth front plate 9u is constituted integrating powder magnetic core and a non-magnetic member for the magnetic gap 101.

Figure 11:
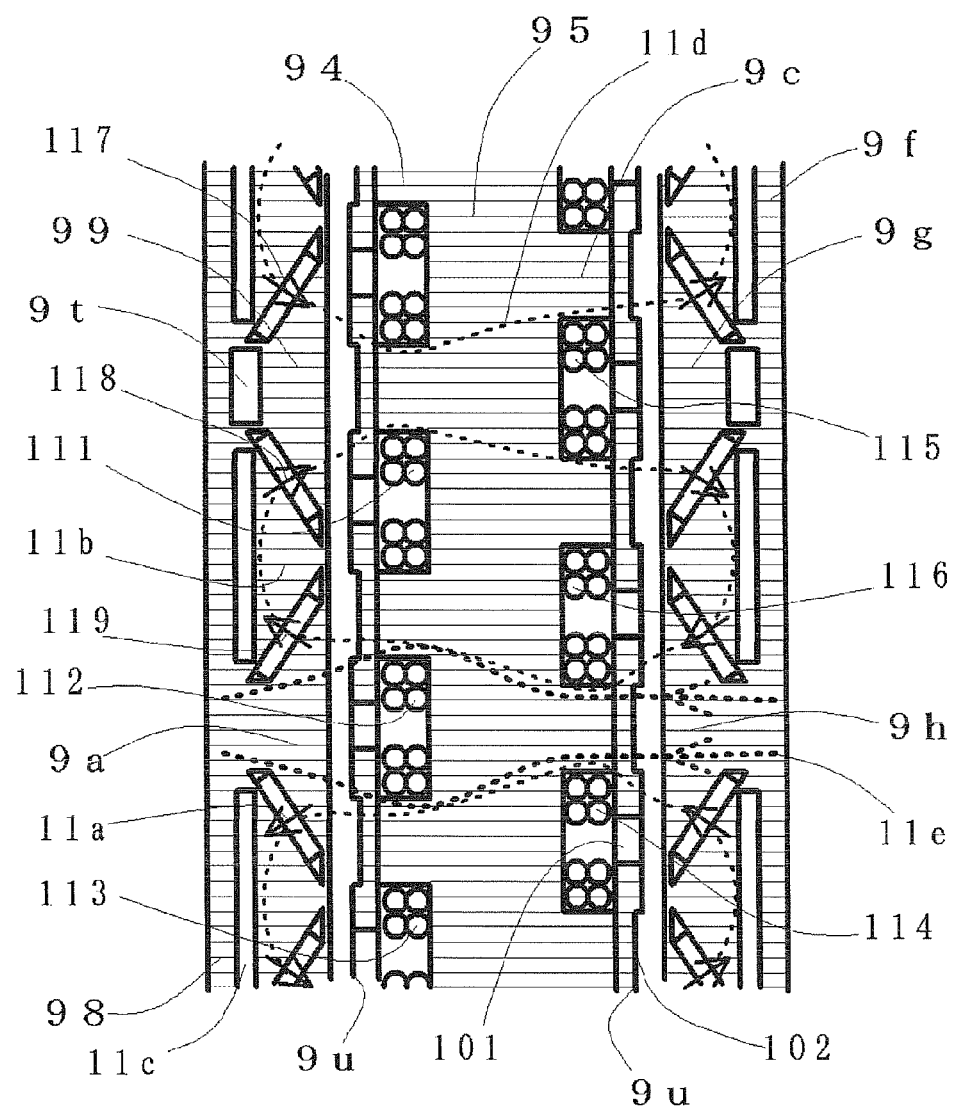
FIG. 11 shows flow of magnetic flux and a sectional view taken along Circumferential direction of the first surface magnetic pole part, the armature and the second surface magnetic pole part shown in FIGS. 10A, 10B and 10C.

FIG. 11 shows flow of magnetic flux and a sectional view taken along Circumferential direction C-C' of the first surface magnetic pole part, the armature and the second surface magnetic pole part shown in FIGS. 10A, 10B and 10C. Magnetic flux flow by the magnetic excitation part, composition of the first surface magnetic pole part and the second surface magnetic pole part will be explained referring the figure.

The first surface magnetic pole part and the second surface magnetic pole part are configured in the same way, and only permanent magnets in the first surface magnetic pole part are numbered. Permanent magnets 117 and 118 are arranged on circumferential both sides of the island-shaped magnetic pole 99. Permanent magnets 119 and 11a are arranged on circumferential both sides of the magnetic salient pole 9a. These permanent magnets 117, 118, 119, 11a are shape extending from the outer to the inner circumference, magnetization direction thereof is set to magnetize the island-shaped magnetic pole 99 in N pole and the magnetic salient pole 9a in S pole. Permanent magnets 118 and 119 have magnetization in almost same circumferential direction, and form a magnet assembly together with intermediate part 11b of the circular magnetic substrate 98. That is, the uniform circular magnetic substrate 98 is periodically sectioned with the magnet assembly, and the island-shaped magnetic poles 99 and the magnetic salient poles 9a are formed. A non-magnetic member 11c is arranged so that magnetic flux coming from the magnetic excitation part should not pass over the magnet assembly.

Further, the isolation member 9t composed of a non-magnetic member is disposed in the island-shaped magnetic pole 99. Therefore, the island-shaped magnetic pole 99 is a part that is separated like an island by permanent magnets 117 and 118 and the isolation member 9t. The magnetic salient poles 9a are mutually connected as a part of the magnetic rotor base 98, even if permanent magnets 119 and 11a are arranged at both sides thereof in circumferential direction. The magnetic pole composition of the second surface magnetic pole part is constituted by symmetrical form about the armature in the first surface magnetic pole part, magnetization direction of permanent magnet arranged at each surface magnetic pole part is constituted as opposite to each other. Arrows in permanent magnets 117, 118, 119, and 11a indicate each magnetization direction.

The circular magnetic substrate of the rotor is composed of powder magnetic core, permanent magnets 117, 118, 119, and 11a are configured by inserting permanent magnet blocks in radial direction slots formed in the circular magnetic substrate, and resin blocks that are non-magnetic material are inserted in slots corresponding to the isolation member 9t, the non-magnetic member 11c. Moreover, permanent magnet blocks can also be inserted from the surface to slots for permanent magnet blocks formed at surface of the circular magnetic substrate.

In FIG. 11, armature coils of the first armature magnetic pole group are shown as armature coils 111, 112, and 113 in the armature coil of U-phase, V-phase, and W-phase, respectively. Armature coils of the second armature magnetic pole group are shown as armature coils 114, 115, and 116 in the armature coil of U'-phase, V'-phase, and W'-phase, respectively. Armature coils of two groups are configured so that U'-phase armature coil 114 may face the magnetic salient pole 9h when U-phase armature coil 111 faces the island magnetic pole 99. U-phase armature coil 111 and U'-phase armature coil 114 are connected in series to generate magnetic flux in opposite direction each other when current is flowed. V-phase armature coil 112 and V'-phase armature coil 115, W-phase armature coil 113 and W'-phase armature coil 116 are similarly connected respectively, and all of armature coils are wired to 3 phase as a whole.

The annular magnetic yoke 95 and the magnetic teeth 94 and 9c are constituted as a unity, the armature coils 111, 112, 113, 114, 115, and 116 are arranged, respectively, and then the magnetic teeth front plate 9u is disposed in opposite side with the rotor, respectively. Thus the armature is constituted. The plan view of the magnetic teeth front plate 9u is shown in FIG. 10B, and consists of powder magnetic core except the magnetic gap 101. Thus, arrangement of the armature coil becomes easy by applying the magnetic teeth front plate 9u, and the thick copper wire with low electrical resistance can be used for the armature coil.

A dotted lines 11d represent magnetic flux coming from permanent magnets arranged at sides of the island-shaped magnetic poles 99 and 9g and the magnetic salient poles 9a and 9h. Direction of the magnetic flux 11d crossing U-phase armature coil 111 is opposite to the magnetic flux 11d crossing U'-phase armature coil 114 each other, direction of the magnetic flux 11d crossing V-phase armature coil 112 is opposite to the magnetic flux 11d crossing V'-phase armature coil 115 each other, direction of the magnetic flux 11d crossing W-phase armature coil 113 is opposite to the magnetic flux 11d crossing w'-phase armature coil 116 each other. Therefore, a generation voltage by the magnetic flux 11d is correctly synthesized as three-phase induced voltage, voltage output waveform of three phase is not influenced even if there is unbalance between flux amounts flowing through the island-shaped magnetic poles and the magnetic salient poles which are adjacent salient poles.

In FIG. 11, a magnetic flux coming from the magnetic excitation part is indicated by number 11e, is obstructed by non-magnetic member 9t, does not flow through the island-shaped magnetic poles 99 and 9g, and flows through the magnetic salient poles 9a and 9h solely. The magnetic flux 11e coming from the magnetic excitation part flows axially through the magnetic salient poles 9a, 9h and the magnetic teeth 94, 9c of two armatures intermittently according to rotation position of the rotor. When direction of the magnetic flux 11e is made opposite direction with magnetization direction of the island-shaped magnetic poles 99 and 9g by permanent magnets 117 and 118 and 119 and 11a, directions of the magnetic flux 11e and 11d crossing W-phase armature coil 113, U'-phase armature coil 114, and V'-phase armature coil 115 are the same. Therefore, the magnetic excitation part increases flux amount crossing the armature coil more than case of flux only coming from permanent magnets 117, 118, 119, and 11a.

The magnetic flux 11e coming from the magnetic excitation part flows through the magnetic salient poles 9a and 9h solely, and generated voltage is not same in each armature coil. However, armature coils of the first armature magnetic pole group and the second armature magnetic pole group are placed at different circumferential position as described above, in armature coils belonging to same phase that drive current is supplied simultaneously, when one faces the island magnetic pole 99, other is arranged to face the magnetic salient pole 9h, and they are connected in series to produce flux in opposite direction when current is flowed. Therefore, drive torque fluctuations or generation voltage waveform distortion is restrained.

The magnetic excitation part has shape around the rotational shaft 91, and a longitudinal sectional view thereof is indicated in FIG. 9. The cylindrical first magnet element 9p and the second magnet element 9n are arranged between the cylindrical excitation path poles 9k and 9m, the excitation coil 9q is arranged so that magnetic flux may be induced in closed magnetic path constituted from the excitation path pole 9m, the first magnet element 9p, the excitation path pole 9k, and the second magnet element 9n. In addition, the magnetic flux from the first magnet element 9p and the second magnet element 9n flows through a main magnetic flux path consisting of the excitation path pole 9m, the magnetic annular plate 9j, the circular magnetic substrate 9f, the magnetic salient pole 9h, the magnetic teeth 9c, the annular magnetic yoke 95, the magnetic teeth 94, the magnetic salient pole 9a, the circular magnetic substrate 98, the magnetic annular plate 9b, and the excitation path pole 9k.

Magnetic field strength for magnetization change in the first magnet element 9p is set to H1, and thickness thereof is set to L1, magnetic field strength for magnetization change in the second magnet element 9n is set to H2, and thickness thereof is set to L2, and the relation of those parameters is set as follows. That is, L1 is set to be smaller than L2, and H1*L1 is set to be larger than H2*(L1+L2). The product of the excitation current peak supplied to the excitation coil 9q and the number of coil windings is set to AT, and AT to change magnetization of each magnet element is set up as follows. AT to change magnetization of the first magnet element 9p is set to be larger than H1*L1, and AT to change magnetization of the second magnet element 9n is set as smaller than H1*L1 and larger than H2*(L1+L2). The polarity of the excitation current is set up according to the magnetization direction of the each magnet element.

Since the excitation coil 9q is arranged at a excitation path formed by the first magnet element 9p and the second magnet element 9n in series, almost equal magnetic field intensity is applied in the first magnet element 9p and the second magnet element 9n. But since the magnetic field intensity to change each magnetization is different, the magnetization state thereof is controlled, respectively. Applying a neodymium magnet (NdFeB) to the first magnet element 9p, applying an Alnico magnet (AlNiCo) to the second magnet element 9n, respectively, and the magnet element is constituted so as to meet above criteria.

In the above-mentioned composition, on the occasion of magnetization change of the first magnet element 9p, the second magnet element 9n is always promptly magnetized according to the direction of excitation flux induced by the excitation coil 9q, therefor magnetic resistance to the excitation flux is small. On the occasion of magnetization change of the second magnet element 9n, when the direction of the excitation flux is the same as the magnetization direction of the first magnet element 9p, the magnetic resistance to the excitation flux is small in nature. When the direction of the excitation flux is the opposite as the magnetization direction of the first magnet element 9p, the length L1 is small, so the magnetic resistance of excitation path which regarded the first magnet element 9p as an air gap is small.

Therefore, although the first magnet element 9p and the second magnet element 9n become a part of other excitation path each other on the occasion of magnetization change of the first magnet element 9p or the second magnet element 9n, since the magnetic resistance to the excitation flux is effectually small, magnetization change thereof is easy. Furthermore, the magnetic annular plates 9b and 9j consist of soft iron plate so that alternating flux may be hard to flow through, and since the magnetic resistance to the alternating flux of the main flux path is large, a pulse-like excitation flux induced by the excitation coil 9q cannot flow through the main flux path easily.

Figure 12A:
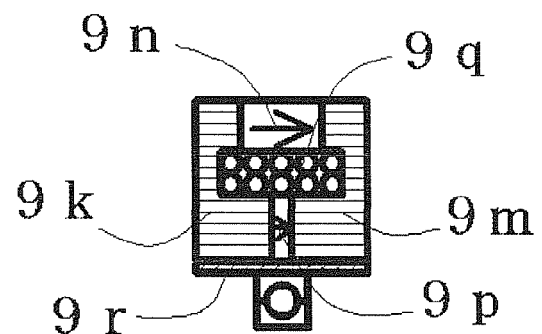
FIGS. 12A, 12B, and 12C are longitudinal sectional views of upper half of the magnetic excitation part of the rotating electric machine shown in FIG. 9.
Figure 12B:
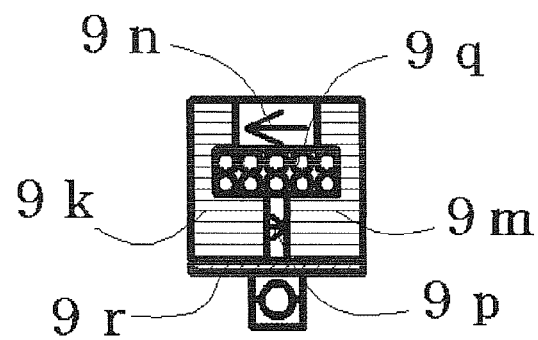
Figure 12C:
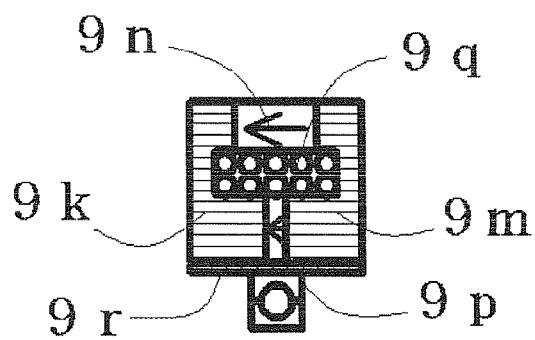

FIGS. 12A, 12B, and 12C show the drawing of longitudinal section in the upper half of the magnetic excitation part, and show different magnetization states of the first magnet element 9p and the second magnet element 9n, respectively. The step to change magnetization thereof will be explained with FIGS. 12A, 12B, 12C. As explained using FIG. 11, when magnetic flux flows from the magnetic excitation part leftward in parallel with the rotational shaft 91, flux amount crossing the armature coils 96 and 9d will be increased, and when reverse, flux amount crossing them will be reduced. So the first magnet element 9p having rightward magnetization in parallel with the rotational shaft 91 corresponds to the first magnetization, and the second magnet element 9n having leftward magnetization corresponds to the second magnetization in FIG. 9.

Both the first magnet element 9p and the second magnet element 9n are the first magnetization in FIG. 12A, flux amount crossing the armature coils 96, 9d is increased from only permanent magnets 117, 118, 119, and 11a. The excitation current supplied to the excitation coil 9q has polarity to magnetize the first magnet element 9p to the first magnetization, and has amplitude to make AT larger than H1*L1, and then the first magnet element 9p is magnetized to the first magnetization. At this time, since the second magnet element 9n will be magnetized to the second magnetization, the excitation current is further supplied to the excitation coil 9q. The excitation current has polarity to magnetize the second magnet element 9n to the first magnetization, and the AT is smaller than H1*L1 and also larger than H2*(L1+L2). Then the second magnet element 9n is magnetized to the first magnetization.

In FIG. 12B, the first magnet element 9p is the first magnetization, and the second magnet element 9n is the second magnetization, and magnetic flux is not supplied to the armature side from the magnetic excitation part. In FIG. 12A, the excitation current is supplied to the excitation coil 9q. The polarity thereof is the one to magnetize the second magnet element 9n to the second magnetization, and the amplitude thereof is the one to make AT smaller than H1*L1 and also larger than H2*(L1+L2). Then the second magnet element 9n is magnetized to the second magnetization.

Both the first magnet element 9p and the second magnet element 9n are the second magnetization in FIG. 12C, flux amount crossing the armature coils 96, 9d is reduced from only permanent magnets 117, 118, 119, and 11a. The excitation current supplied to the excitation coil 9q has polarity to magnetize the first magnet element 9p to the second magnetization, and has amplitude to make AT larger than H1*L1, and then the first field magnet 9p is magnetized to the second magnetization. At this time, since the second magnet element 9n will be magnetized to the first magnetization, the excitation current is further supplied to the excitation coil 9q. The polarity of the excitation current is the one to magnetize the second magnet element 9n to the second magnetization, and the amplitude thereof is the one to make AT smaller than H1*L1 and also larger than H2*(L1+L2). Then the second magnet element 9n is magnetized to the second magnetization.

The conductor layer 9r consist of a copper plate around the rotational shaft 91, and makes induced flux by the excitation coil 9q concentrate on the excitation path, and makes inductance of the excitation coil 9q decrease in the effect so that the pulse-like excitation current is made easy to flow. When the pulse-like excitation electric current is supplied to the excitation coil 9q, an electric current in the direction which bars magnetic flux change will be induced in the conductor layer 9r, makes flux amount by the excitation coil 9q decreases within conductor layer 9r, and makes the magnetic flux by the excitation coil 9q concentrate on the excitation path. The excitation path poles 9k and 9m are composed of powder magnetic core with large resistivity. Besides, bulk-like magnetic substance with big specific resistance can also be used for them.

Thus, changing the excitation current supplied to the excitation coil 9q, and changing the number of magnet element corresponding to the first magnetization and the second magnetization, flux amount flowing through the armature is controlled. Relationship between the flux amount and the excitation current is set as map data in design phase. However, in mass-production stage of rotating electric machines, precise control of flux amount through the armature may become difficult in presence of variation in component dimension and magnetic property. In such case, the above-mentioned relationship is inspected after assembly of the rotating electric machine, and the above-mentioned map data is corrected.

Furthermore, magnetic substance tends to receive influence by temperature, and when there is also anxious about aging changes, information to correct the above-mentioned map data can be studied by supervising the relationship between the excitation current and the magnetization state during operation of the rotating electric machine. It is difficult to grasp flux amount flowing through the armature directly, but the flux amount is estimated by referring to generated voltage of the armature coil $9b$, $9d$.

Although magnetization state of the first magnet element $9p$ and the second magnet element $9n$ is discrete, further in this embodiment, the flux adjustment current of a degree which does not make the field magnets cause irreversible magnetization change is supplied to the excitation coil $9q$ in each magnetization state of the magnet elements, and induced flux is superimposed on flux coming from the first magnet element $9p$, the second magnet element $9n$ and permanent magnets $117$, $118$, $119$, $11a$, and flux amount flowing through the armature is controlled. Polarity of the flux adjustment current is changed according to direction to increase or decrease the flux amount.

The flux by the flux adjustment current is caused in closed magnetic flux path including the first magnet element $9p$ and the second magnet element $9n$ together, and in closed magnetic flux path including the first magnet element $9p$ and the main magnetic flux path. Thickness L1 of the first magnet element $9p$ is set as smaller than thickness L2 of the second magnet element $9n$, and further magnetic resistance assuming the second magnet element $9n$ as air gap is set as larger than magnetic resistance of the main magnetic flux path so that most magnetic flux by the flux adjustment current may flow into the main magnetic flux path. Magnetic resistance of the main magnetic flux path fluctuates according to relative position between the magnetic salient poles and the magnetic teeth, and therefore, averaged magnetic resistance thereof is set to be approximately equal to magnetic resistance of the main magnetic flux path.

Arrangement of the neodymium magnet (NdFeB) which will not cause irreversible demagnetization easily on the rotor surface facing the armature is desirable, but magnetic flux induced by the armature coils will not reach the magnetic excitation part easily as mentioned above, so easily magnetization changeable magnet can be applied as the field magnet. Magnetic field intensity required for magnetization of neodymium magnet (NdFeB) is 2400 kA/m (kilo ampere/meter) grade, and magnetic field intensity required for magnetization of Alnico magnet (AlNiCo) is about 240 kA/m. In this embodiment, since the excitation flux is induced in the circuit where the first magnet element $9p$ and the second magnet element $9n$ are connected in series, each magnet element needs to have different coercivity. Each magnet element is composed of magnet with different material, and magnetization easiness of each magnet element is adjusted by product of coercivity and thickness.

In the rotating electric machine of this embodiment, magnetic flux induced by the armature coils $9b$ mainly flows through the magnetic teeth $94$, the cylindrical magnetic yoke $95$, the island-shaped magnetic poles $99$, and the magnetic salient poles $9a$, magnetic flux induced by the armature coils $9d$ mainly flows through the magnetic teeth $9c$, the cylindrical magnetic yoke $95$, the island-shaped magnetic poles $9g$, and the magnetic salient poles $9h$. Further, magnetic annular plates $9b$ and $9j$ consist of soft iron plate so that alternating flux may be hard to pass through. Therefor, there is little possibility to have influence on magnetization state of the first magnet element $9p$ and the second magnet element $9n$. Being able to apply magnetic material with low coercivity, or small thickness to the magnet element, their magnetization change becomes easy.

As described above, in the rotating electric machine apparatus shown in FIGS. 9 to 12, it has been explained that by changing magnetization state of the first magnet element $9p$ and the second magnet element $9n$, magnetic flux flowing in the armature can be controlled. This embodiment is system for optimizing output by controlling the flux amount, and control method as the rotating electric machine system will be explained by using FIG. 5.

A rotating electric machine system in which the rotating electric machine apparatus serves as an electric motor and by which flux amount control is performed to optimize rotational force control will be explained. The flux adjustment current to increase flux amount flowing through the armature is assumed as positive in the explanation. When the rotational speed that is the output $53$ becomes larger than a predetermined value and flux amount flowing through the armature is made to be smaller, the flux adjustment current being supplied to the excitation coil $9q$ from the flux adjustment circuitry $59$ is decreased. When the flux adjustment current is smaller than a predetermined value in the case, excitation current to increase number of magnet element in the second magnetization is supplied to the excitation coil $9q$ from the magnetization control circuitry $5a$, and number of magnet element in the first magnetization is decreased as well as number of magnet element in the second magnetization is increased, and flux amount flowing through the armature is made smaller.

When the rotational speed that is the output $53$ becomes smaller than a predetermined value and flux amount flowing through the armature is made to be larger, the flux adjustment current being supplied to the excitation coil $9q$ from the flux adjustment circuitry $59$ is increased. When the flux adjustment current is larger than a predetermined value in the case, excitation current to increase number of magnet element in the first magnetization is supplied to the excitation coil $9q$ from the magnetization control circuitry $5a$, and the number of magnet element in the second magnetization is decreased as well as the number of magnet element in the first magnetization is increased, and the flux amount flowing through the armature is made larger.

A constant-voltage power generation system in which the rotating electric machine apparatus serves as an electric generator and by which the flux amount control is performed to control the power generation voltage to be a predetermined voltage will be explained.

When the power generation voltage that is the output $53$ becomes larger than a predetermined value and flux amount flowing through the armature is made to be smaller, the flux adjustment current being supplied to the excitation coil $9q$ from the flux adjustment circuitry $59$ is decreased. When the flux adjustment current is smaller than a predetermined value in the case, excitation current to increase number of magnet element in the second magnetization is supplied to the excitation coil $9q$ from the magnetization control circuitry $5a$, and number of magnet element in the first magnetization is decreased as well as number of magnet element in the second magnetization is increased, and the flux amount flowing through the armature is made smaller.

When the power generation voltage that is the output $53$ becomes smaller than a predetermined value and flux amount flowing through the armature is made to be larger, the flux adjustment current being supplied to the excitation coil $9q$ from the flux adjustment circuitry $59$ is increased. When the flux adjustment current is larger than a predetermined value in the case, excitation current to increase number of magnet element in the first magnetization is supplied to the excitation coil 9*q* from the magnetization control circuitry 5*a*, and number of magnet element in the second magnetization is decreased as well as number of magnet element in the first magnetization is increased, and the flux amount flowing through the armature is made larger.

In this embodiment, the island-shaped magnetic poles and the magnetic salient poles are magnetized by permanent magnets 117, 118, 119, and 11*a* in different polarity each other, and the island-shaped magnetic poles are constituted so that magnetic flux coming from the magnetic excitation part may be hard to flow through by the non-magnetic member 9*t* (the isolation member). It is possible to use the reluctance torque and as well as the magnet torque due to this configuration. Disposing a permanent magnet instead of the non-magnetic member 9*t*, the island-shaped magnetic pole and the magnetic salient pole can be configured to be more strongly magnetized.

Furthermore, although the armature coils 96 and 9*d* are wound around the magnetic teeth 94 and 9*c*, respectively in this embodiment, composition arranging the armature coils 96 and 9*d* on the annular magnetic yoke 95 without having the magnetic teeth 94 and 9*c* is also possible. The composition having the magnetic teeth 94 and 9*c* is superior in energy efficiency, and it is possible to use the reluctance torque. The composition without the magnetic teeth 94 and 9*c* does not generate cogging torque, and has advantage in terms of noise and vibration.

The rotating electric machine system according to a fourth embodiment of the present invention will be explained by using FIGS. 13 to 16. The fourth embodiment is a rotating electric machine system having structure of integrated two rotors.

Figure 13:
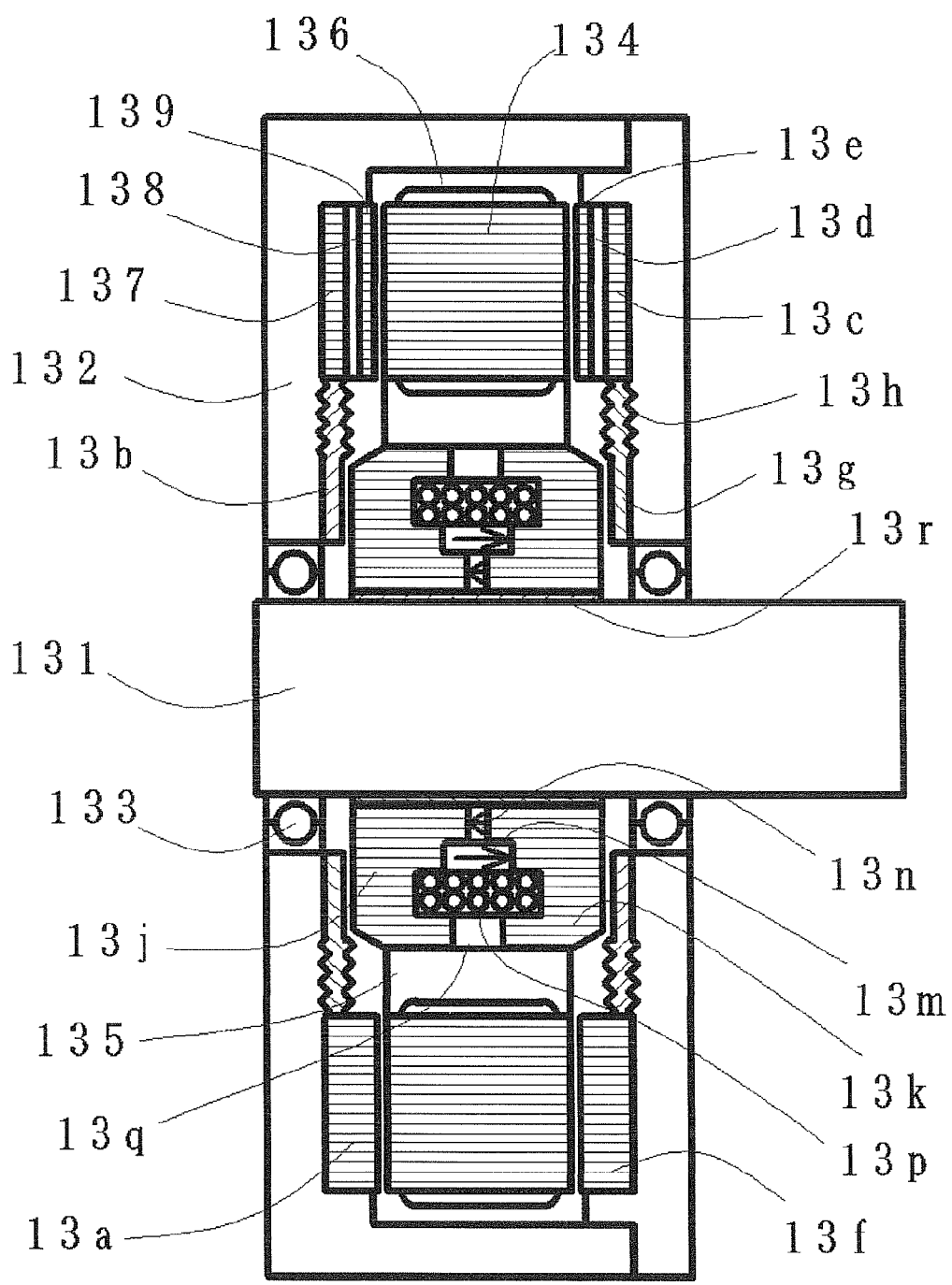
FIG. 13 is a longitudinal sectional view of a rotating electric machine apparatus according to the fourth embodiment of the present invention.

FIG. 13 shows a longitudinal sectional view of the embodiment in which the present invention is applied to a rotating electric machine apparatus having an outer rotor structure, and a rotor housing 132 is supported rotatably by a fixed shaft 131 through bearings 133. An armature and a magnetic excitation part are fixed to the fixed shaft 131, magnetic teeth 134 parallel to the fixed shaft 131 and armature coils 136 are arranged in circumferential direction at an armature support 135, and the armature is constituted.

A first and second surface magnetic pole part opposing the armature axially are arranged on an inner side of the rotor housing 132. The first surface magnetic pole part having a circular magnetic substrate 137, island-shaped magnetic poles 139, and magnetic salient poles 13*a* is disposed in the left-hand side of the rotor housing 132, and the second surface magnetic pole part having a circular magnetic substrate 13*c*, island-shaped magnetic poles 13*e*, and magnetic salient poles 13*f* is disposed in the right-hand side of the rotor housing 132. Numbers 138 and 13*d* indicate isolation members arranged between the circular magnetic substrate 137 and the island-shaped magnetic pole 139 and between the circular magnetic substrate 13*c* and the island-shaped magnetic pole 13*e* each, and non-magnetic members are posted. The isolation member is not arranged between the magnetic salient pole and the circular magnetic substrate, the magnetic salient poles 13*a* and the magnetic salient poles 13*f* oppose axially through the armature, and are arranged so that magnetic flux path may be formed axially. Magnetic circular plates 13*b* and 13*g* are extended from the circular magnetic substrates 137 and 13*c* to inside diameter direction, respectively, and counter with a magnetic excitation part through a minute gap, and have concentric ruggedness 13*h* on their surface so that alternating flux is hard to pass through.

The magnetic excitation part is shaped around the fixed shaft 131, and is coupled magnetically with the magnetic circular plates 13*b* and 13*g* through minute gap so that the circular magnetic substrates 137 and 13*c* are magnetized in different polarity each other. The principal part of the magnetic excitation part consists of excitation path poles 13*j*, 13*k*, magnet elements 13*m*, 13*n*, and an excitation coil 13*p*. That is, a field magnet consists of the magnet elements 13*m* and 13*n*, a magnetic flux coming from magnet elements 13*m* and 13*n* flows into a main magnetic flux path containing the magnetic circular plate 13*b*, the circular magnetic substrate 137, the magnetic salient poles 13*a*, the magnetic teeth 134, the magnetic salient poles 13*f*, the circular magnetic substrate 13*c*, and the magnetic circular plate 13*g*. Number 13*q* represents a magnetic gap to adjust magnetic resistance of an excitation path. Number 13*r* indicates a conductor layer arranged around the fixed shaft 131 so that inductance of the excitation coil 13*p* may be decreased and induced magnetic flux may be concentrated in magnet elements 13*m* and 13*n*.

Figure 14A:
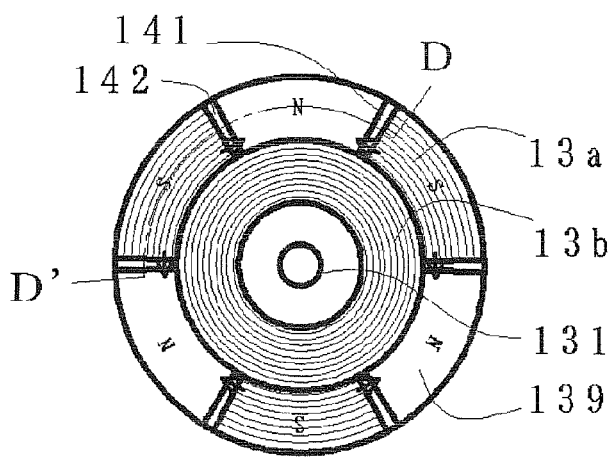
FIG. 14A is a plan view of the surface of the first surface magnetic pole part of the rotating electric machine shown in FIG. 13, as seen from the left removing the arts thereabove.
Figure 14B:
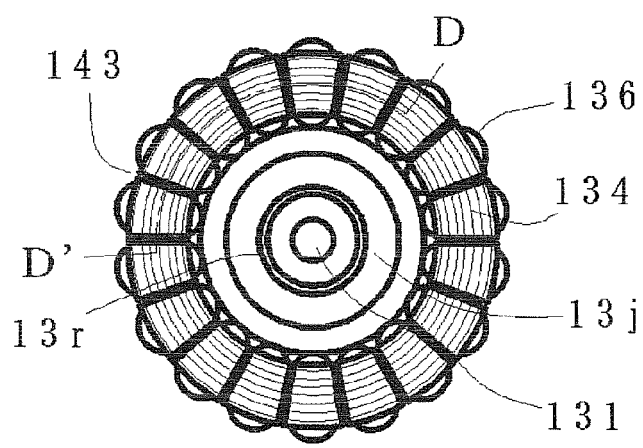
FIG. 14B is a view showing the armature portion of the rotating electric machine shown in FIG. 13, as seen from the first surface magnetic pole part.
Figure 14C:
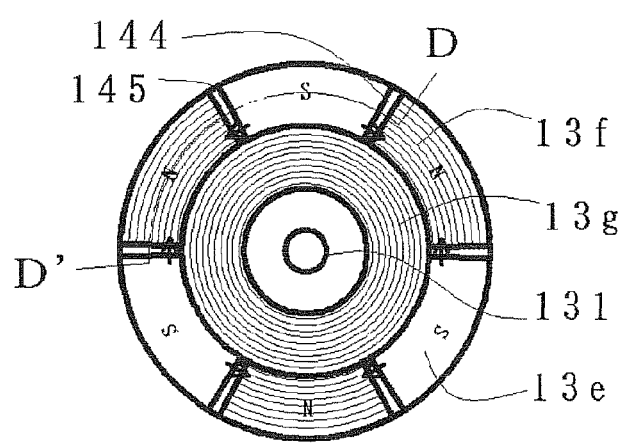
FIG. 14C is a plan view showing the second surface magnetic pole part of the rotating electric machine shown in FIG. 13, as seen from the armature of the machine.

FIG. 14A is a plan view of the surface of the first surface magnetic pole part of the rotating electric machine shown in FIG. 13, as seen from the left removing the arts thereabove, FIG. 14B is a view showing the armature portion of the rotating electric machine shown in FIG. 13, as seen from the first surface magnetic pole part, and FIG. 14C is a plan view showing the second surface magnetic pole part of the rotating electric machine shown in FIG. 13, as seen from the armature of the machine.

The first surface magnetic pole part is configured as shown in FIG. 14A; the island-shaped magnetic poles 139 and the magnetic salient poles 13*a* are formed by the permanent magnet arranged at equal intervals mostly in circumferential direction into the circular magnetic substrate 137. Furthermore, circumferential direction magnetization of adjacent permanent magnets 141, 142 are reversed alternately, and the island-shaped magnetic poles 139 and the magnetic salient poles 13*a* are magnetized in different polarity with each other. Arrows in permanent magnets 141, 142 indicate those magnetization direction, respectively, and N, S in the island-shaped magnetic poles 139 and the magnetic salient poles 13*a* indicate polarity magnetized, respectively. In addition, the non-magnetic member 138 is disposed as an isolation member in the island-shaped magnetic poles 139 so that magnetic flux coming from the magnetic excitation part is hard to pass through. Magnetic flux coming from the permanent magnets 141 and 142 cannot pass through the non-magnetic member 138 easily, and since it flows into the armature side chiefly, the island-shaped magnetic poles 139 will be magnetized rightward (parallel to the fixed shaft). The island-shaped magnetic poles 139 and the magnetic salient poles 13*a* are connected with a thin magnetic member and are unified in a surface of the rotor, so boundaries between the island-shaped magnetic poles 139 and the magnetic salient poles 13*a* are not visible from the surface. In the figure, they are indicated separately for easier understanding.

The second surface magnetic pole part shown in FIG. 14C is constituted like the first surface magnetic pole part, each island-shaped magnetic poles counter in axial direction through the armature, and each magnetic salient poles counter in axial direction through the armature. The second surface magnetic pole part is configured; the island-shaped magnetic poles 13*e* and the magnetic salient poles 13*f* are formed by the permanent magnet arranged at equal intervals mostly in circumferential direction into the circular magnetic substrate 13*c*. Furthermore, circumferential direction magnetization of adjacent permanent magnets 144, 145 are reversed alternately, and the island-shaped magnetic poles 13*e* and the magnetic salient poles 13f are magnetized in different polarity with each other. Arrows in permanent magnets 144, 145 indicate those magnetization direction, respectively, and S, N in the island-shaped magnetic poles 13e and the magnetic salient poles 13f indicate polarity magnetized, respectively. In addition, the non-magnetic member 13d is disposed as an isolation member in the island-shaped magnetic poles 13e so that magnetic flux coming from the magnetic excitation part is hard to pass through. Magnetic flux coming from the permanent magnets 144 and 145 cannot pass through the non-magnetic member 13d easily, and since it flows into the armature side chiefly, the island-shaped magnetic poles 13e will be magnetized rightward (parallel to the fixed shaft).

In the armature shown in FIG. 14B, the armature coils 136 and the magnetic teeth 134 belonging to each of the first armature magnetic pole group and the second armature magnetic pole group are arranged in different positions in circumferential direction. Armature coils of U-phase, V-phase, W-phase, U'-phase, V'-phase, and W'-phase are arranged repeatedly in circumferential direction, 18 armature coils are arranged to six magnetic poles of the rotor. Number 143 represents a magnetic gap between adjacent magnetic teeth. Armature coils of U phase, V-phase, and W-phase belong to the first armature magnetic pole group, and armature coils of U'-phase, V'-phase, and W'-phase belong to the second armature magnetic pole group.

The magnetic teeth 134 is composed of powder magnetic core with large specific resistance so that alternating flux may pass through easily. When the magnetic teeth 134 having magnetic anisotropy so that magnetic flux cannot flow through in circumferential direction, for example, the composition having silicon steel plate lamination in circumferential direction is applied for it, an output torque is further improvable.

Figure 15:
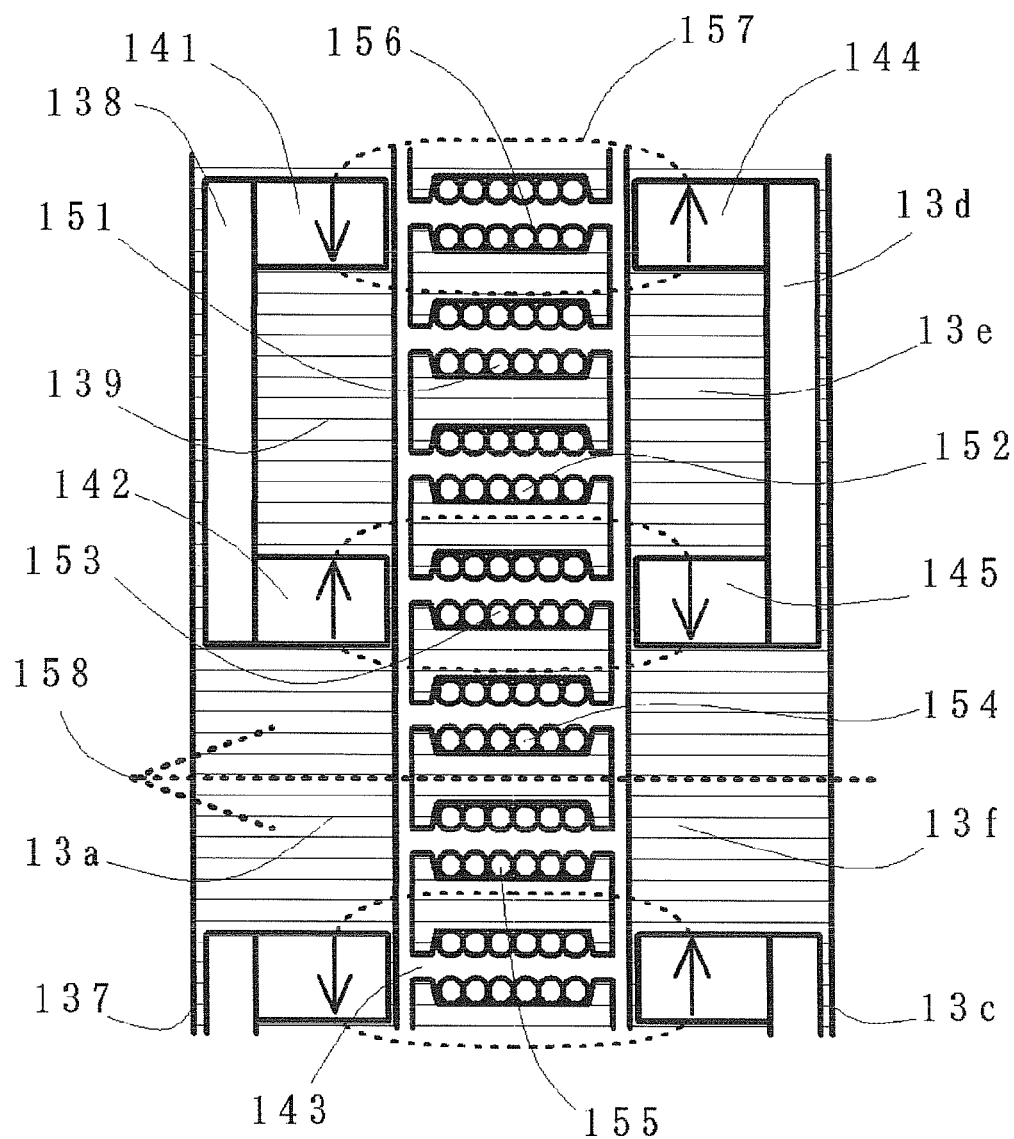
FIG. 15 is showing magnetic flux flow and a sectional view taken along Circumferential direction of the first surface magnetic pole part, the armature and the second surface magnetic pole part shown in FIGS. 14A, 14B and 14C.

FIG. 15 is showing magnetic flux flow and a sectional view taken along Circumferential direction D-D' of the first surface magnetic pole part, the armature and the second surface magnetic pole part shown in FIGS. 14A, 14B and 14C. Magnetic flux flow coming from the magnetic excitation part, the composition of the first surface magnetic pole part and the second surface magnetic pole part will be explained referring the figure. FIG. 15 indicates the case where the magnetic excitation part increases flux amount crossing the armature coil 136 more than the case of permanent magnets 141, 142, 144, and 145 only.

In FIG. 15, armature coils of the first armature magnetic pole group are shown as armature coils 151, 152, and 153 in the armature coil of U-phase, V-phase, and W-phase, respectively. Armature coils of the second armature magnetic pole group are shown as armature coils 154, 155, and 156 in the armature coil of U'-phase, V'-phase, and W'-phase, respectively. Armature coils of two groups are configured so that U'-phase armature coil 154 may face the magnetic salient poles 13a and 13f when U phase armature coil 151 faces the island-shaped magnetic poles 139 and 13e. U-phase armature coil 151 and U'-phase armature coil 154 are connected in series to generate magnetic flux in opposite direction when current is flowed. V-phase armature coil 152 and V'-phase armature coil 155, W-phase armature coil 153 and W'-phase armature coil 156 are similarly connected respectively, and all of armature coils are wired to 3 phase as a whole.

Dotted lines 157 represent magnetic flux coming from permanent magnets 141, 142, 144, and 145. Direction of the magnetic flux 157 crossing U-phase armature coil 151 is opposite to the magnetic flux 157 crossing U'-phase armature coil 154 each other, direction of the magnetic flux 157 crossing V-phase armature coil 152 is opposite to the magnetic flux 157 crossing V'-phase armature coil 155 each other, direction of the magnetic flux 157 crossing W-phase armature coil 153 is opposite to the magnetic flux 157 crossing w'-phase armature coil 156 each other. Therefore, the generation voltage by the magnetic flux 157 is correctly synthesized as three-phase induced voltage, voltage output waveform of three phase is not influenced even if there is unbalance between flux amounts flowing through the island-shaped magnetic pole and the magnetic salient pole which are adjacent salient poles.

In FIG. 15, flux coming from the magnetic excitation part is indicated by number 158, is obstructed by non-magnetic members 138, 13d, does not flow through the island-shaped magnetic poles 139 and 13e, and flows through the magnetic salient poles 13a and 13f solely. The magnetic flux 158 coming from the magnetic excitation part flows axially intermittently through the magnetic salient poles 13a, 13f, and the magnetic teeth 134 according to the rotor position, and flows through each armature coil. When direction of the magnetic flux 158 is made flow from the circular magnetic substrate 13c to the circular magnetic substrate 137, directions of the magnetic flux 157 and 158 crossing W-phase armature coil 153, U'-phase armature coil 154, and V'-phase armature coil 155 are the same. Therefore, the magnetic excitation part increases flux amount crossing the armature coil more than the case of flux only coming from permanent magnets 141, 142, 144, and 145.

The magnetic flux 158 coming from the magnetic excitation part flows through the magnetic salient poles 13a and 13f solely, and generated voltage is not the same in each armature coil. However, armature coils of the first armature magnetic pole group and the second armature magnetic pole group are placed at different circumferential position as described above, in armature coils belonging to same phase that drive current is supplied simultaneously, when one faces the island-shaped magnetic poles 139 and 13e, other is arranged to face the magnetic salient poles 13a and 13f and they are connected in series to produce flux in opposite direction when current is flowed. Therefore, driving torque fluctuations or generation voltage waveform distortion is restrained.

Figure 16A:
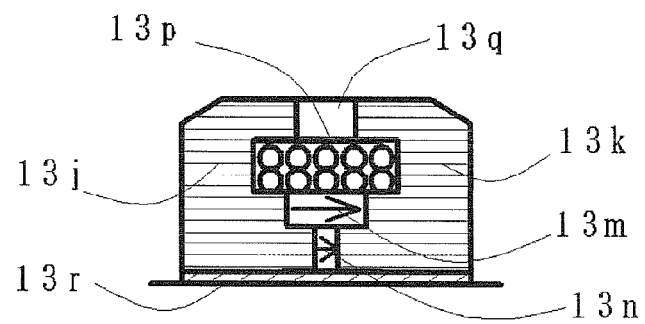
FIGS. 16A, 16B, and 16C are longitudinal sectional views of upper half of the magnetic excitation part of the rotating electric machine shown in FIG. 13.
Figure 16B:
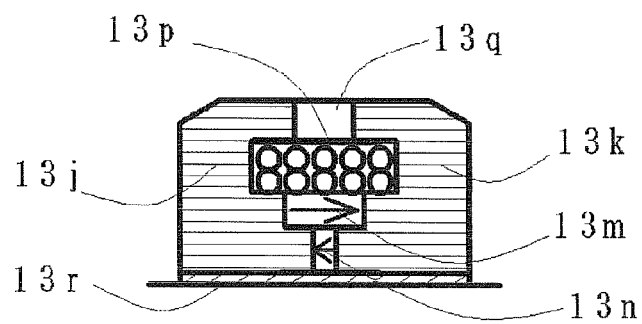
Figure 16C:
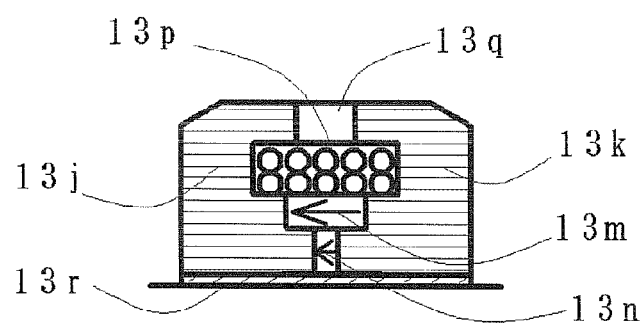

FIGS. 16A, 16B, and 16C show the drawing of longitudinal section in the upper half of the magnetic excitation part, and show different magnetization states of magnet elements 13m and 13n, respectively. The step to change magnetization thereof will be explained with FIGS. 16A, 16B, and 16C. As shown in FIG. 13, the excitation path pole 13j is opposed to the magnetic circular plate 13b through a minute gap, and the excitation path pole 13k is opposed to the magnetic circular plate 13g through a minute gap, and the magnet elements 13m and 13n having different length each other are connected in parallel between the excitation path poles 13j and 13k. As explained using FIG. 15, when the magnetic excitation part makes magnetic flux flow from the circular magnetic substrate 13c to the circular magnetic substrate 137, flux amount crossing the armature coils 136 will be increased. So the magnet element 13m having rightward magnetization in parallel with the fixed shaft 131 corresponds to the first magnetization, and the magnet element 13n having leftward magnetization corresponds to the second magnetization.

Parameters of the magnet elements 13m and 13n, such as each magnetic pole surface area and saturation magnetic flux density, etc. are set up so that each magnet element may flow almost an equivalent amount of magnetic flux to the armature, respectively. Therefore, in magnetization state thereof shown in FIG. 13, magnetic flux from the magnet elements 13m and 13n are offset each other, and only flux coming from permanent magnets 141, 142, 144, and 145 will flow through the armature coil 136.

Furthermore, a part of the excitation path poles 13*j* and 13*k* counter through the gap 13*q*, and the excitation coil 13*p* is wound around the magnet elements 13*m* and 13*n* and the fixed shaft 131. Magnetic flux induced with the excitation coil 13*p* flows through excitation flux path formed with the magnet elements 13*m* and 13*n* and the excitation path pole 13*j* and the gap 13*q* and the excitation path pole 13*k*.

Magnetic flux coming from the magnet elements 13*m* and 13*n* flows through the main magnetic flux path and the excitation flux path, magnetic resistance of the excitation flux path is set up larger than that of the main magnetic flux path by an opposite area and a gap length in the gap 13*q* as a magnetic resistance adjustment portion. Magnetic resistance of the main magnetic flux path fluctuates according to relative position between the magnetic salient pole and the magnetic teeth, and therefore, averaged magnetic resistance thereof is set to be approximately equal to magnetic resistance of the main magnetic flux path.

On the other hand, the excitation flux induced by the excitation coil 13*p* flow through the excitation flux path, and also tends to flow through the main magnetic flux path simultaneously. Magnetic circular plates 13*b* and 13*g* which are a part of the main magnetic flux path consist of soft iron, and have concentric ruggedness 13*h* on their surface, so alternating flux is hard to pass through the main magnetic flux path. Magnetic resistance in the gap 13*q* portion is set as smallness from magnetic resistance of the main magnetic flux path to alternating magnetic flux so that the excitation flux may flow through the excitation flux path mainly.

The conductor layer 13*r* consist of a copper plate around the fixed shaft 131, and makes induced flux by the excitation coil 13*p* concentrate on the excitation path, and makes inductance of the excitation coil 13*p* decrease in the effect so that the pulse-like excitation current is made easy to flow. The excitation path poles 13*j* and 13*k* are composed of powder magnetic core with large resistivity.

As shown in FIG. 13, the magnet elements 6*m* and 6*n* with different length each other are connected in parallel. When the excitation current is supplied to the excitation coil 13*p*, magnetic potential difference (magnetomotive force) between the excitation path poles 13*j* and 13*k* is almost uniform, and then magnetic intensity that the magnetic potential difference is divided by length of the magnet element is applied to each magnet element. Therefore, a short magnet element is easy to be magnetized and a long magnet element is hard to be magnetized.

To increase number of magnet element in the first magnetization in FIG. 13, pulse-like excitation current which has amplitude and polarity to magnetize the magnet element 13*n* rightward is added to the excitation coil 13*p*. This result is magnetization state of FIG. 16A, and corresponds to the state of FIG. 15, and flux amount crossing the armature coils 136 is bigger than case of only magnetic flux coming from the permanent magnets 141, 142, 144, and 145.

To decrease number of magnet element in the first magnetization in FIG. 16A, the excitation current which has amplitude and polarity to magnetize the magnet element 13*n* with the shortest length leftward and not to give any influence to the magnet element 13*m* is added to the excitation coil 13*p*. This result is magnetization state of FIG. 16B, and flux amount crossing the armature coils 136 is equivalent to case of only magnetic flux coming from the permanent magnets 141, 142, 144, and 145.

To decrease number of magnet element in the first magnetization in FIG. 16B, the excitation current which has amplitude and polarity to magnetize the magnet element 13*m* leftward is added to the excitation coil 13*p*. This result is magnetization state of FIG. 16C, and flux amount crossing the armature coils 136 is smaller than case of only magnetic flux coming from the permanent magnets 141, 142, 144, and 145. In magnetization state of this FIG. 16C, magnetic pole surface area and saturation magnetic flux density of the magnet elements 13*m* and 13*n* and permanent magnets 141, 142, 144, and 145 can be set up so that flux amount crossing the armature coils 136 may be zero effectually.

Thus, although magnetization state of the magnet elements can be changed, according to the above-mentioned step, it is always necessary to grasp magnetization state of the magnet elements 13*m* and 13*n* to change the magnetization state thereof. When information about magnetization state of the magnet elements 13*m* and 13*n* is confused, flux amount flowing through the armature after magnetization change will be contrary to expectation. In this case, the magnet elements 13*m* and 13*n* all are magnetized to one way, for example, the leftward, and only the required number of magnet elements is made to magnetize rightward.

Magnetic flux amount flowing through the armature is controlled by changing magnetization state of the magnet elements 13*m* and 13*n*, in this embodiment. Although magnetic flux from the magnet element flows into the main magnetic flux path and the excitation flux path, magnetic resistance of the excitation flux path is set larger than that of the main magnetic flux path so that the magnetic flux flows through mainly the main magnetic flux path. In order to make magnetic resistance of the excitation flux path into size, efficiency to magnetizes the magnet elements 13*m* and 13*n* falls. And magnetic resistance setup of the excitation flux path is set up with the specification of rotating electric machine systems, such as excitation current supply capability and magnetic flux amount range to the armature side.

Moreover, the circular plates 13*b* and 13*g* are constituted from soft iron blocks, and have the concentric ruggedness 13*h* on their surface so that alternating flux is hard to pass through. When eddy current generally exists, alternating flux is spread along surface of magnetic material. Domain that alternating flux spreads is concentrated by fixed depth from the surface, and the depth is known as the skin depth that is proportional to square root of 2/(angular frequency)*(electric conductivity)*(permeability). It is desirable to set up an amplitude of the concentric ruggedness 13*h* become bigger than the skin depth. Alternating flux related in this embodiment can be made hard to pass along by setting the amplitude of the concentric ruggedness 13*h* as about 1 mm or more, if rotating speed of the rotating electric machine is assumed to be around several thousand rounds per minute.

Therefore, magnetic resistance of the main magnetic flux path to pulse-like excitation flux is set up larger than that of the excitation flux path, so the excitation flux by the excitation coil 13*p* is concentrated on the magnet elements 13*m* and 13*n*, and influence exerted on the armature coils 136 is restrained. Moreover, magnetic flux induced by the armature coils 136 flows through mainly the magnetic teeth 134, the magnetic salient poles 13*a*, the island-shaped magnetic poles 139, the magnetic salient poles 13*f*, and the island-shaped magnetic poles 13*e*, and is hard to flow into the magnet elements 13*m* and 13*n*. Therefore, the magnet elements 13*m* and 13*n* can adopt magnet material of the low retentivity or short magnet material.

Non-magnetic members 138, 13*d* is arranged respectively between the island-shaped magnetic pole 139 and the circular magnetic substrate 137, between the island-shaped magnetic pole 13*e* and the circular magnetic substrate 13*c* so that magnetic flux from the magnetic excitation part may be difficult to pass through the island-shaped magnetic poles 139, 13*e* in the rotating electric machine of this embodiment. However, composition to arrange permanent magnets instead of the non-magnetic materials 138 and 13d, and composition to arrange one permanent magnet with rightward magnetization instead of the island-shaped magnetic pole 139 and permanent magnets 141 and 142, and composition to arrange one permanent magnet with rightward magnetization instead of the island-shaped magnetic pole 13e and permanent magnets 144 and 145 are also possible.

The rotating electric machine system according to a fifth embodiment of the present invention will be explained by using FIG. 17. The fifth embodiment is a rotating electric machine system that a magnetic excitation part does not have a field magnet and controls flux amount flowing through an armature by an electric current.

Figure 17:
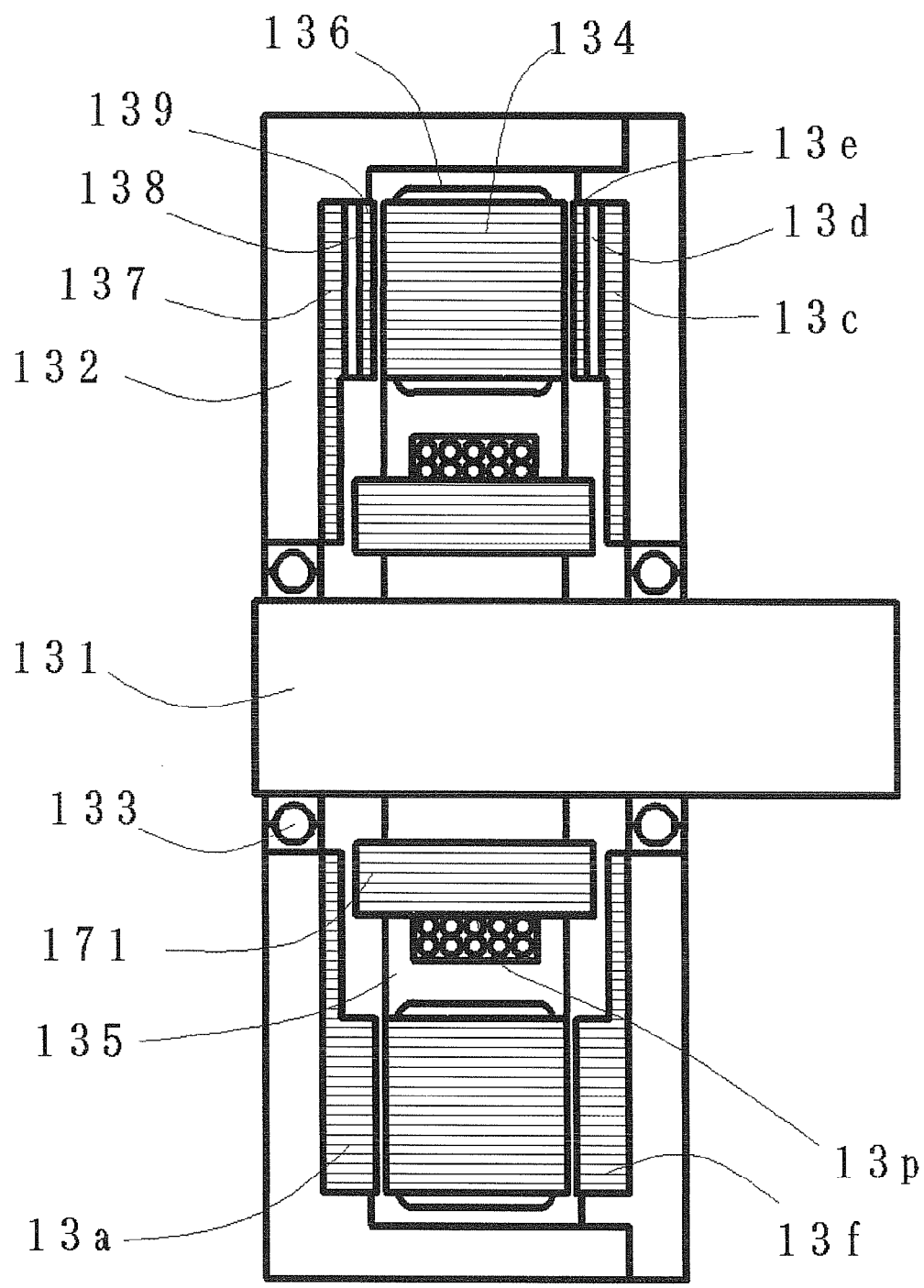
FIG. 17 is a longitudinal sectional view of a rotating electric machine apparatus according to the fifth embodiment of the present invention.

An armature and a rotor of a rotating electric machine showing a longitudinal section in FIG. 17 are same as the rotating electric machine of the fourth embodiment shown in FIG. 13 except a magnetic excitation part, and the magnetic excitation part is electric current excitation. The magnetic excitation part consists of the cylindrical magnetic core 171 that is an excitation flux path member, the excitation coil 13p wound around the cylindrical magnetic core 171, and both ends of the cylindrical magnetic core 171 face prolonged parts of the circular magnetic substrates 137 and 13c, respectively. Magnetic flux induced by the excitation coil 13p flows through the cylindrical magnetic core 171, the circular magnetic substrate 137, the magnetic salient poles 13a, the magnetic teeth 134, the magnetic salient poles 13f, and the circular magnetic substrate 13c, then flux amount through the armature coil 136 is controlled effectually.

Although composition of the armature and the rotor is same as the fourth embodiment, since the magnetic excitation part does not contain any field magnet, a possibility that magnetic flux coming from the permanent magnets 141, 142, 144, and 145 may be short-circuited through an excitation flux path member containing the cylindrical magnetic core 171 remains. Three magnetic flux paths are connected in parallel in this embodiment. That is, the first magnetic flux path includes the circular magnetic substrate 137, the island-shaped magnetic poles 139, the magnetic teeth 134, the island-shaped magnetic poles 13e, and the circular magnetic substrate 13c. The second magnetic flux path includes the circular magnetic substrate 137, the magnetic salient poles 13a, the magnetic teeth 134, the magnetic salient poles 13f, and the circular magnetic substrate 13c. The third magnetic flux path includes the circular magnetic substrate 137, the cylindrical magnetic core 171, and the circular magnetic substrate 13c. Magnetic flux from the permanent magnets 141, 142, 144, and 145 may be short-circuited through the third magnetic flux path when the magnetic resistance of the third magnetic flux path is small. So gap length between the circular magnetic substrate 137 and the cylindrical magnetic core 171, gap length between the circular magnetic substrate 137 and the cylindrical magnetic core 171 are set up so that magnetic resistance of the third magnetic flux path may be made larger than magnetic resistance of the second magnetic flux path.

Since the fourth embodiment contains the field magnet in the magnetic excitation part, there are few possibilities that magnetic flux coming from the permanent magnets 141, 142, 144, and 145 will be short-circuited through the excitation flux path member, but since this embodiment does not contain a field magnet, magnetic resistance of flux path passing along the magnetic excitation part is set up as mentioned above, and the magnetic flux short circuit has been controlled. However, composition of this embodiment other than the magnetic excitation part is same as the fourth embodiment, and further explanation is omitted.

The rotating electric machine system according to a sixth embodiment of the present invention will be explained by using FIGS. 18 to 22. The sixth embodiment is a rotating electric machine system that a permanent magnet is disposed replacing with the non-magnetic member 1a of the island-shaped magnetic pole in the first embodiment and magnetization state thereof will be changed by an electric current supplied to armature coils. The sixth embodiment is almost the same composition as the first embodiment except the arrangement of the permanent magnet and the armature constitution, explanation thereof will be concentrated on differences from the first embodiment. That is, in the first embodiment, the non-magnetic member 1a is disposed in the island-shaped magnetic poles as the isolation member, the isolation member is not arranged in the magnetic salient poles. In this embodiment, the permanent magnet arranged in the island-shaped magnetic pole is the isolation member as well as the sub-field magnet of which magnetization can be changed.

Figure 18:
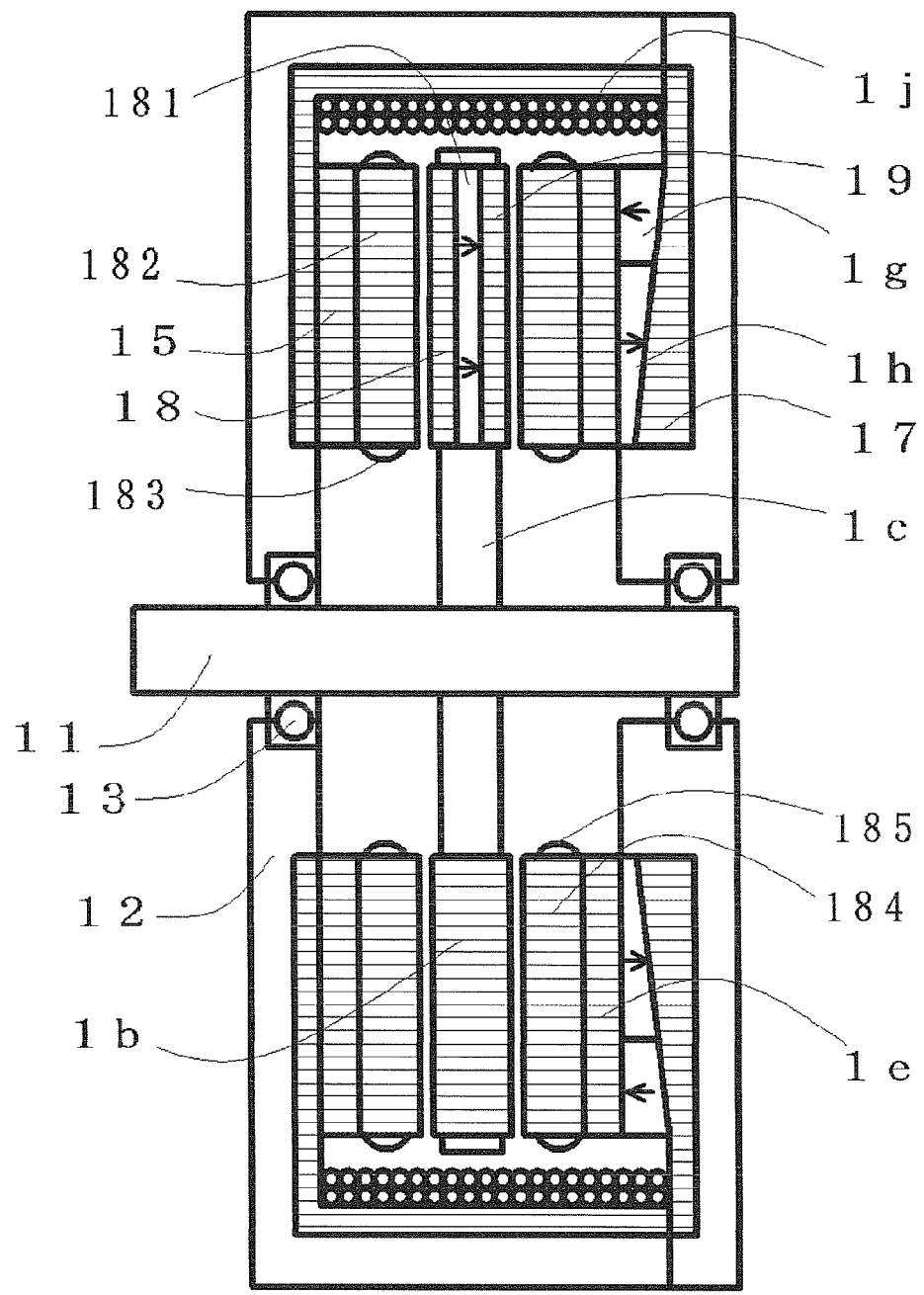
FIG. 18 is a longitudinal sectional view of a rotating electric machine apparatus according to the sixth embodiment of the present invention.

FIG. 18 shows a longitudinal sectional view of the embodiment in which the present invention is applied to a rotating electric machine apparatus having an axial gap structure, two stators. The sixth embodiment arranges sub-field magnet 181 instead of the non-magnetic member 1a between island-shaped magnetic poles 18, 19, and has changed magnetic pole composition of the armature in the first embodiment shown in FIG. 1. The first armature opposes to axial left of the rotor and the second armature opposes to axial right of the rotor, each has the first armature pole group and the second armature pole group at different circumferential points. The first armature has a magnetic teeth 182 and an armature coils 183 wound around the magnetic teeth 182, the second armature has a magnetic teeth 184 and an armature coils 185 wound around the magnetic teeth 184. Other composition is same as the first embodiment.

Figure 19A:
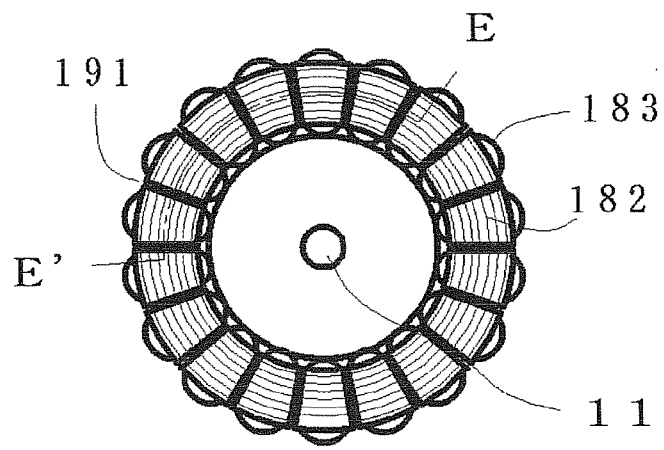
FIG. 19A is a plan view of the surface of the first armature of the rotating electric machine shown in FIG. 18, as seen from the left removing the arts thereabove.

FIG. 19A is a plan view of the surface of the first armature of the rotating electric machine shown in FIG. 18, as seen from the left removing the arts thereabove. The armature coils 183 are wound around the magnetic teeth 182, 18 armature coils are arranged to six magnetic poles of the rotor. They are arranged repeatedly in circumferential direction as armature coils of U-phase, V-phase, W-phase U'-phase, V'-phase, and W'-phase, are configured so that adjacent magnetic teeth 182 may oppose each other through a magnetic gap 191. The composition of the second armature is same as the composition of the first armature, and is not illustrated.

Figure 19B:
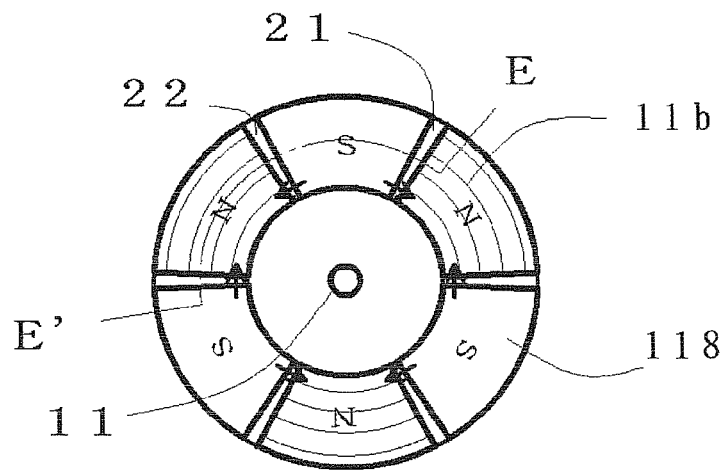
FIG. 19B is a view showing the rotor of the rotating electric machine shown in FIG. 18, as seen from the first armature.

FIG. 19B is a view showing the rotor of the rotating electric machine shown in FIG. 18, as seen from the first armature. The rotor counters axially with the first armature and the second armature, opposite side with the first armature is the first surface magnetic pole part, opposite side with the second armature is the second surface magnetic pole part, and FIG. 19B shows the first surface magnetic pole part. FIG. 19B is the same as the first surface magnetic pole part of the first embodiment shown in FIG. 2B, and explanation will be skipped.

Figure 20:
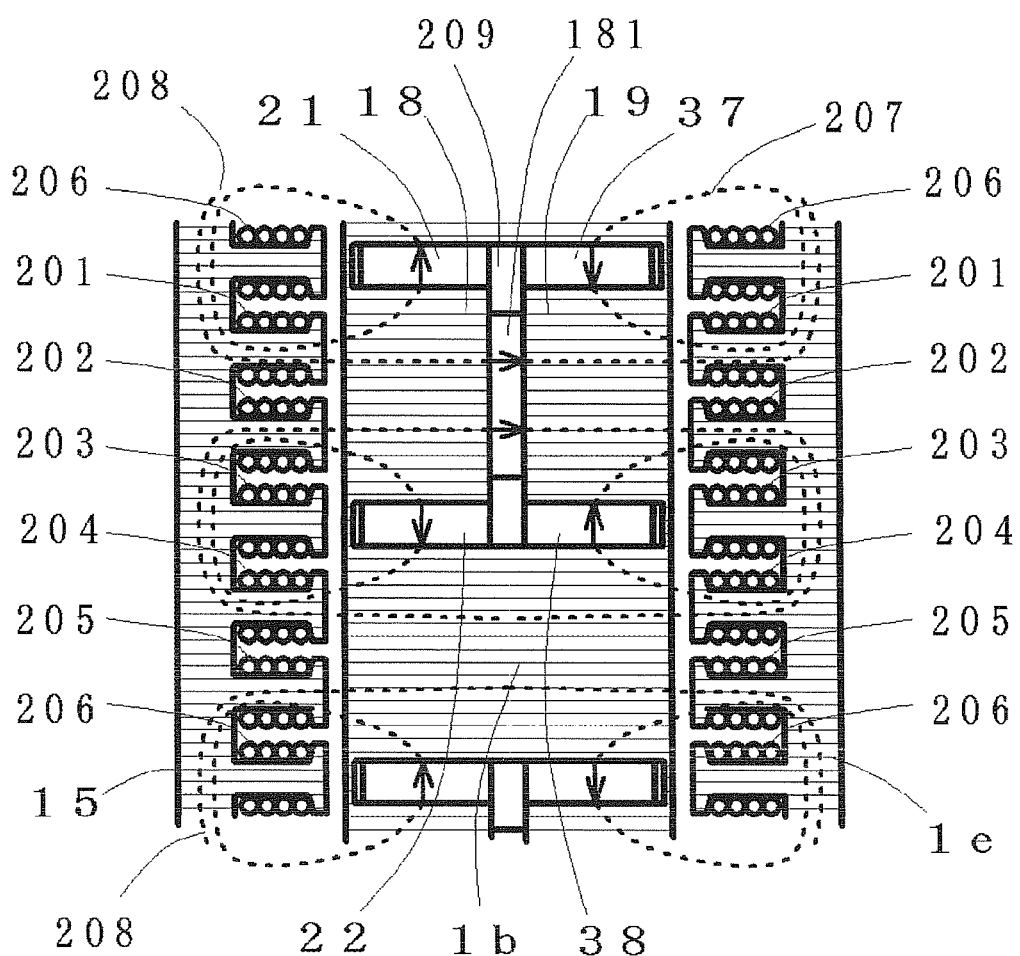
FIG. 20 is showing magnetic flux flow and a sectional view taken along Circumferential direction of the first armature, the rotor and the second armature shown in FIGS. 19A, and 19B.

FIG. 20 is showing magnetic flux flow and a sectional view taken along Circumferential direction E-E' of the first armature, the rotor and the second armature shown in FIGS. 19A and 19B. Magnetic flux flow coming from the magnetic excitation part, composition of the rotor will be explained referring the figure. The first surface magnetic pole part and the second surface magnetic pole part of the rotor are formed by dividing a uniform circular magnetic substrate by permanent magnet with circumferential direction magnetization, and have the island-shaped magnetic poles and the magnetic salient poles alternately in circumferential direction. The sub-field magnet 181 is disposed between the island-shaped magnetic poles 18, 19 located axially in a line. Numbers 21, 22, 37, 38 are given to permanent magnets disposed at both sides of the island-shaped magnetic pole. Magnetization direction of those adjacent permanent magnets is opposite direction mutually. Number 209 indicates a non-magnetic member, arrows in permanent magnets 21, 22, 37, 38 indicate magnetization direction thereof.

Armature coils 183 of the first armature are shown as armature coils 201, 202, 203, 204, 205, and 206 in the armature coil of U-phase, V-phase, W-phase, U'-phase, V'-phase, and W'-phase, respectively. The armature coils 185 of the second armature is also the same composition, and the respectively same numbers are given to the armature coils of each phase. The armature coils of U phase, V-phase, and W-phase belong to the first armature magnetic pole group, and the armature coils of U'-phase, V'-phase, and W'-phase belong to the second armature magnetic pole group. Armature coils of two armature magnetic pole groups are configured so that U'-phase armature coil 204 may face the magnetic salient pole 1b when U phase armature coil 201 faces the island-shaped magnetic pole 18(19). U-phase armature coil 201 and U'-phase armature coil 204 are connected in series to generate magnetic flux in opposite direction when current flows. V-phase armature coil 202 and V'-phase armature coil 205, W-phase armature coil 203 and W'-phase armature coil 206 are similarly connected respectively, and all of armature coils are wired to 3 phase as a whole.

Permeability of permanent magnets is close to that of an air gap, magnetic flux amount coming from the permanent magnet is fixed mostly, so the permanent magnet with big thickness can be applied as the isolation member of bi-directional magnetic flux. Flux coming from the magnetic excitation part is obstructed by the sub-field magnet 181, does not flow through the island-shaped magnetic poles 18 and 19, and flows through the magnetic salient poles 1b solely. Operating principle of which makes flux amount crossing the armature coils control by the magnetic excitation part is explained in the first embodiment embodiment, so the further explanation is omitted.

Flux amount flowing out from the island-shaped magnetic poles is assumed as constant, flux amount flowing through the magnetic salient poles is assumed as variable, and then flux amount crossing the armature coils is controlled in the first embodiment. In this embodiment, flux amount range crossing the armature coil is expanded further by changing magnetization state of the sub-field magnet 181.

Figure 21:
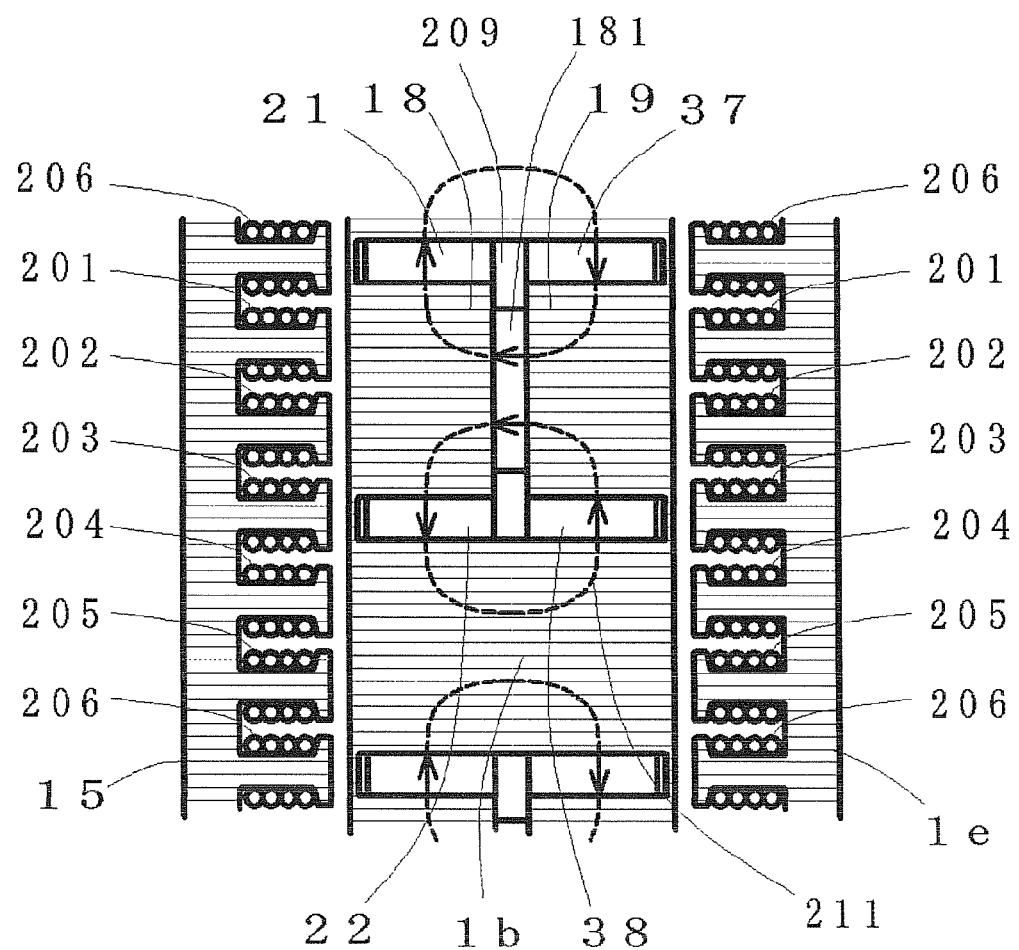
FIG. 21 is showing magnetic flux flow and a sectional view taken along Circumferential direction of the first armature, the rotor and the second armature shown in FIGS. 19A, and 19B.

Magnetic flux coming from permanent magnets 21, 22, 37, is represented with number 207, and flows through armature coils in the first armature and the second armature. When magnetization direction in the sub-field magnet 181 is the same as magnetized direction of island-shaped magnetic poles 18, 19, flux coming from the sub-field magnet 181 flows through the armature coil with the flux 207. FIG. 21 indicates the case where magnetization direction of the sub-field magnet 181 is opposite with magnetized direction of island-shaped magnetic poles 18, 19. In this case, as shown by dotted lines 211, magnetic flux coming from permanent magnets 21, 22, 37, 38, 181 constitutes closed flux path within the rotor, and magnetic flux amount leaking to the armature becomes small.

Figure 22:
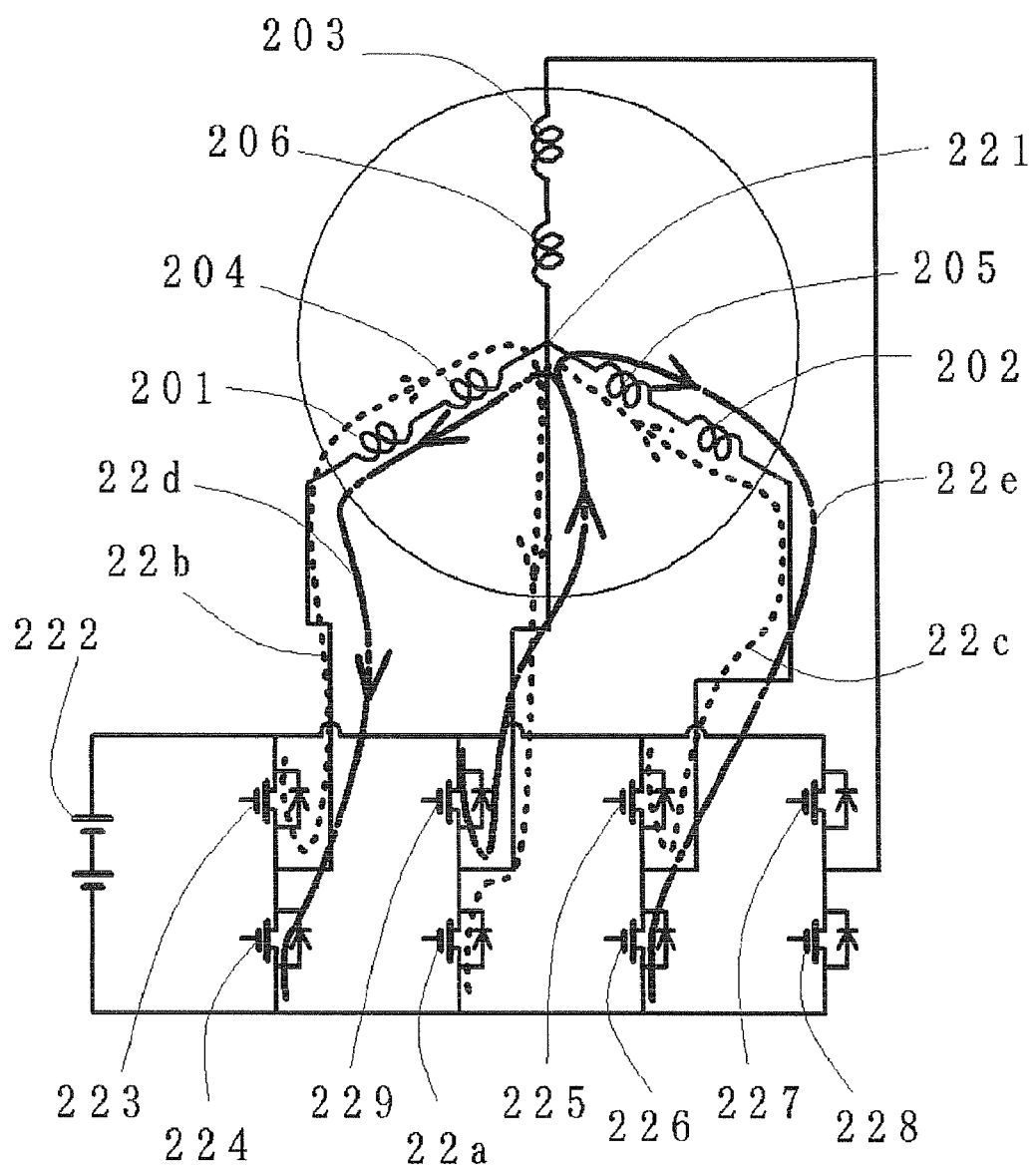
FIG. 22 is wire connection state of the armature coils shown in FIG. 20 and drive circuitry.

Operating principle of magnetization change in the sub-field magnet 181 will be explained by using FIGS. 20 and 22. FIG. 22 indicates simplified wiring diagram of armature coils 201-206 and a driving circuitry. The armature coil 201 and the armature coil 204 are connected in series to induce reverse magnetic flux each other, one end thereof is connected to a neutral point 221, and other end is connected to switch elements 223, 224. The armature coil 202 and the armature coil 205 are connected in series to induce reverse magnetic flux each other, one end thereof is connected to the neutral point 221, and other end is connected to switch elements 225, 226. The armature coil 203 and the armature coil 206 are connected in series to induce reverse magnetic flux each other, one end thereof is connected to the neutral point 221, and other end is connected to switch elements 227, 228. Furthermore, the neutral point 221 is connected to switch elements 229 and 22a. A number 222 shows a battery. The control unit which controls on-off of the above switch elements is not illustrated.

During normal operation of the rotating electric machines, switch elements 229 and 22a connected with the neutral point 221 are set to OFF, three phase drive current is supplied to each armature coil according to position of the rotor, and the rotor is driven to rotate. When magnetization state of sub-field magnet 181 is made to change, on-off control of the switch elements 229 and 22a is performed with the switch element connected with the armature coil selected by the position sensor output of the rotor not shown in the figure, and the excitation current is supplied to the armature coils opposed to the island-shaped magnetic poles 18(19) and the armature coils opposed to the magnetic salient poles 1b.

When magnetic flux is induced to change magnetization state of the sub-field magnet 181 along dotted lines 208 in FIG. 20, switch elements 223, 225, and 22a are turned ON so that excitation current 22b flowing through armature coils 201, 204 and excitation current 22c flowing through armature coils 202, 205 may be supplied. When magnetization direction of the sub-field magnet 181 is made reverse, switch elements 224, 226, and 229 are turned ON so that excitation current 22d flowing through armature coils 201, 204 and excitation current 22e flowing through armature coils 202, 205 may be supplied.

As mentioned above, the rotating electric machine by this embodiment controls flux amount flowing through the armature by changing magnetization state of the field magnet and also the sub-field magnet. This embodiment is the almost same composition as the first embodiment, and explanation of flux amount control by the magnetic excitation part was omitted, and the composition near the sub-field magnet and magnetization change thereof have been mainly explained.

The rotating electric machine system according to a seventh embodiment of the present invention will be explained by using FIG. 23. The seventh embodiment is a rotating electric machine system having an outer rotor structure, a plurality of an armature and a plurality of a rotor. Magnetic flux amount through armature coils is controlled collectively by a magnetic excitation part.

Figure 23:
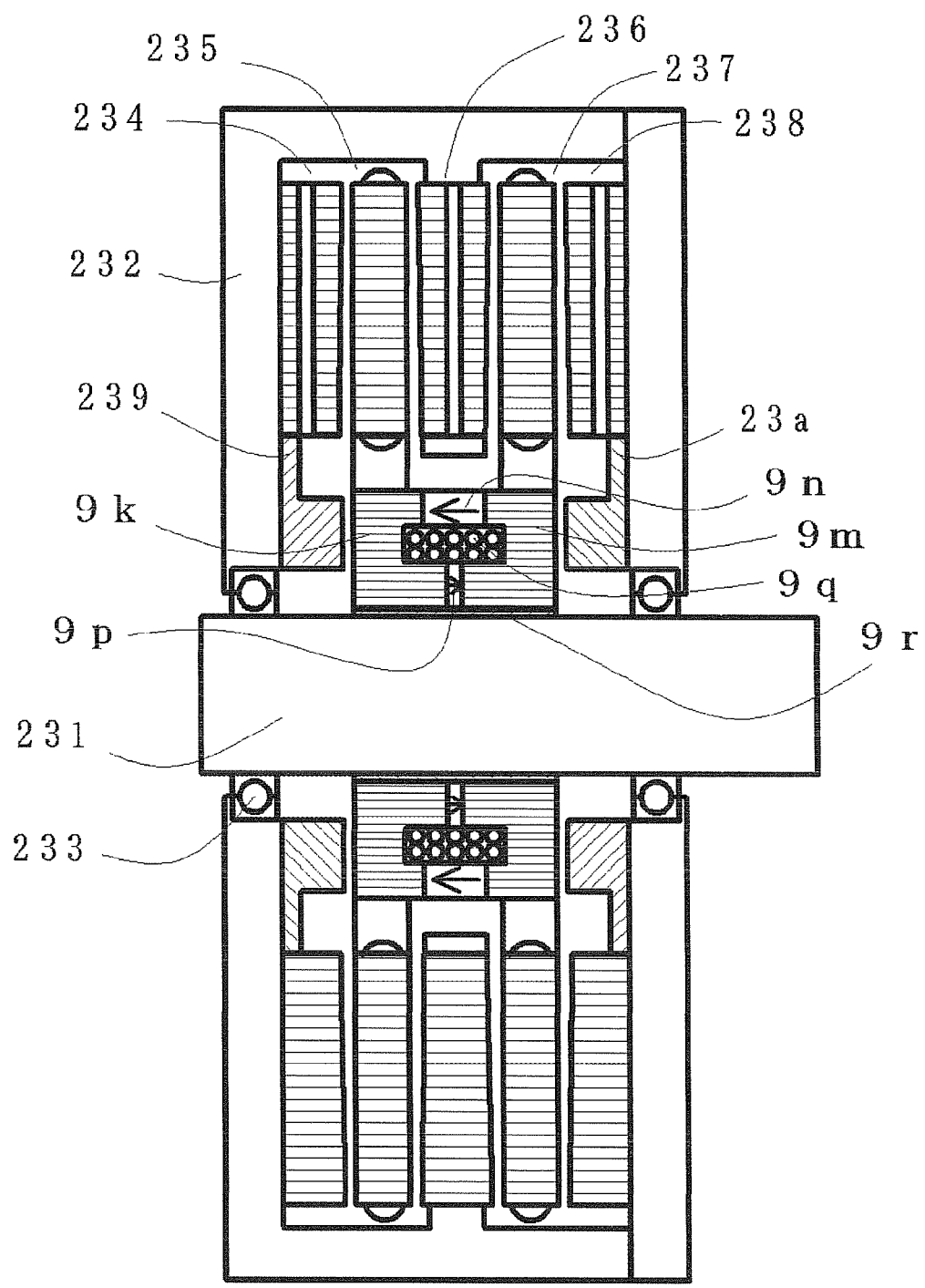
FIG. 23 is a longitudinal sectional view of a rotating electric machine apparatus according to the seventh embodiment of the present invention.

In this embodiment illustrated in FIG. 23, a first rotor 234, an armature 235, a third rotor 236, an armature 237, and a second rotor 238 are constituted axially. Composition of the armature 235 and the armature 237 is the same composition as the armature of the fourth embodiment, and the first rotor 234 and the second rotor 238 are the same composition as the first rotor and the second rotor respectively facing ends of the armature in the fourth embodiment. The third rotor 236 is the same composition as the rotor in the first embodiment, and is being fixed to a rotor housing 232. Number 231 indicates a fixed shaft and the rotor housing 232 is supported by the fixed shaft 231 rotatably through a bearing 233.

In the above-mentioned composition, island magnetic poles in the first rotor 234, the third rotor 236, and the second rotor 238 respectively are located axially in a line, and are magnetized mutually in the same axial direction. Furthermore, magnetic teeth of the armature 235 and the armature 237 are opposed axially in a line through the rotor 236. Therefore, magnetic salient poles in each rotor and the magnetic teeth form axial magnetic flux path, and they are constituted so that magnetic flux coming from permanent magnets in each rotor and magnetic flux coming from the magnetic excitation part may pass through axially. These rotor composition and the armature composition are explained by the fourth embodiment and the first embodiment, so the further explanation is omitted.

The magnetic excitation part is the same composition as the third embodiment, an excitation path pole 9k faces the magnetic core 239 connecting with a circular magnetic substrate of the first rotor 234 through a minute gap, an excitation path pole 9m faces the magnetic core 23a connecting with a circular magnetic substrate of the second rotor 238 through a minute gap. The cylindrical first magnet element 9p and the second magnet element 9n are arranged between the cylindrical excitation path poles 9k and 9m, the excitation coil 9q is arranged so that magnetic flux may be induced in closed magnetic path constituted from the excitation path pole 9m, the first magnet element 9p, the excitation path pole 9k, and the second magnet element 9n. Number 9r indicates a conductor layer.

Magnetic flux coming from the magnetic excitation part is supplied between the circular magnetic substrate of the first rotor 234 disposed at the left end, and the circular magnetic substrate of the second rotor 238 disposed at the right end, and cross through armature coils in the armature 235 and the armature 237. Although number of armatures and rotors differs from other embodiment, the composition of the magnetic excitation part is the same as the third embodiment. Magnetic flux flow in the armature and the rotor, and operating principle of the magnetic excitation part are also similar, so further explanation will be omitted.

The rotating electric machine system according to a eighth embodiment of the present invention will be explained by using FIG. 24. The eighth embodiment is a rotating electric machine system having an outer rotor structure, a plurality of an armature and a plurality of a rotor. Magnetic flux amount crossing an armature coils is controlled collectively by an excitation current.

Figure 24:
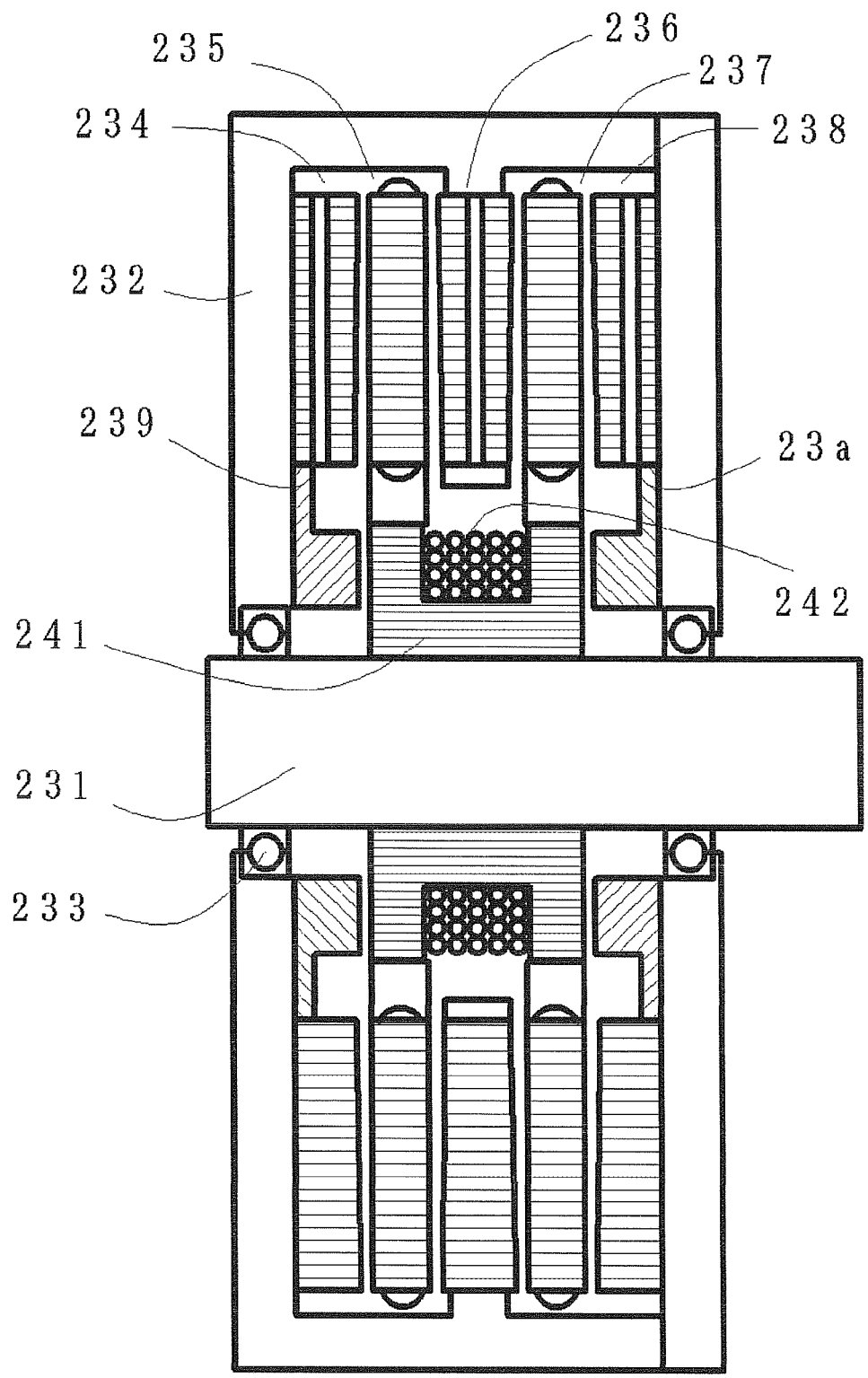
FIG. 24 is a longitudinal sectional view of a rotating electric machine apparatus according to the eighth embodiment of the present invention.

FIG. 24 indicates longitudinal view of the rotating electric machine which changes the magnetic excitation part of the seventh embodiment to electric current excitation and magnetic flux amount is made control. This embodiment is the same composition as the seventh embodiment indicated in FIG. 23 mostly, the field magnet is removed from the seventh embodiment, a cylindrical excitation flux path member 241 is arranged so that both ends thereof may face magnetic cores 239, 23a through a minute gap, and an excitation coil 242 is arranged around the cylindrical excitation flux path member 241 and the fixed shaft 231. Magnetic flux induced with the excitation coil 242 flows through the first rotor 234, the armature 235, the third rotor 236, the armature 237, and the second rotor 238 axially through the magnetic cores 239 and 23a, and flows through the armature coils. Therefor, flux amount crossing the armature coils is controlled by the excitation current supplied to the excitation coil 242.

The rotating electric machine system according to a ninth embodiment of the present invention will be explained by using FIGS. 25 to 27. The ninth embodiment is a rotating electric machine system that a magnetic excitation part does not have a field magnet and controls flux amount flowing through an armature by an electric current.

Figure 25:
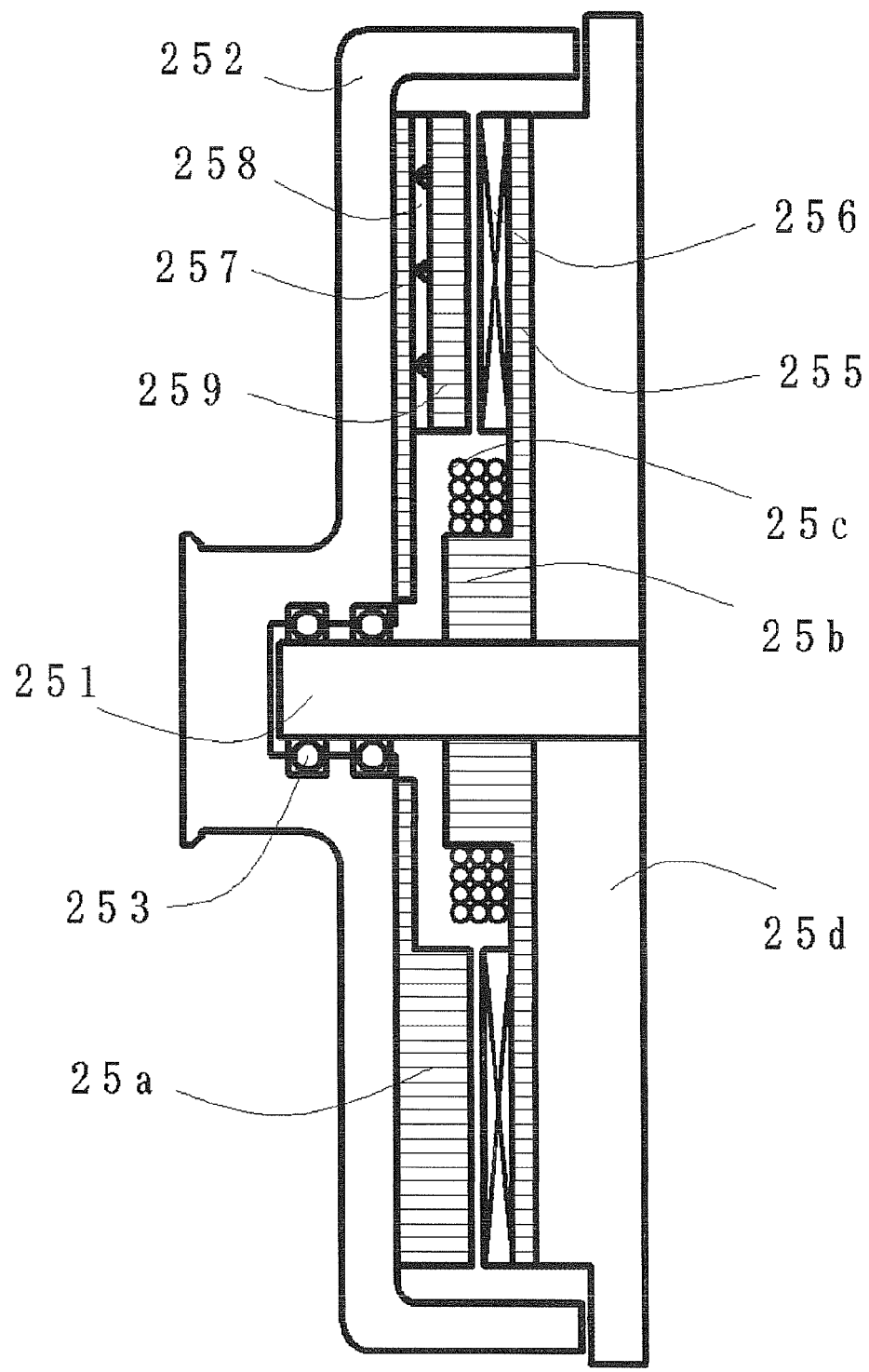
FIG. 25 is a longitudinal sectional view of a rotating electric machine apparatus according to the ninth embodiment of the present invention.

FIG. 25 shows a longitudinal sectional view of the embodiment in which the present invention is applied to a rotating electric machine apparatus having an axial gap structure. A fixed shaft 251 and an armature are fixed to a base plate 25d, a rotor housing 252 is supported rotatably by the fixed shaft 252 through bearings 253. The rotor housing 252 is composed of non-magnetic stainless steel, and has a circular magnetic substrate 257 and permanent magnets 258, and island-shaped magnetic poles 259 and magnetic salient poles 25a that are a part of the circular magnetic substrate 257. The island-shaped magnetic poles 259 and the magnetic salient poles 25a are disposed alternately in circumferential direction. An arrows in the permanent magnets 258 indicate magnetization direction.

The armature has an annular magnetic yoke 255 fixed to the base plate 25d, and armature coils 256 disposed at the annular magnetic yoke 255. A magnetic excitation part consists of a cylindrical magnetic core 25b connected to the annular magnetic yoke 255, and an excitation coil 25c wound around the cylindrical magnetic core 25b.

Figure 26A:
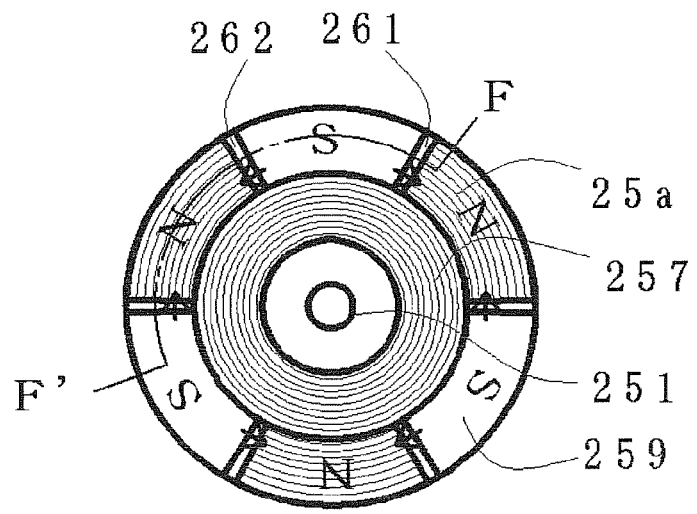
FIG. 26A is a plan view of the surface of the rotor of the rotating electric machine shown in FIG. 25, as seen from the left removing the arts thereabove.

FIG. 26A is a plan view of the surface of the rotor of the rotating electric machine shown in FIG. 25, as seen from the left removing the arts thereabove, and some of component parts are appended with numbers for explaining the reciprocal relation. The circular magnetic substrate 257 is disposed on the rotor housing 252, the magnetic salient poles 25a that are a part of the circular magnetic substrate 257 and the island-shaped magnetic poles 259 are disposed alternately in circumferential direction facing the armature. Number 261, 262 indicate permanent magnets with the circumferential direction magnetization arranged between the magnetic salient pole 25a and the island-shaped magnetic pole 259, and permanent magnets 258, 261, 262 magnetize the island-shaped magnetic poles 259 in S pole and the magnetic salient poles 25a in N pole. Arrows in permanent magnets 261, 262 indicate magnetization direction, and S, N shown in the island-shaped magnetic poles 259 and the magnetic salient poles 25a indicate magnetized polarity with permanent magnets 258, 261, 262, respectively. The island-shaped magnetic poles and the magnetic salient poles are connected and are unified with a thin magnetic member in surface of the rotor, so permanent magnets 261, 262 between the island-shaped magnetic poles and the magnetic salient poles are not visible from the surface. In the figure, they are indicated separately for easier understanding.

Figure 26B:
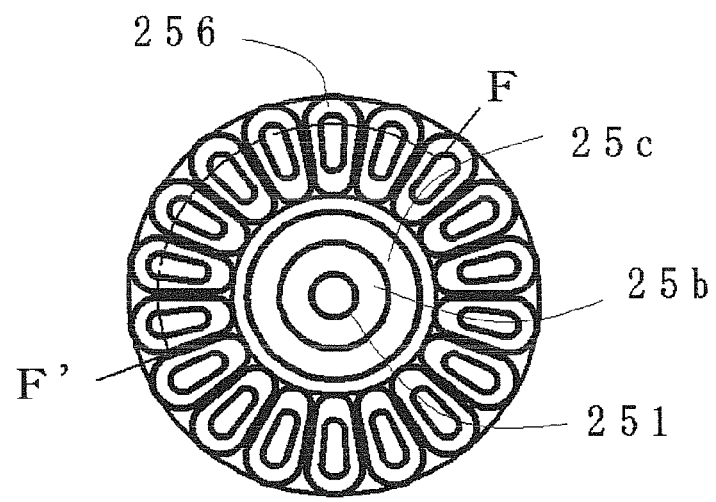
FIG. 26B is a view showing the armature portion of the rotating electric machine shown in FIG. 25, as seen from the rotor.

FIG. 26B is a view showing the armature portion of the rotating electric machine shown in FIG. 25, as seen from the rotor. The armature consists of the annular magnetic yoke 255 fixed to the base plate 25d, and the armature coils 256 disposed at the annular magnetic yoke 255. The armature coils 256 are arranged repeatedly in circumferential direction as armature coils of U-phase, V-phase, W-phase, U'-phase, V'-phase, and W'-phase, and 18 armature coils are arranged to six magnetic poles of the rotor. The armature coils of U-phase, V-phase, and W-phase belong to the first armature magnetic pole group, and the armature coils of U'-phase, V'-phase, and W'-phase belong to the second armature magnetic pole group.

Figure 27:
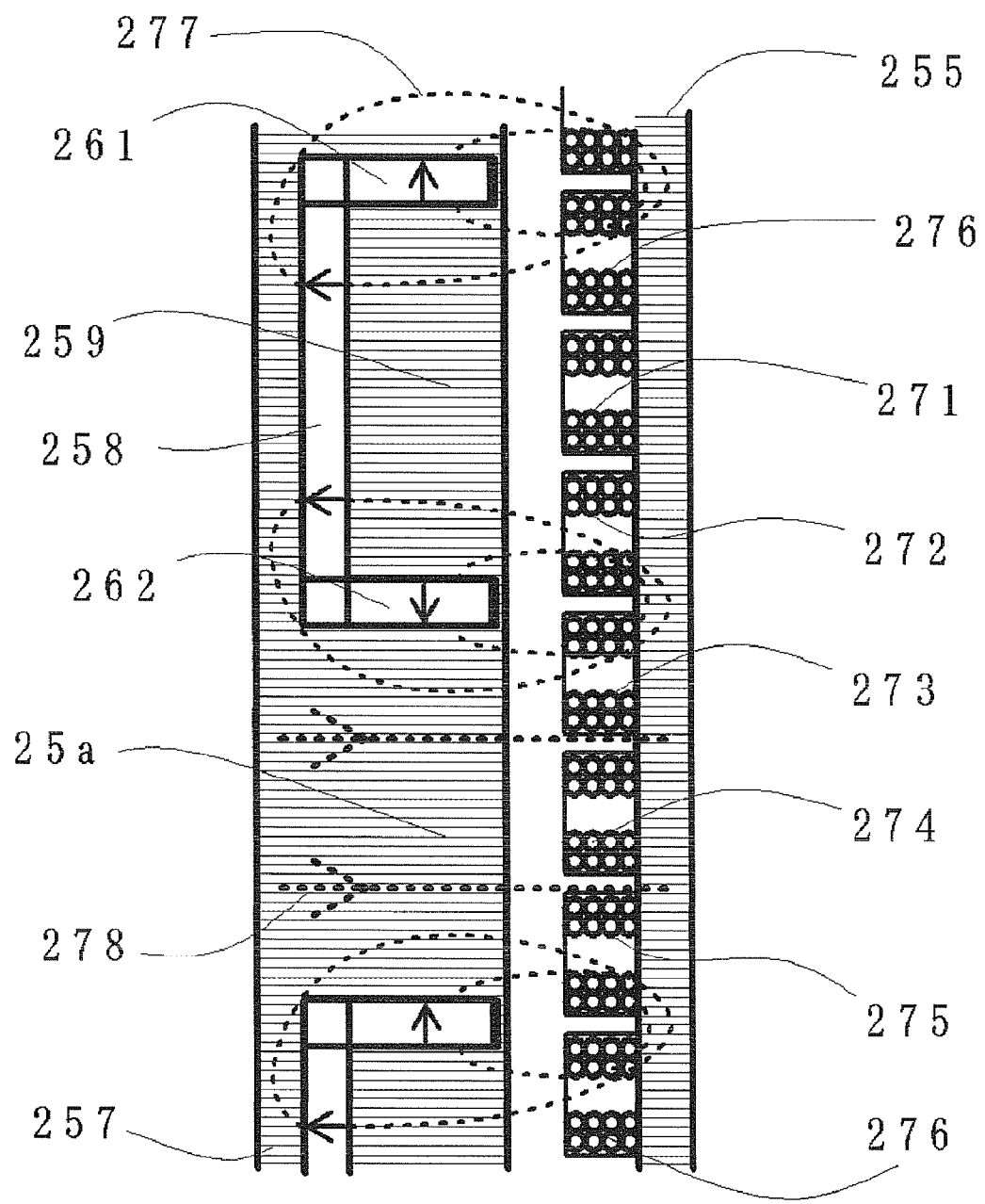
FIG. 27 is showing magnetic flux flow and a sectional view taken along Circumferential direction of the rotor and the armature shown in FIGS. 26A, and 26B.

FIG. 27 is showing magnetic flux flow and a sectional view taken along Circumferential direction F-F' of the rotor and the armature shown in FIGS. 26A and 26B. Magnetic flux coming from the magnetic excitation part and permanent magnets 258, 261, 262 will be explained referring the figure. FIG. 27 indicates the case where the magnetic excitation part increases flux amount crossing the armature coils 256 more than the cases of permanent magnets 258, 261, 262 only.

In FIG. 27, armature coils of the first armature magnetic pole group are shown as armature coils 271, 272, and 273 in the armature coil of U-phase, V-phase, and W-phase, respectively. Armature coils of the second armature magnetic pole group are shown as armature coils 274, 275, and 276 in the armature coils of U'-phase, V'-phase, and W'-phase, respectively. Armature coils of two groups are configured so that when U-phase armature coil 271 faces the island-shaped magnetic pole 259, U'-phase armature coil 274 is arranged to face the magnetic salient pole 25*a*. U-phase armature coil 271 and U'-phase armature coil 274 are connected in series to generate magnetic flux in opposite direction when current is flowed. V-phase armature coil 272 and V'-phase armature coil 275, W-phase armature coil 273 and W'-phase armature coil 276 are similarly connected respectively, and all of armature coils are wired to 3 phase as a whole.

Dotted lines 277 represents magnetic flux coming from permanent magnets 261, 262 and the permanent magnet 258. Direction of the magnetic flux 277 crossing U-phase armature coil 271 is opposite to the magnetic flux 277 crossing U'-phase armature coil 274 each other, direction of the magnetic flux 277 crossing V-phase armature coil 272 is opposite to the magnetic flux 277 crossing V'-phase armature coil 275 each other, direction of the magnetic flux 277 crossing W-phase armature coil 273 is opposite to the magnetic flux 277 crossing w'-phase armature coil 276 each other. Therefore, a generation voltage by the magnetic flux 277 is correctly synthesized as three-phase induced voltage, voltage output waveform of three phase is not influenced even if there is unbalance between flux amounts flowing through the island-shaped magnetic pole and the magnetic salient pole which are adjacent salient poles.

Magnetic flux coming from the magnetic excitation part is indicated by number 278, and is obstructed by the permanent magnets 258, and does not flow through the island-shaped magnetic poles 259, and always flows through the magnetic salient poles 25*a* solely to the armature. When direction of the magnetic flux 278 is made opposite direction with magnetization direction of the island-shaped magnetic poles 259 by permanent magnets 258 and 261 and 262, directions of the magnetic flux 277 and 278 crossing W-phase armature coil 273, U'-phase armature coil 274 are the same. Therefore, the magnetic excitation part increases flux amount crossing the armature coil more than case of flux only from permanent magnets 258 and 261 and 262.

The magnetic flux 278 coming from the magnetic excitation part flows to the armature through the magnetic salient poles 25*a* solely, and generated voltage is not same in each armature coil. However, armature coils of the first armature magnetic pole group and the second armature magnetic pole group are placed at different circumferential position as described above, in armature coils belonging to same phase that drive current is supplied simultaneously, when one faces the island-shaped magnetic pole 259, other is arranged to face the magnetic salient pole 25*a* and they are connected in series to produce flux in opposite direction when current is flowed. Therefore, drive torque fluctuations or generation voltage waveform distortion is restrained.

The magnetic excitation part consists of the cylindrical magnetic core 25*b* connected to the annular magnetic yoke 255, and the excitation coil 25*c* wound around the cylindrical magnetic core 25*b* as shown in FIG. 25. Left end of the cylindrical magnetic core 25*b* faces the circular magnetic substrate 257 through a minute gap, the excitation coil 25*c* is arranged to generate magnetic flux in a magnetic flux path composed of the cylindrical magnetic core 25*b*, the circular magnetic substrate 257, the magnetic salient poles 25*a*, the annular magnetic yoke 255. Magnetic flux amount crossing the armature coils 256 is controlled by changing an excitation current supplied to the excitation coil 25*c* as explained referring FIG. 27.

In this embodiment, three flux paths exist in axial direction, and they are connected in parallel. The first flux path is constituted by the circular magnetic substrate 257, the permanent magnet 258, the island-shaped magnetic poles 259, and the annular magnetic yoke 255. The second flux path is constituted by the circular magnetic substrate 257, the magnetic salient poles 25*a*, and the annular magnetic yoke 255. And the third flux path is constituted by the circular magnetic substrate 257, the cylindrical magnetic core 25*b*, and the annular magnetic yoke 255. Although, flux coming from permanent magnets 261 and 262 flows in small flux path including the annular magnetic yoke 255 and the circular magnetic substrate 257, as shown in FIG. 27, flux coming from the permanent magnet 258 may flow through the third flux path. Magnetic resistance of the third flux path is arranged larger than that of the second flux path by arranging dimensions between the circular magnetic substrate 257 and the annular magnetic yoke 25*b* so that flux from the permanent magnets 258 may not be short-circuited through the third flux path.

In this embodiment, the armature coils 256 are described as concentration winding, distribution winding can be applied in the course. The armature coils 256 are wound around empty core, so there is an advantage that occurrence of cogging torque is restrained. Composition with the armature coils 256 wound around magnetic teeth is also possible, and improvement of output is expected in that case. Moreover, the island-shaped magnetic pole 259 including permanent magnets 258, 261, and 262 can be composed as one permanent magnet with leftward magnetization. This invention can be applied to any above mentioned compositions and the composition will be chosen according to the specification of rotating electric machines.

Figure 28:
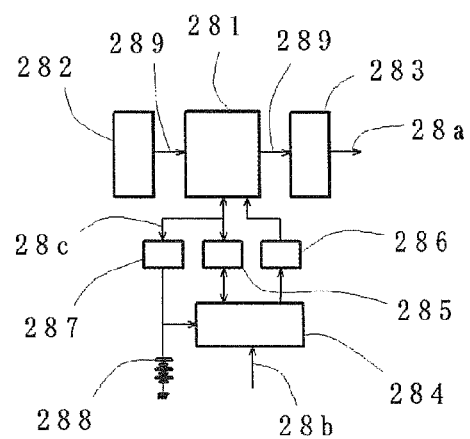
FIG. 28 is a block diagram of a rotating electric machine system according to the tenth embodiment of the present invention.

A rotating electric machine system according to a tenth embodiment of the present invention will be explained by using FIG. 28. The tenth embodiment is a rotating electric machine system that used the rotating electric machine apparatus of the first embodiment as a dynamo and an electric motor of a hybrid car.

In the figure, a number 281 shows the rotating electric machine apparatus shown in the first embodiment, and a rotary shaft 289 of the rotating electric machine apparatus 281 is combined so that torque may be transferred from engine 282 of the hybrid car by a belt, and torque of the rotary shaft 289 is transferred to a drive shaft 28*a* through a transmission 283. A control device 284 receives an instruction 28*b* from a higher rank control device, drives the rotating electric machine apparatus 281 as an electric motor through a drive circuit 285, and controls magnetic field strength in the rotating electric machine 281 through a field control circuit 286. Furthermore, the control device 284 receives the instruction 28*b* from the higher rank control device, rectifies electric power which appears in an output line 28*c* of the armature coils 16, if through a rectifier circuits 287, and charges a battery 288.

When magnet torque needs to be strengthened in low rotating speed region, an excitation current to increase magnetic pole area of the first magnetization is supplied to the excitation coil 1*j* from the magnetization control circuitry 5*a*, and magnetic pole area of the second magnetization is decreased as well as magnetic pole area of the first magnetization is increased, and flux amount flowing through the armature is made larger. When magnet torque needs to be weakened in high rotating speed region, the excitation current to increase magnetic pole area of the second magnetization is supplied to the excitation coil 1j from the magnetization control circuitry 5a, and magnetic pole area of the first magnetization is decreased as well as magnetic pole area of the second magnetization is increased, and flux amount flowing through the armature is made smaller.

When the hybrid car can be driven only on the torque of the engine 282, generated electric power which appears in the output line 28c of the armature coils 16, if is changed into DC current through the rectifier circuits 287, and makes the battery 288 charge by the instruction 28b. In that case, when power generation voltage becomes larger than optimal voltage that charges the battery 288 and flux amount flowing through the armature is made to be smaller, the flux adjustment current being supplied to the excitation coil 1j from the flux adjustment circuitry 59 is decreased. When the flux adjustment current is smaller than a predetermined value in the case, an excitation current to increase magnetic pole area of the second magnetization is supplied to the excitation coil 1j from the magnetization control circuitry 5a, and magnetic pole area of the first magnetization is decreased as well as magnetic pole area of the second magnetization is increased, and flux amount flowing through the armature is made smaller.

When power generation voltage becomes smaller than optimal voltage that charges the battery 288 and flux amount flowing through the armature is made to be larger, the flux adjustment current being supplied to the excitation coil 1j from the flux adjustment circuitry 59 is increased. When the flux adjustment current is larger than a predetermined value in the case, an excitation current to increase magnetic pole area of the first magnetization is supplied to the excitation coil 1j from the magnetization control circuitry 5a, and magnetic pole area of the first magnetization is increased as well as magnetic pole area of the second magnetization is decreased, and flux amount flowing through the armature is made larger.

Since the rotating electric machine apparatus is used as a constant voltage dynamo, when charging the battery 288, the converter that changes power generation voltage is unnecessary. Furthermore, the expensive converter can be made unnecessary by controlling on the optimal power generation voltage for each battery, even when a battery 288 includes two or more sorts of batteries with different in its voltage. Moreover, when charging the battery 288, the proportioning control of driving load and power generation load is also possible with the amount control of magnetic flux and the control of charging current.

This embodiment functions effectively also as an energy recovery system at the time of braking of the hybrid car. When directions of regenerative braking are received through the instruction 28b, the control device 284 makes the excitation current increase magnetic pole area of the first magnetization to be supplied to the excitation coil 1j from the magnetization control circuitry 5a, and makes magnetic pole area of the first magnetization increase, and makes flux amount flowing through the armature larger, and makes the battery 288 charge.

The electric power that can be taken out is large because flux amount through the armature coil 16, if is increased, and is temporarily stored in storage systems with electric double layer capacitor, etc., and energy recovery becomes large as well as braking force is secured. Since the rotating electric machine apparatus 281 is the physique employed as the electric motor for drive, so enough braking force can be generated as a generator for regenerative braking.

Although this embodiment employs the rotating electric machine system as a generator and a motor of the hybrid car, it is also possible to consider as the rotating electric machine system in an electric vehicle. In that case, the engine 282 of the hybrid car is removed in the above-mentioned embodiment, and energy recovery system in the braking time and driving system are composed only by the rotating electric machine system of this invention.

As described above, the rotating electric machine system of the present invention has been explained with reference to the embodiments. These embodiments are mere examples for realizing the theme or the purpose of the present invention and do not limit the scope of the invention. For example, although the armature coils were explained as three-phase circuit composition in the above-mentioned explanation, naturally the composition of single phase or multi-phase course is also possible, especially in the case of single phase, all the armature coils always contribute to driving force generating, and output density will be improved. Further, a rotating electric machine which changes combination, such as composition of a rotor magnetic pole, composition of an armature, and composition of a magnetic excitation part in the above-mentioned embodiment, and realizes the meaning of this invention can be constituted.

The rotating electric machine system according to the present embodiment of the present invention can be utilized as a high-power electric motor similarly to a conventional rotating electric machine, and additionally, enlarges the range of the practicable rotational speed, and furthermore, improves the function of the power generation, and also can control the power-generation function. By applying the present embodiment of the present invention as an electric generator and electric motor system for automobile application, the rotational speed range is able to be larger than the conventional one, and additionally, energy recovery in braking is enabled to improve the comprehensive energy consumption. The present embodiment of the present invention can realize the system that reduce the current flowing through armature coils, and control output power by the magnetic excitation part exclusively, and this embodiment of the present invention becomes capable of lowering voltage of power supply and cost reduction in drive circuit, etc. in that case. Furthermore, as the constant-voltage electric generator system, the power-generation voltage can be controlled to be constant in the wider rotational speed range, and therefore, the constant-voltage control circuit is not required, and furthermore, it becomes possible that a converter is not required for various types of battery charges in which voltages are different, and the entire system cost can be reduced.

It should be noted that the exemplary embodiments depicted and described herein set forth the preferred embodiments of the present invention, and are not meant to limit the scope of the claims hereto in any way. Numerous modifications and variations of the present invention are possible in light of the above teachings. It is therefore to be understood that, within the scope of the appended claims, the invention may be practiced otherwise than as specifically described herein.

What is claimed is:

1. A rotating electric machine system having a rotor and an armature facing axially each other, the rotating electric machine system comprising:
   the rotor having island-shaped magnetic poles and magnetic salient poles alternately disposed in a circumferential direction on its plane facing the armature;
   the armature having armature coils disposed in a circumferential direction on its plane facing the rotor, and a magnetic excitation part for magnetizing the island-shaped magnetic poles and the magnetic salient poles collectively in the same direction;

wherein the rotor has an isolation member including a permanent magnet and/or a non-magnetic member at least within the island-shaped magnetic poles to prevent passage of magnetic flux coming from outside, the thickness of the isolation member within the island-shaped magnetic pole is larger than the thickness of the isolation member within the magnetic salient pole so that magnetic flux coming from the magnetic excitation part should be hard to flow through the island-shaped magnetic pole;

the island-shaped magnetic poles are configured so as to be magnetized in almost the same axial direction by at least one of a permanent magnet adjacent to the island-shaped magnetic pole and a permanent magnet within the island-shaped magnetic pole;

the armature coils are grouped into a first armature magnetic pole group and a second armature magnetic pole group, and in an armature coil pair of the same phase in the first armature magnetic pole group and the second armature magnetic pole group which the armature coils are supplied with driving current simultaneously, the armature coils of the armature coil pair are arranged such that the armature coil of one of the armature coil pair opposes the island-shaped magnetic pole when the armature coil of other one of the armature coil pair opposes the magnetic salient pole, and the armature coils of the armature coil pair are connected to generate magnetic fluxes of mutually opposite directions when current flows;

the magnetic excitation part has either one of an excitation coil and a field magnet;

both ends of the magnetic excitation part are magnetically coupled respectively with one of the rotor and the armature arranged at axial ends of the rotating electric machine system so that a magnetic flux coming from one end of the magnetic excitation part may return to the other end thereof through the armature and the magnetic salient poles; and an amount of magnetic flux flowing through the armature is controlled by changing the amount of magnetic flux supplied from the magnetic excitation part in accordance with an output of the rotating electric machine system so that the output is optimized.

2. The rotating electric machine system according to claim 1, wherein the rotor arranged at an axial end of the rotating electric machine system has the island-shaped magnetic poles and the magnetic salient poles mounted on a circular magnetic substrate; and an end of the magnetic excitation part is magnetically coupled with the circular magnetic substrate.

3. The rotating electric machine system according to claim 1, wherein the armature arranged at an axial end of the rotating electric machine system has the armature coils disposed on a magnetic yoke; and an end of the magnetic excitation part is magnetically coupled with the magnetic yoke.

4. The rotating electric machine system according to claim 1, wherein the island-shaped magnetic poles and the magnetic salient poles are configured so that a circular magnetic substrate is sectioned in a circumferential direction by one of a permanent magnet and a magnet assembly having magnetization in almost a circumferential direction, and are magnetized with different polarities from each other.

5. The rotating electric machine system according to claim 1, wherein a magnet assembly consisting of permanent magnets placed on two sides of a magnetic substance is disposed between the island-shaped magnetic pole and the magnetic salient pole;

the magnet assembly has a non-magnetic member so that magnetic flux coming from the magnetic excitation part should be hard to flow through the magnet assembly.

6. The rotating electric machine system according to claim 1, wherein the rotor has the island-shaped magnetic poles and the magnetic salient poles are sectioned in a circumferential direction by a non-magnetic member and/or a permanent magnet, and faces the armatures at both axial ends of the rotor;

the thickness of the isolation member between both axial surfaces of the island-shaped magnetic pole should be larger than the thickness of the isolation member between both axial surfaces of the magnetic salient poles so that a magnetic flux coming from the magnetic excitation part should be hard to flow through the island-shaped magnetic pole.

7. The rotating electric machine system according to claim 1, wherein a first armature having the first armature magnetic pole group faces the rotor, and a second armature having the second armature magnetic pole group faces the rotor;

in an armature coil pair of the same phase in the first armature and the second armature, the armature coils of the armature coil pair are arranged such that the armature coil of one of the armature coil pair opposes the island-shaped magnetic pole when the armature coil of the other one of the armature coil pair opposes the magnetic salient pole, and the armature coils of the armature coil pair are connected in series to generate magnetic flux of mutually opposite direction when current flows.

8. The rotating electric machine system according to claim 1, wherein the armature has the first armature magnetic pole group and the second armature magnetic pole group in a different circumferential position;

in an armature coil pair of the same phase in the first armature magnetic pole group and the second armature magnetic pole group, the armature coils of the armature coil pair are arranged such that the armature coil of one of the armature coil pair opposes the island-shaped magnetic pole when the armature coil of the other one of the armature coil pair opposes the magnetic salient pole, and the armature coils of the armature coil pair are connected in series to generate magnetic flux of mutually opposite direction when current flows.

9. The rotating electric machine system according to claim 1, wherein a first rotor and an armature and a second rotor are disposed axially to make a line in the order as recited here;

the armature has the armature coils in a circumferential direction facing the first rotor and the second rotor;

each rotor has the island-shaped magnetic poles and the magnetic salient poles arranged alternately on a circular magnetic substrate in a circumferential direction facing the armature;

both ends of the magnetic excitation part are magnetically coupled respectively with the circular magnetic substrate of two rotors so that a magnetic flux coming from one end of the magnetic excitation part flows through the circular magnetic substrate and the magnetic salient pole of the first rotor, the armature, the magnetic salient pole and the circular magnetic substrate of the second rotor, and returns to the other end of the magnetic excitation part.

10. The rotating electric machine system according to claim 1,
wherein an first armature and a rotor and an second armature are disposed axially to make a line in the order as recited here;
the rotor has the island-shaped magnetic poles and the magnetic salient poles alternately arranged in a circumferential direction facing the first armature and the second armature;
the armature has the armature coils at arranged on a magnetic yoke in a circumferential direction facing with the rotor;
both ends of the magnetic excitation part are magnetically coupled respectively with the magnetic yoke of the two armatures so that a magnetic flux coming from one end of the magnetic excitation part flows through the magnetic yoke of the first armature, the magnetic salient pole, the magnetic yoke of the second armature, and returns to the other end of the magnetic excitation part.

11. The rotating electric machine system according to claim 1,
wherein the magnetic excitation part has a field magnet and an exciting coil to change magnetization of the field magnet;
the magnetic excitation part is constituted so that a magnetic flux coming from one of an N pole and an S pole of the field magnet returns to the other pole of the field magnet through the armature and the magnetic salient poles of the rotor;
an excitation current is supplied to the excitation coil, and magnetization state of the field magnet is changed irreversibly, and an amount of the magnetic flux flowing through the armature is controlled according to an output of the rotating electric machine system so that the output is optimized.

12. The rotating electric machine system according to claim 11,
wherein the field magnet has magnet elements having different products of length and coercivity from each other disposed between a magnetic member;
the magnet elements are connected in parallel by the magnetic member;
the magnet elements have one of a first magnetization and a second magnetization that are opposite directions from each other;
the magnet element having the first magnetization magnetizes the magnetic salient pole in an opposite direction to the magnetization direction in the island-shaped magnetic pole.

13. The rotating electric machine system according to claim 11,
wherein a main magnetic flux path and an excitation magnetic flux path are connected to the field magnet in parallel;
the main magnetic flux path is a path in which a magnetic flux flowing from one of an N pole and an S pole of the field magnet returns to the other pole of the field magnet through the magnetic salient poles and the armature, and the excitation magnetic flux path is a path in which a magnetic flux flowing from one pole of the field magnet returns to other pole of the field magnet mainly in the magnetic excitation part;
the excitation coil is disposed to generate a magnetic flux in a path including the excitation magnetic flux path and the field magnet.

14. The rotating electric machine system according to claim 11,
wherein the field magnet has a first magnet element and a second magnet element with mutually different coercivities and a magnetic member;
the first magnet element and the second magnet element are connected in parallel by the magnetic member;
the excitation coil is disposed to cause a magnetic flux in s closed magnetic flux path composed of the first magnet element and the second magnet element and the magnetic member.

15. The rotating electric machine system according to claim 11,
wherein a flux adjustment current of a degree which does not make the field magnet cause an irreversible magnetization change is supplied to the excitation coil in each magnetization state of the field magnet;
an induced flux by the flux adjustment current is superimposed on a flux coming from the field magnet so that the magnetic flux amount flowing through the armature is adjusted.

16. The rotating electric machine system according to claim 11,
wherein a permanent magnet is disposed as the isolation member to prevent passage of magnetic flux coming from the magnetic excitation part within the island-shaped magnetic pole;
an excitation current is supplied to an armature coil facing the island-shaped magnetic pole so that a magnetization of the permanent magnet is changed.

17. The rotating electric machine system according to claim 11, further comprising a control device;
wherein a rotational force is an input;
the control device supplies the excitation current to the excitation coil so that a magnetic pole area of the first magnetization is decreased when a power generation voltage induced in the armature coil is larger than a predetermined value and an amount of a magnetic flux flowing through the armature is to be reduced, and supplies the excitation current to the excitation coil so that a magnetic pole area of the first magnetization is increased when the power generation voltage induced in the armature coil is smaller than the predetermined value and an amount of a magnetic flux flowing through the armature is to be increased; and
the power generation voltage that is controlled is the predetermined value.

18. The rotating electric machine system according to claim 11, further comprising a control device;
wherein a current supplied to the armature coil is an input, and
the control device supplies the excitation current to the excitation coil so that a magnetic pole area of the first magnetization is decreased when a rotational speed is larger than a predetermined value and an amount of a magnetic flux flowing through the armature is to be reduced, and supplies the excitation current to the excitation coil so that a magnetic pole area of the first magnetization is increased when the rotational speed is smaller than the predetermined value and an amount of a magnetic flux flowing through the armature is to be increased; and thereby a rotational force is optimally controlled.

19. The rotating electric machine system according to claim 11, further comprising a control device;

wherein a current supplied to the armature coil is an input, a rotational force is an output, when a rotational speed is to be reduced, the control device connects a battery with the armature coil and supplies the excitation current to the excitation coil so that a magnetic pole area of the first magnetization is increased, and an amount of a magnetic flux flowing through the armature is increased; and a rotational energy is taken out as a power generation output.

20. The rotating electric machine system according to claim 1, wherein the magnetic excitation part has an excitation coil and an excitation flux path member;

both ends of the excitation flux path member are magnetically coupled respectively with one of the rotor and the armature arranged at axial both ends of the rotating electric machine system;

the excitation coil is constituted so as to induce a magnetic flux in a magnetic flux path including the excitation flux path member and the magnetic salient poles of the rotor and the armature; and an excitation current is supplied to the excitation coil, and a magnetic flux amount flowing through the armature is controlled according to an output of the rotating electric machine system so that the output is optimized.

21. The rotating electric machine system according to claim 20, wherein the magnetic excitation part has a magnetic gap in a magnetic flux path including the excitation flux path member so that magnetic flux from a permanent magnet in the island-shaped magnetic pole should not be short-circuited through the excitation flux path member.

22. A method for controlling a magnetic flux amount flowing through an armature of a rotating electric machine including a rotor and an armature axially facing each other, the rotor having island-shaped magnetic poles and magnetic salient poles alternately disposed in a circumferential direction on its plane facing the armature, the armature having armature coils disposed in a circumferential direction on its plane facing the rotor, and a magnetic excitation part for magnetizing the island-shaped magnetic poles and the magnetic salient poles collectively in the same direction, said method comprising:

arranging an isolation member including a permanent magnet and/or a non-magnetic member at least within the island-shaped magnetic poles to prevent passage of magnetic flux coming from outside, the thickness of the isolation member within the island-shaped magnetic pole is larger than the thickness of the isolation member within the magnetic salient pole so that magnetic flux coming from the magnetic excitation part should be hard to flow through the island-shaped magnetic pole;

constituting the island-shaped magnetic pole so as to be magnetized in the same axial direction by at least one of a permanent magnet adjacent to the island-shaped magnetic pole and a permanent magnet within the island-shaped magnetic pole;

arranging a field magnet and an excitation coil to change magnetization of the field magnet in the magnetic excitation part;

coupling magnetically both ends of the magnetic excitation part respectively with one of the rotor and the armature arranged at both axial ends of the rotating electric machine system so that magnetic flux coming from one of an N pole and an S pole of the field magnet returns to the other pole of the field magnet through the magnetic salient poles and the armature; and supplying an excitation current to the excitation coil, and changing the field magnet magnetization irreversibly to control an amount of magnetic flux flowing through the armature.

23. A method for controlling a magnetic flux amount flowing through an armature of a rotating electric machine including a rotor and an armature axially facing each other, the rotor having island-shaped magnetic poles and magnetic salient poles alternately disposed in a circumferential direction on its plane facing the armature, the armature having armature coils disposed in a circumferential direction on its plane facing the rotor, and a magnetic excitation part for magnetizing the island-shaped magnetic poles and the magnetic salient poles collectively in the same direction, said method comprising:

arranging an isolation member including a permanent magnet and/or a non-magnetic member at least within the island-shaped magnetic poles to prevent passage of magnetic flux coming from outside, the thickness of the isolation member within the island-shaped magnetic pole is larger than the thickness of the isolation member within the magnetic salient pole so that magnetic flux coming from the magnetic excitation part should be hard to flow through the island-shaped magnetic pole;

constituting the island-shaped magnetic pole so as to be magnetized in almost the same axial direction by at least one of a permanent magnet adjacent to the island-shaped magnetic pole and a permanent magnet within the island-shaped magnetic pole;

arranging an excitation coil and an excitation flux path member in the magnetic excitation part;

coupling magnetically both ends of the excitation flux path member respectively with one of the rotor and the armature arranged at axial ends of the rotating electric machine system so as to induce a magnetic flux in a magnetic flux path including the magnetic salient poles and the armature and the excitation flux path member; and supplying an excitation current to the excitation coil to control an amount of magnetic flux flowing through the armature.

* * * * *